(12) United States Patent
Shum et al.

(10) Patent No.: US 6,246,412 B1
(45) Date of Patent: Jun. 12, 2001

(54) INTERACTIVE CONSTRUCTION AND REFINEMENT OF 3D MODELS FROM MULTIPLE PANORAMIC IMAGES

(75) Inventors: Heung-Yeung Shum, Bellevue, WA (US); Mei Han, Pittsburgh, PA (US); Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/099,097

(22) Filed: Jun. 18, 1998

(51) Int. Cl.$^7$ .................................................. G06T 15/00
(52) U.S. Cl. ......................... 345/419; 345/113; 345/435; 382/154
(58) Field of Search .................................. 345/419, 427, 345/433, 435, 113, 437, 438, 439; 382/106, 154

(56) References Cited

PUBLICATIONS

[BB95] S. Becker and V. M. Bove. Semiautomatic 3–D model extraction from uncalibrated 2–D camera views. In SPIE vol. 2410, Visual Data Exploration II, pp. 447–461, Feb. 1995.

Zha97 Z. Zhang. Determining the epipolar geometry and its uncertainty: A review. IJCV'98, vol. 27, No. 2, pp. 161–195, Mar. 1998.

[CW90] R. T. Collins and R. S. Weiss. Vanish point calculation as a statistical inference on the unit sphere. In ICCV'90, pp. 400–403, Dec. 1990.

[FSL+95] O. D. Faugeras, Laveau S., Robert L., Csurka G., and Zeller C. 3–D reconstruction of urban scenes from sequences of images. Technical Report 2572, INRIA, 1995.

[WH88] E. L. Walker and M. Herman. Geometric reasoning for constructing 3D scene descriptions from images. Artificial Intelligence, 37:275–290, 1988.

(List continued on next page.)

*Primary Examiner*—Mark Zimmerman
*Assistant Examiner*—Mano Padmanabhan
(74) *Attorney, Agent, or Firm*—Lyon, Harr & DeFrank; Richard T. Lyon

(57) ABSTRACT

A system and process for refining a model of a 3D scene using one or more panoramic views of the scene. An image of a panoramic view is displayed on a screen and a previously constructed model of the 3D scene is projected onto the screen image. Once the model is projected, any portion thereof that is not aligned with its corresponding feature in the screen image is moved so as to be in alignment. Plane normals and line directions for previously modeled planes in the 3D scene are then estimated using, inter alia, the newly aligned lines of the previous model. There may also be new, unmodeled features appearing in the screen image. These features can also be modeled, if desired. Next, plane distances and vertex point locations of each plane in the 3D scene that is to be modeled are estimated. In general, this entails solving of a system of linear geometric constraint equations created from the aforementioned plane normals and line directions, and preferably, user-designated parameters associated with the geometry of the scene. If the initial model employed in the refinement process was constructed using similar methods, then it is preferred to include the associated constraint equations in the system of equations. The system of equations is solve using any of various methods and the refined model of the 3D scene is constructed. If additional panoramic views of the scene are available, the model can be refined even further using the just-described system and process.

124 Claims, 27 Drawing Sheets

(3 of 27 Drawing Sheet(s) Filed in Color)

PUBLICATIONS

[Har89] R. M. Haralick. Determining camera parameters from the perspective projection of a rectangle. Pattern Recognition, 22(3):225–230, 1989.

[KS96] S.B. Kang and R. Szeliski. 3–D scene data recovery using omnidirectional multibaseline stereo. In CVPR'96, pp. 364–370, Jun. 1996.

[KW97] S. B. Kang and R Weiss. Characterization of errors in compositing panoramic images. In CVPR'97, pp. 103–109, Jun. 1997.

[MB95] L. McMillan and G. Bishop. Plenoptic modeling: An image–based rendering system. SIGGRAPH'95, pp. 39–46, Aug. 1995.

[SK97] H. S. Sawhney and R. Kumar. True multi–image align–ment and its application to mosaicing and lens distortion correc–tion. In CVPR'97, pp. 450–456, Jun. 1997.

[SS97a] H.–Y. Shum and R. Szeliski. Construction and refinement of panoramaic mo–saics with global and local alignment. In ICCV'98, pp. 953–958, 1998.

[SS97b] R. Szeliski and H. Y. Shum. Creating full view panoramic image mosaics and texture–mapped models. SIG–GRAPH'95, pp. 251–258, Aug. 1997.

[Ste95] G. Stein. Accurate internal camera calibration using rotation, with analysis of sources of error. In ICCV95, pp. 230–236, Jun. 1995.

[TDM96] C.J. Taylor, P. E. Debevec, and J. Malik. Recon-struct–ing polyhedral models of architectural scenes from photographs. In ECCV'96, vol. 2, pp. 659–668, Apr. 1996.

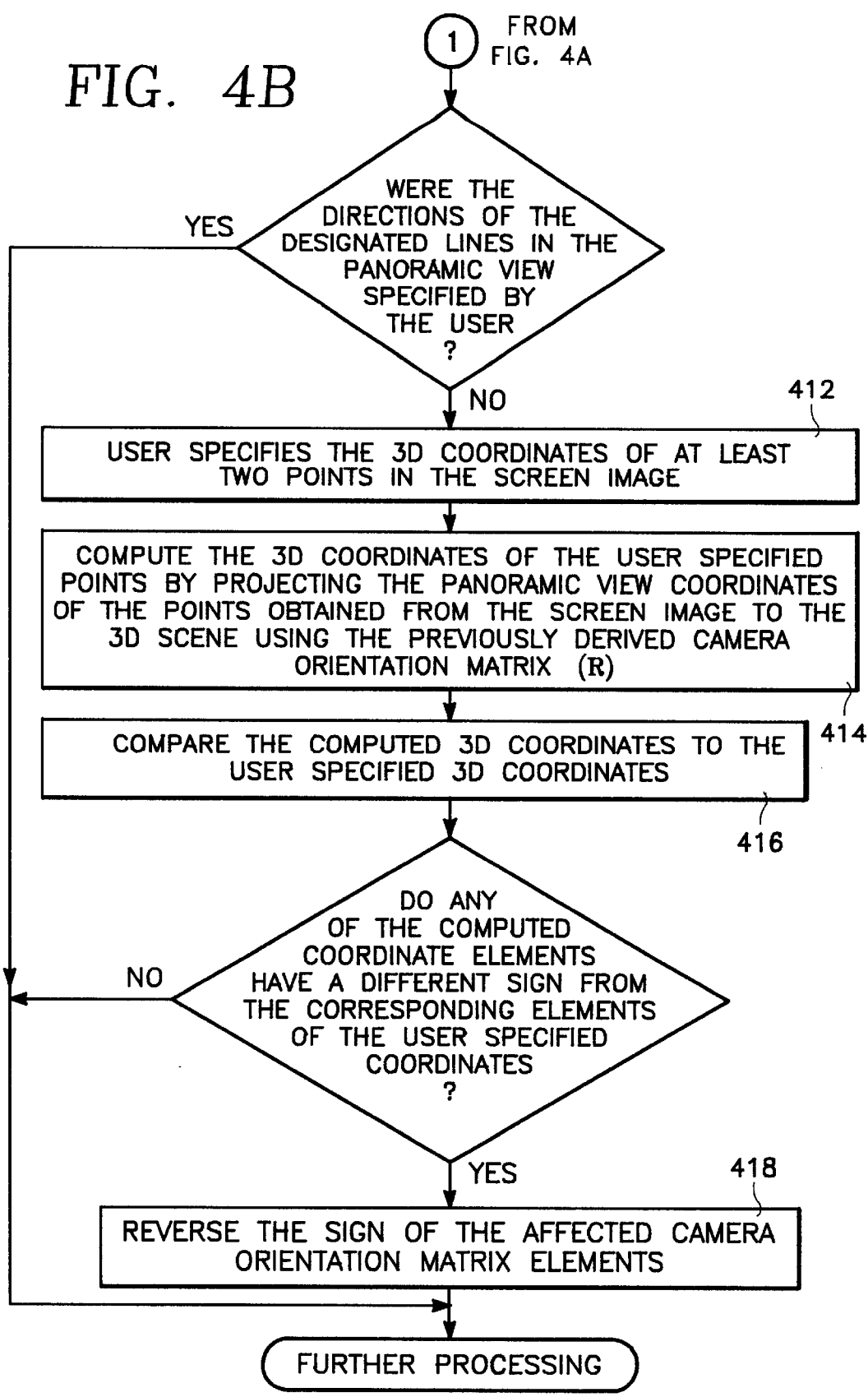

FROM
FIG. 7A (2)

714
FOR EACH DESIGNATED LINE IN THE PLANE IN THE PANORAMIC VIEW, IDENTIFY COORDINATES OF 2 POINTS (i.e., $x_1'$, $x_2'$) ON THE LINE FROM CORRESPONDING POINTS IN THE SCREEN IMAGE (PREFERABLY THE END POINTS OF THE LINE)

716
FOR EACH OF THE DESIGNATED LINES, COMPUTE THE NORMAL ($n_p'$) OF THE PROJECTION PLANE FORMED BY THE POINTS ($x_1'$, $x_2'$) AND THE "CAMERA CENTER" ($O_c$)
(i.e., $n_p' = x_1' \times x_2'$)

718
COMPUTE THE LINE DIRECTION ($m_1'$) OF THE PAIR OF PARALLEL LINES FROM THE PROJECTION PLANE NORMALS ($n_{pj}'$, $n_{pk}'$) ASSOCIATED WITH EACH OF THE PARALLEL LINES
(i.e., $m_1' = n_{pj}' \times n_{pk}'$)

720
COMPUTE THE LINE DIRECTION ($m_1$) IN EACH PLANE IN THE 3D SCENE CORRESPONDING TO THE PAIR OF PARALLEL LINES USING THE COMPUTED PANORAMIC VIEW LINE DIRECTION ($m_1'$) AND THE CAMERA ORIENTATION MATRIX (R)
(i.e., $m_1 = R^T m_1'$)

FROM
FIG. 7C

③
↓

722

COMPUTE THE DIRECTION ($m_2$) OF THE LINE IN THE 3D SCENE CORRESPONDING TO THE THIRD (NON-PARALLEL) DESIGNATED LINE FROM THE PREVIOUSLY COMPUTED LINE DIRECTION ($m_1$) AND THE PROJECTION PLANE NORMAL ($n_{p2}'$) ASSOCIATED WITH THE THIRD DESIGNATED LINE AFTER BEING PROJECTED INTO 3D SCENE COORDINATES USING THE CAMERA ORIENTATION MATRIX (R)

(i.e., $m_2 = m_1 \times n_{p2}$, WHERE $n_{p2} = R^T n_{p2}'$)

724

COMPUTE THE NORMAL (n) OF THE CORRESPONDING PLANE IN THE 3D SCENE FROM THE TWO 3D SCENE LINE DIRECTIONS ($m_1, m_2$) ASSOCIATED WITH THE PLANE (i.e., $n = m_1 \times m_2$)

FIG. 7D

INTERACTIVE CONSTRUCTION AND REFINEMENT OF 3D MODELS FROM MULTIPLE PANORAMIC IMAGES

BACKGROUND

1. Technical Field

The invention is related to a computer-implemented system and process for constructing a model of a 3D scene, and more particularly, to a system and process for refining a previously constructed model using one or more panoramic views of the scene.

2. Background Art

A great deal of effort has been expended on 3D scene reconstruction from image sequences (with calibrated or un-calibrated cameras, e.g., [FSL+95]) using computer vision techniques. Unfortunately, the results from most automatic modeling systems are disappointing and unreliable due to the complexity of the real scene and the fragility of the vision techniques. Part of the reason is the demand for accurate correspondences (e.g., point correspondence) required by many computer vision techniques such as stereo and structure from motion. Moreover, such correspondences may not be available if the scene consists of large un-textured regions.

Fortunately, for many real scenes, it is relatively straightforward to interactively specify corresponding points, or lines, or planes. For example, the interiors and exteriors of buildings provide vertical and horizontal lines, as well as parallel and perpendicular planes. These constraints have been exploited in several interactive modeling systems. For example, PhotoModeler (by Eos Systems Inc. of Vancouver, BC, Canada) is a commercial product which constructs 3D models from several images, using photogrammetry techniques and manually specified points. However, explicit camera calibration is necessary with this system. The Total-Calib system, on the other hand, estimates the fundamental matrix from a few selected matched points [BR97]. It then predicts other possible matching points from one image to others. In Becker's modeling system, the problem of lens distortion (encountered in images taken with wide field of view lenses) is also considered [BB95]. By employing the known structure of building exteriors, the Facade system directly recovers a solid 3D model (blocks) from multiple images [TDM96]. However, none of these systems employs panoramic images as does the present invention.

It is noted that in the preceding paragraphs, as well as in the remainder of this specification, the description refers to various individual publications identified by an alphanumeric designator contained within a pair of brackets. For example, such a reference may be identified by reciting, "reference [BR97]" or simply "[BR97]". Multiple references will be identified by a pair of brackets containing more than one designator, for example, [BR97, BB95, TDM96]. A listing of the publications corresponding to each designator can be found at the end of the Detailed Description section.

SUMMARY

The present invention relates to an interactive modeling system and process that constructs models of a 3D scene from a panoramic view of the scene. A user interface is employed to facilitate an exchange of information about the 3D scene between a user, and a computer-implemented modeler that constructs 3D models based on the user-supplied information.

The panoramic view or panorama employed in the present system and process is essentially a mosaic consisting of a set of images taken around the same viewpoint, which have been registered together to form one large image. As mentioned previously, this differs from previous modeling systems in that it uses panoramic image mosaics (therefore large fields of view), instead of multiple images (generally small fields of view). Such a modeling approach has much less ambiguity than traditional structure from motion approaches because it uses these wide field of view images, and therefore obtains a better estimate of camera rotation. Panoramas also offer several other advantages over regular images. First, the modeling problem can be decoupled into a zero baseline problem (building a panorama from images taken with rotating camera) and a wide baseline stereo or structure from motion problem (recovering a 3D model from the panorama). Second, the camera calibration problem is implicitly recovered as part of the panorama construction [Ste95, KW97, SK97]. Further, due to recent advances, it is now possible to construct panoramas with hand-held cameras [SS97b], thereby making panoramic images readily obtainable. It should be noted that the system and process of the present invention could also handle calibrated (non-panoramic) images as well. These images would simply be treated as narrow field of view panoramas. However, the recovered 3D model will not be as accurate with narrow field of view images, and so the use of these types of images is not preferred.

One of the keys to the present invention is its reliance on user-supplied information about the 3D scene being modeled. Previous work on 3D reconstruction from panoramas [MB95, KS96] has not attempted to exploit important regularities present in the environment, such as walls with known orientations. However, the structures associated with the manmade environment are full of regularities such as parallel lines, lines with known directions, planes with lines and points on them, etc., which can be taken advantage of in the modeling process [WH88]. Using these constraints, a fairly complex 3D model can be constructed from even a single panorama.

The systems and processes for refining a model of a 3D scene embodying the present invention require that an initial model of the scene be provided as input. While there are other methods available to construct the initial model, it is preferred that the methods disclosed in a co-pending application entitled INTERACTIVE CONSTRUCTION OF 3D MODELS FROM PANORAMIC IMAGES by the inventors of this application and assigned to the common assignee, be employed. This co-pending application was filed on Jun. 18, 1998 and assigned Ser. No. 09/099,161, now U.S. Pat. No. 6,084,592. This modeling process begins by providing the user with a display of an image of the panoramic view of the 3D scene on a computer monitor screen. The user is then required to specify information concerning certain geometric features of the scene on the screen image. A computer program executable by a computing device recovers a camera orientation matrix of the panoramic view based on the features specified by the user. Plane normals and line directions associated with each plane in the 3D scene which is to be modeled are estimated using this matrix, and the user-specified information. In addition, a camera translation can be optionally recovered at this stage of the process. These initial stages of the interactive modeling process can be accomplished via any appropriate method.

The process described in the above-referenced co-pending patent application involves first displaying an image of the panoramic view of the 3D scene on a computer monitor screen. The camera orientation matrix of the panoramic view is then recovered based on user-specified lines associated with at least one plane of the 3D scene. The user specifies lines by designating the location of two points of the line (preferably the end points) on the screen image and inputting the direction of the corresponding line in 3D scene (e.g., vertical or horizontal). A line is then displayed on the screen image between the two designated points. The camera orientation matrix can be computed if the user specifies at least two vertical lines and one horizontal line of the 3D scene on a plane or at least two horizontal lines and one vertical line of the 3D scene. The camera orientation matrix can also be derived if the user specifies at least two sets of parallel lines of the 3D scene.

The next step of the process is to estimate plane normals and line directions of each plane in the 3D scene. This is generally accomplished by the user "drawing" either two pairs of parallel lines (e.g., a parallelogram) or three lines of a rectangle on each plane in the screen image that is to be modeled. The user "draws" these lines, as before, by designating the location of two points of a line for every line "drawn" on the screen image. Once the required lines have been drawn on a plane in the screen image, the direction of the corresponding line in the 3D scene is derived using the camera orientation matrix. Finally, a normal for each plane being modeled in the 3D scene is computed from the previously derived line directions associated with that plane.

A camera translation, which is defined as the difference between a so-called camera projection center and the coordinate origin of the 3D scene, can be derived next if desired. The camera projection center corresponds to the coordinate origin of the panoramic view projected into the 3D scene. The camera translation is derived by the user identifying the location of at least two points in the screen image and specifying their 3D scene coordinates. A way of characterizing the conversion of a point in the 3D scene to a corresponding point in the panoramic view is to employ the relationship, $(x-t) \cdot (R^T p_j') = 0$, $j=0,1,2$ where x represents the coordinates of a point in the 3D scene, t represents the camera translation, R represents the camera orientation matrix, x' represents the coordinates of a point in the panoramic view which corresponds to the point x in the 3D scene and $p_0'=(-x_2, x_1, 0)$, $p_1'=(-x_3, 0, x_1)$ and $p_2'=(0_1-x_3, x_2)$ represent three directions perpendicular to a ray from the camera center through the point $x'=(x_1, x_2, x_3)$. Thus using the two or more user specified points, a system of linear equations can be created and solved for the camera translation using a least-squares approach.

In the preferred 3D scene modeling system and process embodying the present invention, the 3D scene is represented by sets of connected planes. If all the structures of the 3D scene are connected, then only one set of planes is needed. If however, the scene is made up of two or more unconnected structures, the 3D scene is represented by a corresponding number of connected plane sets. Each plane used to model the 3D scene is defined by its plane normal and plane distance, and/or by its vertex point locations. Thus, these parameters are obtained to complete the modeling procedure.

In the previously identified co-pending patent application, the scene parameters are found, along with the camera translation if it has not already been recovered, by creating a system of linear geometric constraint equations. The system of equations employs all available geometric constraints and includes various scene parameters such as user-designated 3D scene points, plane normals, line directions, plane distances and parallel plane designations, as well as the previously estimated plane normals and line directions. The system of equations is then solved for all the unknown plane distances and vertex point locations (and possibly the camera translation) using a least-squares approach A system of equations is created for each unconnected structure in the 3D scene and individually solved for all unknown parameters. Once all the planes that are to be modeled in each unconnected structure within the 3D scene are defined, the model is constructed and displayed as desired.

While the foregoing modeling system and process will produce a model of a 3D scene with sufficient accuracy to satisfy many applications, it is possible to refine the model. One preferred system and process for accomplishing such a refinement of the model was the subject of a co-pending application entitled INTERACTIVE CONSTRUCTION OF 3D MODELS FROM PANORAMIC IMAGES EMPLOYING HARD AND SOFT CONSTRAINT CHARACTERIZATION AND DECOMPOSING TECHNIQUES by the inventors of this application and assigned to the common assignee. This co-pending application was filed on Jun. 18, 1998 and assigned Ser. No. 09/099,098. The preferred way of accomplishing the model refinement disclosed in the co-pending application involved characterizing each equation in the above-described systems of linear constraint equations as being either a hard or soft constraint. A constraint equation is designated a hard constraint whenever it includes a user-designated parameter (i.e., x", d", n", m", parallel planes), and a soft constraint whenever it lacks such a parameter. For example, equations based on previously-estimated plane normals and line directions would be best designated as soft constraints due to the possible inaccuracies introduced by estimating these parameters from a potentially noisy panoramic view. In one preferred embodiment, the characterized system of constraint equations is solved using an equality-constrained least squares approach where the equations designated as soft constraints are solved subject to the equations designated as hard constraints. In an alternate preferred embodiment, a unity weight factor is assigned to all soft constraints and a large weight factor to all hard constraints. The weighted system of constraint equations is then solved via a conventional least-squares approach.

In connection with any of the foregoing ways of solving the systems of linear constrain equations, it is preferred that the solving step be preceded by a decomposition step. This decomposing of the system of constraint equations is designed to ensure its solvability. The decomposing step includes imposing one or more requirements that are indicative of the solvability of the system. For example, in all the foregoing embodiments, it is preferred that each system of equations be checked to ensure the number of equations is no fewer than the number of unknowns. In addition, it is preferred that each system of equations be checked to ensure the right side of each equation is a non-zero vector. In those embodiments where the constraint equations are characterized as being either hard or soft constraints, an additional requirement is preferably imposed—namely that all the hard constraints are consistent with one another. If the foregoing solvability requirements are not met, it is preferred that the system of equations involved be declared unsolvable. The user would then be provided with an indication of which unknown plane distances and/or vertex point locations cannot be estimated via an appropriate screen image. In addition, the user could be provided with an indication of what user designatable information could be entered to allow the system to be solved.

The initial model of the 3D scene produced via the above-described methods can be further refined using the refinement systems and processes embodying the present invention. Essentially, an image of a new panoramic view of the 3D scene is displayed on the monitor screen. The camera orientation matrix of the new panoramic view is recovered based on lines associated with at least one plane of the 3D scene as specified by the user. The camera translation associated with the new panorama is also recovered at this point in the process. Both of the camera orientation matrix and the camera translation are recovered using the same methods described previously in connection with constructing the initial model of the 3D scene.

Next, the previously constructed model of the 3D scene is projected onto the screen image of the new panoramic view. While the previously constructed model is preferably obtained using the foregoing preferred systems and processes, as indicated, this need not be the case. The model need only comprise one or more sets of interconnected lines forming planes representative of the 3D scene. Such a model produced by any means can be projected into a 2D panoramic coordinate system and then superimposed on a screen image of a panorama of the 3D scene. Once the model is projected onto the screen image of the new panoramic image, any portion thereof that is not aligned with its corresponding feature in the screen image is moved so as to be in alignment with that feature. This task is accomplished via any conventional screen image manipulation method (e.g. a click and drag method).

The plane normals and line directions for previously modeled planes in the 3D scene are refined using the camera orientation matrix and the newly aligned lines of the previous model. This entails deriving the direction of lines in the 3D scene corresponding to the lines of the projected and aligned model, and deriving a normal for each previously modeled plane in the 3D scene using the 3D scene line directions associated with that plane. Here again, the methods described previously in connection with constructing the initial model of the 3D scene are employed in deriving the aforementioned line directions and plane normals. In addition to the previously modeled planes, there may be new, unmodeled features (representable by one or more planes) appearing in the screen image of the new panoramic view. These features can also be modeled, if desired. To do so, the same procedures used in estimating the line directions and plane normals for planes in the initial model are preferably employed.

The next task in constructing a refined model of the 3D scene involves estimating (or re-estimating in the case of an initial model obtained in accordance with the previously-described methods) the plane distances and vertex point locations of each plane in the 3D scene which is to be modeled. In general, this entails solving of a system of linear geometric constraint equations. These equations are based on the estimated plane normals and line directions derived from the panoramic view of the 3D scene, and preferably, various user-designated parameters associated with the geometry of the scene. If the initial model employed in the refinement process was constructed using the preferred systems and methods described previously, then it is possible (and preferred) to include constraint equations based on the estimated plane normals and line directions derived from the first panoramic view of the 3D scene and any user-designated parameters provided in conjunction therewith. It is believed the resulting refined model will be more accurate using the previously created constraint equations along with the new ones, although some improvement is still expected even if these previously derived constraints are not employed (or are not available). Once the system of equations is created, it is solved using any of the previously described methods, including characterizing the constraint equations as hard or soft and solving them using an equality-constrained least squares approach.

Finally, once the plane distance and vertex point locations for the planes being modeled are estimated, a refined model of the 3D scene can be constructed. It is noted that if additional panoramic views of the scene are available, the model can be refined even further using the just-described process.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

FIGS. 4A & 4B are block diagrams of a process for accomplishing the camera orientation matrix recovery program module of the overall process of FIG. 3.

FIGS. 7A through 7D are block diagrams of a process for accomplishing the plane normal and line direction estimation program module of the overall process of FIG. 3.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
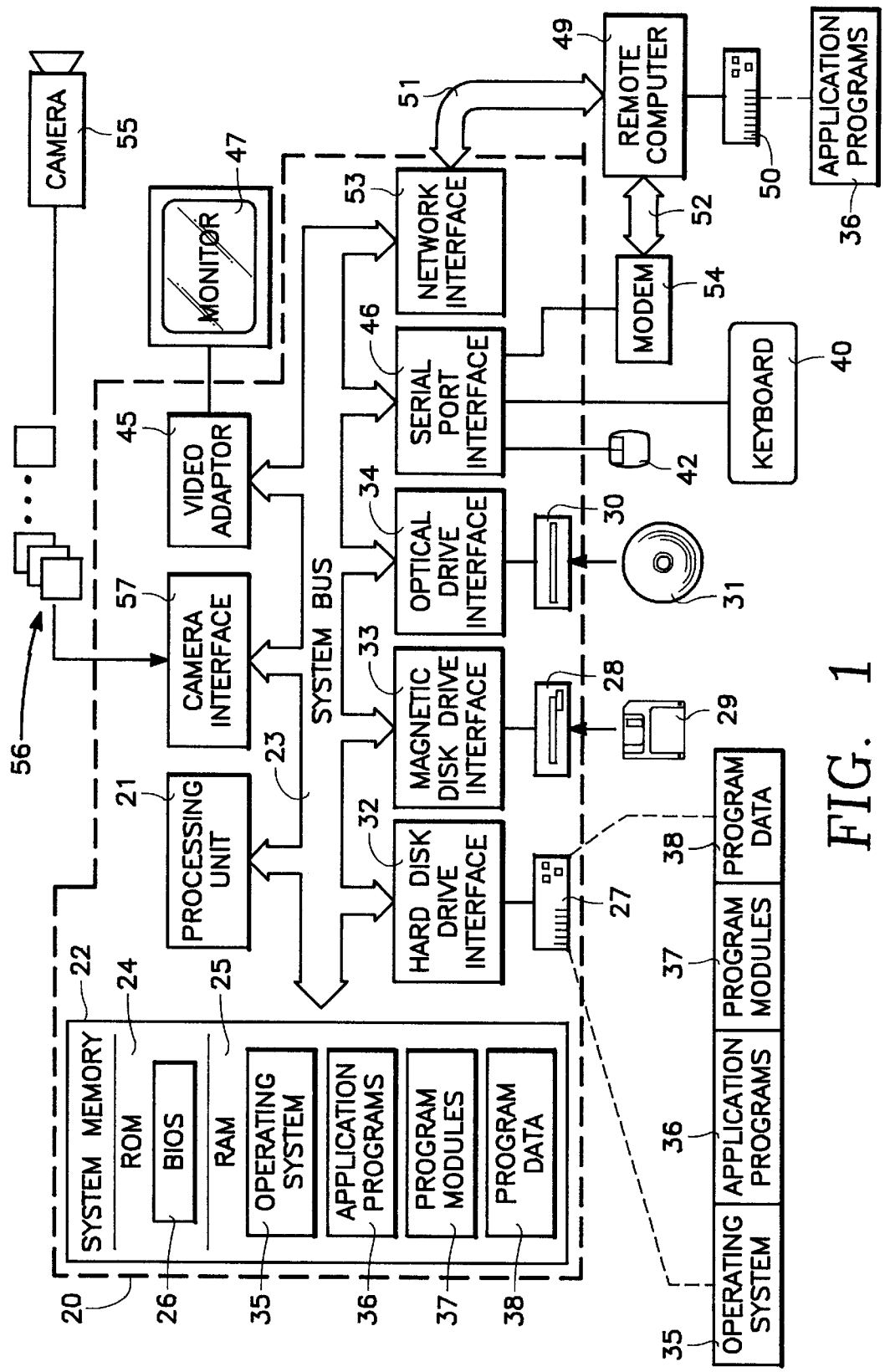
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
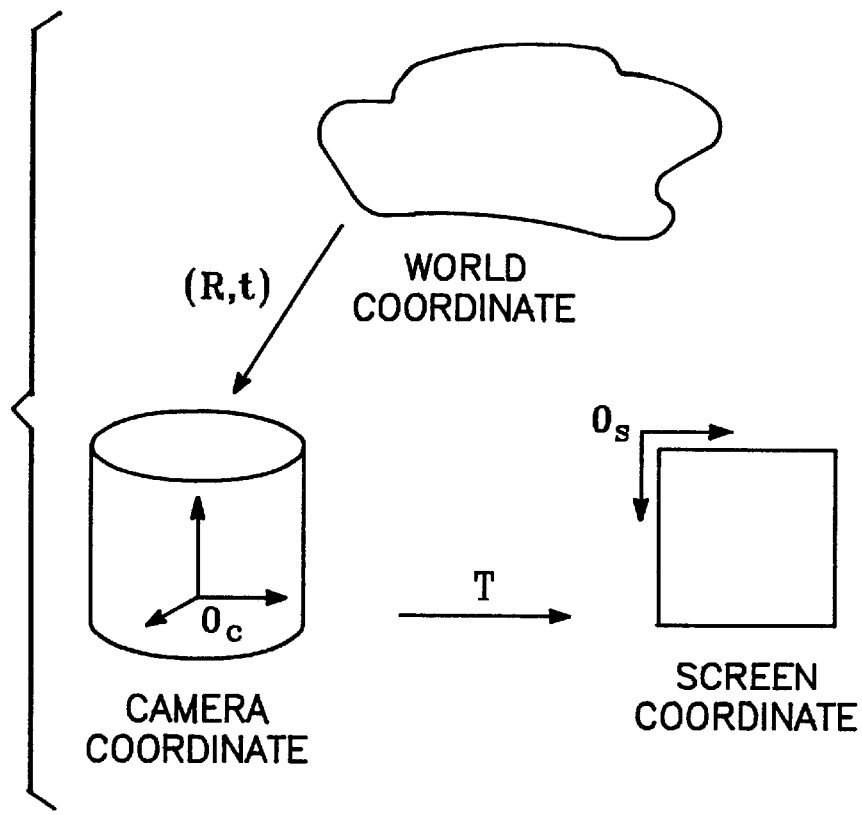
FIG. 2 is a diagram graphically depicting the various coordinate systems employed with the present invention.

The exemplary operating environment having now been discussed, the remaining part of this description section will be devoted to a description of the program modules embodying the invention and the testing of these modules. Three separate coordinate systems are referred to throughout the following description. As illustrated in FIG. 2, the first coordinate system is the world coordinate system where the 3D model geometry (planes, lines, vertices) is defined. Coordinates in this first system will be referred to as 3D scene coordinates. The second coordinate system is the "2D" camera coordinate system associated with a panoramic view of the 3D scene to be modeled, hereinafter referred to as panorama or panoramic view coordinates. The panorama coordinates are referred to as being 2D because each point on the panorama has only two degrees of freedom because its distance from the camera is not known. The third coordinate system is the screen coordinate system associated with a screen image (such as one appearing on the computer monitor 47 of FIG. 1) of the panoramic view employed as a user interface. It is noted that the screen image can be zoomed and rotated via conventional methods to facilitate user interaction.

The 3D model is represented by a set of connected planes and their associated points and lines. Each point is represented by its 3D coordinate x. Each line is represented by its line direction m and points on the line. Each plane is characterized by its normal n and its plane distance d, and/or its vertex point locations. The plane distance is defined as the distance from the 3D coordinate origin to a plane along a line normal to the plane, assuming the plane is infinite. Also note that n·x+d=0 or (n, d)·(x, 1)=0.

A panorama consists of a collection of images and their associated transformations and constitutes a panoramic view of the 3D scene being modeled. A 2D point x' (i.e., on a panorama) represents a ray going through the 2D model origin (i.e., camera optical center $O_c$). Likewise, a 2D line (represented by its line direction m') lies on the "line projection plane" (with normal $n_p'$) which passes through the line and 2D model origin (FIG. 2). Therefore, a line direction in a 2D model cannot be uniquely determined by just two points.

Figure 3:
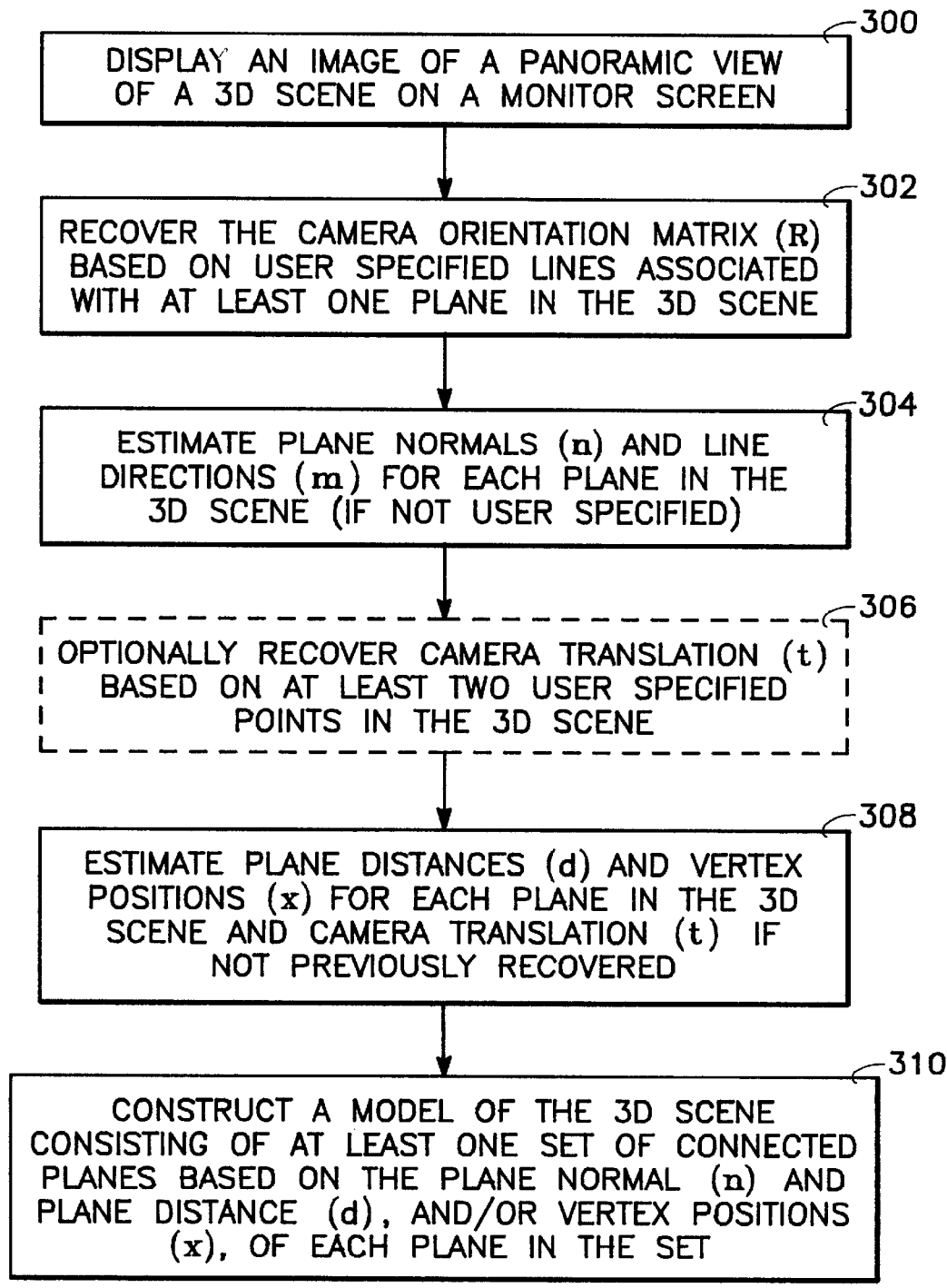
FIG. 3 is a block diagram of an overall process for constructing a model of a 3D scene from a panoramic view of the scene according to the present invention.

Many geometric constraints exist in real scenes. For example, there may be known features like points, lines, and planes. Or there may be known relationships such as parallel and vertical lines and planes, points on a line or a plane. Some of these constraints are bilinear. For example, a point on a plane is a bilinear constraint in both the point location and the plane normal. However, plane normals and line directions can be recovered without knowing plane distance and points. Thus, it is possible to decouple the modeling process into several linear steps. As illustrated in FIG. 3, the high-level structure of the modeling process involves the steps of:

- displaying the image of the panoramic view of a 3D scene on the screen of a computer monitor (step 300);
- recovering a camera orientation matrix (R) associated with the panoramic view from user-designated lines and line directions (step 302);
- estimating plane normals (n) and line directions (m) using the camera orientation matrix (step 304);
- optionally recovering camera translation (t) from user-specified points (step 306);
- estimating plane distances (d) and vertex point locations (x), as well as the camera translation if not previously recovered, using the estimated plane normals and line directions (step 308);
- constructing a model of the 3D scene based on the previously estimated parameters (step 310).

These steps are explained in detail in the next sections.

1. Recovering the Camera Orientation Matrix (R)

This section discusses how to recover the camera orientation matrix (R) from user-designated lines and line directions. The camera orientation matrix describes the relationship between the 2D model (panorama coordinate system) and the 3D model (world coordinate system).

Figure 4C:
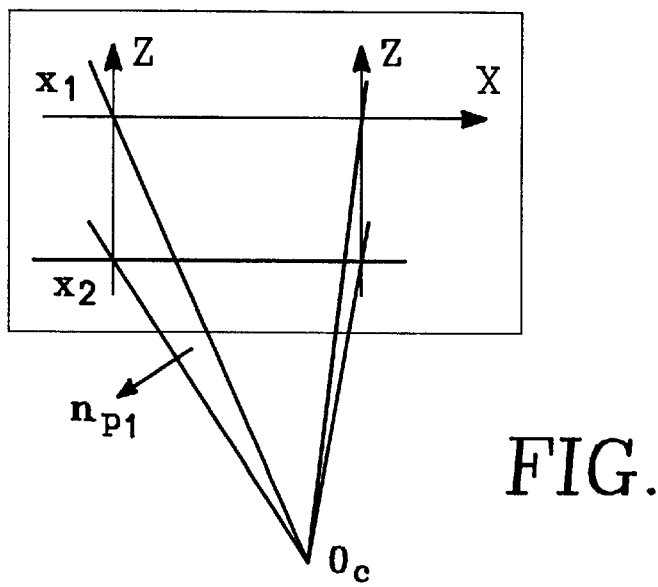
FIG. 4C is a diagram graphically depicting projection planes formed by user-specified lines on a plane in the panoramic view and the camera center of the panoramic view.
Figure 4A:
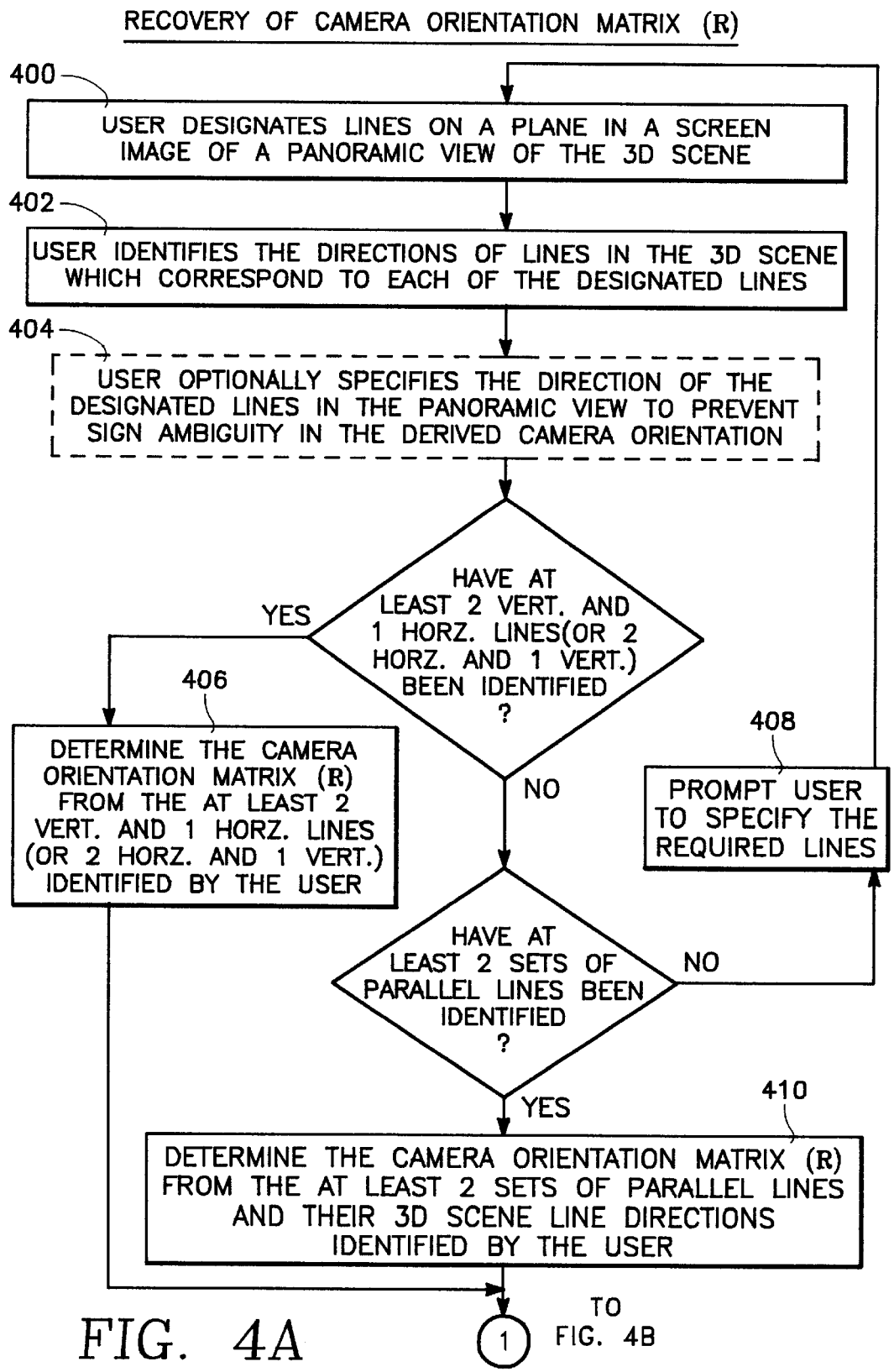

Referring to FIGS. 4A and 4B, the camera orientation matrix is generally recovered using lines designated by the user on at least one plane in the screen image (step 400) and the direction of these lines in the 3D scene (step 402). In a preferred embodiment of the present invention, a user designates a line on the screen image by specifying two points of the line, preferably the end points. A line appears between the specified points in the screen image for the benefit of the user. As stated previously, the user is also required to identify the direction the designated lines would have in the 3D scene being modeled. This is readily accomplished given the abundance of known vertical and horizontal lines associated with man-made structures in a real world 3D scene. For example, one can easily draw several vertical lines at the intersections of walls and mark them to be parallel to the Z axis of the world coordinate system.

1.1 Determining the Camera Orientation Matrix (R) from Two Vertical Lines & One Horizontal Line (Or Two Horizontal & One Vertical)

Figure 5A:
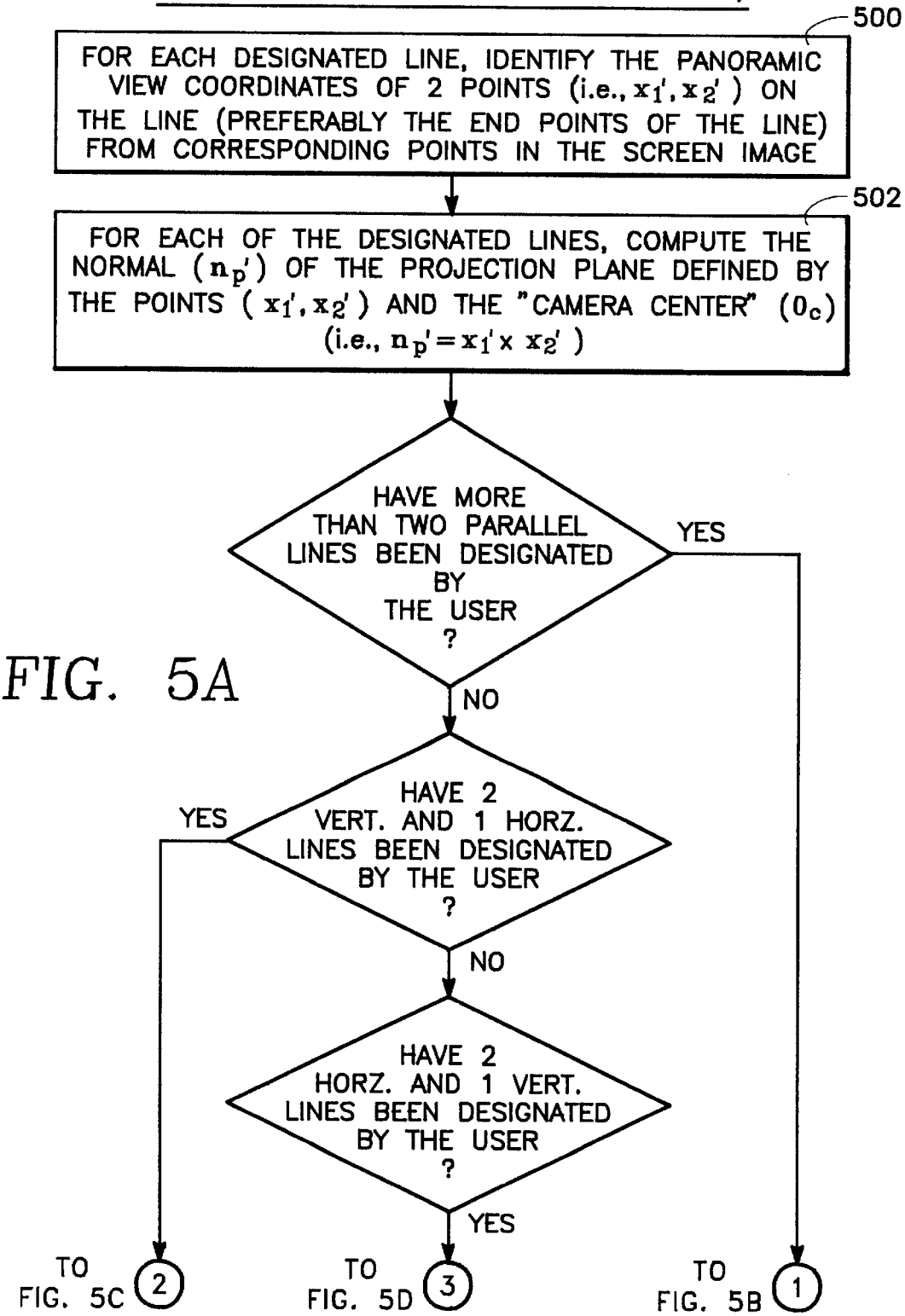
FIGS. 5A through 5D are block diagrams of a process for accomplishing the sub-module for determining the camera orientation matrix using at least two user-specified vertical lines and one horizontal line (or two horizontal and one vertical) associated with the process of FIGS. 4A & 4B.

Referring to FIG. 4A, given that at least two 3D scene vertical lines and a 3D scene horizontal line are designated on a plane of the screen image by the user, the camera rotation matrix can be recovered (step 406). Each line forms a projection plane (with normal $n_p'$) through the camera origin, as depicted in FIG. 4C. Referring to FIG. 5A, the panorama coordinates of two points ($x_1'$, $x_2'$) on each line designated by the user in the screen image are first identified from the corresponding points in the screen image (step 500). Preferably, these two points are the end points of the line. It is noted that the conversion between screen image coordinates and panorama coordinates is straight forward process. If a point (e.g., a pixel) has a screen image coordinate of (u, v, 1), its corresponding 2D point in the panoramic view is represented by (u, v, f), where f is the camera focal length.

Given the two points $x_1'$ and $x_2'$ on each line, the projection plane normals ($n_p'$) can be computed by the cross product $n_p'=x_1' \times x_2'$ (step 502). The length of $n_p'$ is a good confidence (or certainty) measure of the normal $n_p'$.

Let the camera orientation matrix $(R)=[r_x r_y r_z]$. Each vertical line parallel to the Z axis (and the plane formed with the origin) gives a constraint $n_p' \cdot r_z=0$. From two known vertical lines, $n_{p1}' \cdot r_z=0$, and $n_{p2}' \cdot r_z=0$, thus $r_z=n_{p1}' \times n_{p2}'$. Accordingly, the Z-axis element $(r_z)$ of the camera orientation matrix can be computed using the projection plane normals for the two user-designated vertical lines (step 508), as shown in FIG. 5C. Note that there is a sign ambiguity for the recovered $r_z$.

With a known horizontal line of the 3D scene (e.g., parallel to the X axis), there is a constraint on $r_x$, i.e., $n_{pj}' \cdot r_x=0$. Thus, the X-axis element $(r_x)$ of the camera orientation matrix can be computed using the previously derived Z-axis element $(r_z)$ and the projection plane normal associated with the user-designated horizontal line (step 510), i.e. $r_x=r_z \times n_{pj}'$ because $r_z \cdot r_x=0$. Again there is a sign ambiguity for the recovered $r_x$. Finally, the Y-axis element $(r_y)$ can be computed from the previously derived Z-axis $(r_z)$ and X-axis $(r_x)$ elements, i.e. $r_y=r_z \times r_x$ to complete the camera orientation matrix (step 512).

The camera orientation matrix can also be computed if two horizontal lines (e.g., parallel to the X axis) and a vertical line are known. As shown in FIG. 5D, the X-axis element $(r_x)$ of the camera orientation matrix can be computed using the projection plane normals for two user-designated horizontal lines (step 514). Note again that there is a sign ambiguity for the recovered $r_x$. The Z-axis element $(r_z)$ of the camera orientation matrix can then be computed using the previously derived X-axis element $(r_x)$ and the projection plane normal associated with the user-designated vertical line (step 516), i.e. $r_z=r_x \times n_{pj}'$. Again there is a sign ambiguity for the recovered $r_z$. Finally, the Y-axis element $(r_y)$ can be computed from the previously derived X-axis $(r_x)$ and Z-axis $(r_z)$ elements, i.e. $r_y=r_x \times r_z$ to complete the camera orientation matrix (step 518).

Figure 6:
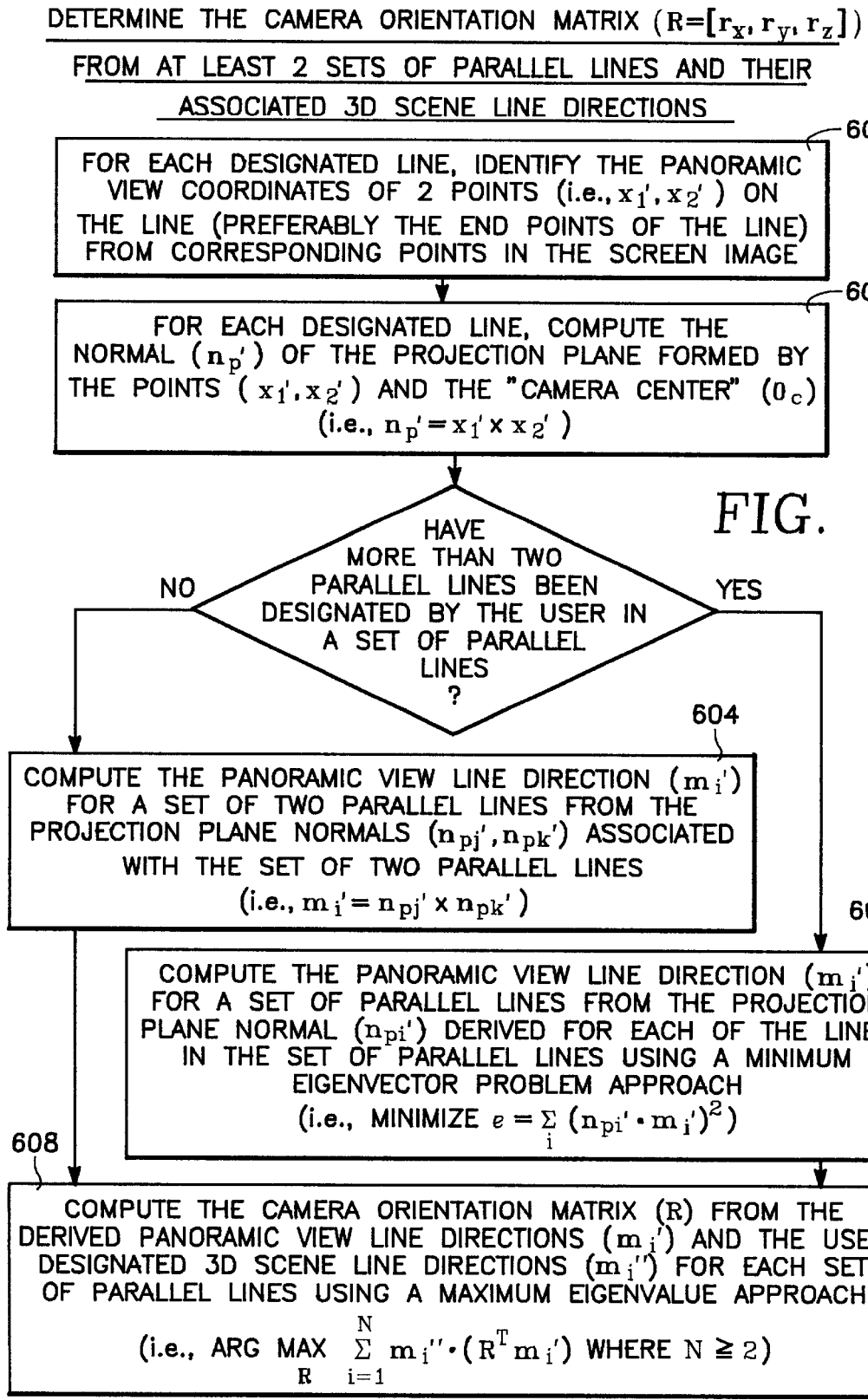
FIG. 6 is a block diagram of a process for accomplishing the sub-module for determining the camera orientation matrix using at least two sets of user-specified parallel lines and their user-specified 3D scene line directions associated with the process of FIGS. 4A & 4B.

1.2 Determining the Camera Orientation Matrix (R) from Two Sets of Parallel Lines & Their Associated 3D Scene Line Directions Referring to FIG. 4A once again, given the user designates in the screen image at least two sets of parallel lines and identifies the direction of these lines in the 3D scene, the camera rotation matrix can be recovered (step 410). FIG. 6 shows how this is accomplished using all constraints available and a unit quaternion approach. First, the panorama coordinates of two points $(x_1', x_2')$ on each of the parallel lines designated by the user in the screen image are identified from the corresponding screen image points (step 600). Here again, it is preferred the points correspond to the end points of lines. Given the two points, the projection plane normal $(n_p')$ for each line can be computed, i.e. $n_p'=x_1' \times x_2'$ (step 602). As shown above in the case where two vertical or horizontal lines were designated, given a pair of parallel lines with "line projection plane" normals as $n_{pj}'$ and $n_{pk}'$, the line direction $m_i'$ can be estimated as $n_{pj}' \times n_{pk}'$ (step 604). Rather than normalizing $m_i'$, it can be left un-normalized since its magnitude denotes a confidence in this measurement. Given the user-designated true line directions $m_i''$ in the world coordinate and the derived panorama line directions $(m_i')$, the camera orientation matrix estimation can be formulated as:

$$\arg \max_R \sum_{i=1}^{N} m_i'' \cdot (R^T m_i') \qquad (1)$$

with $N \geq 2$, which leads to a maximum eigenvalue problem using unit quaternion (step 608).

However, the resulting camera rotation R can still be ambiguous due to the sign ambiguities in line directions $m'$.

Figure 5B:
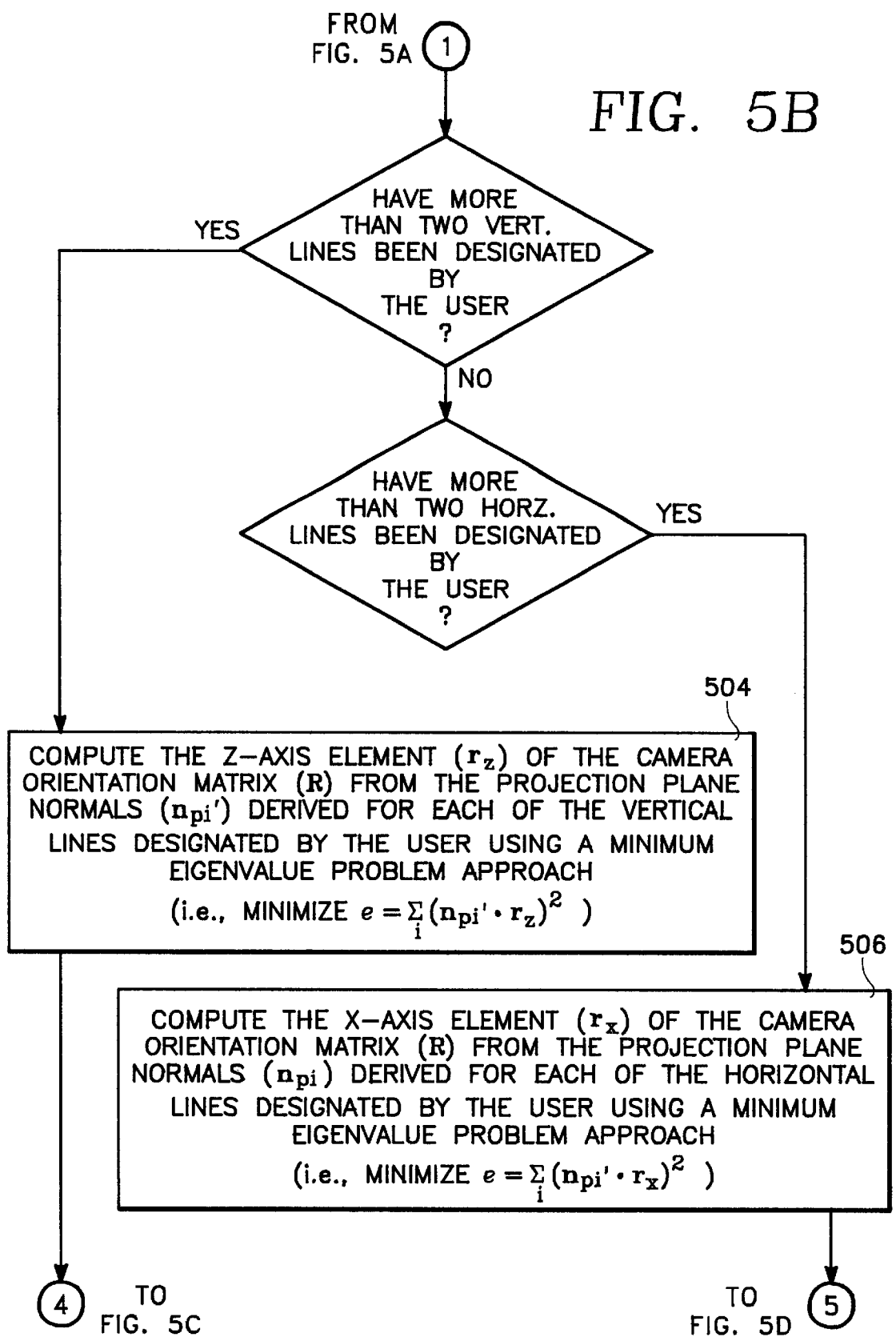
Figure 5C:
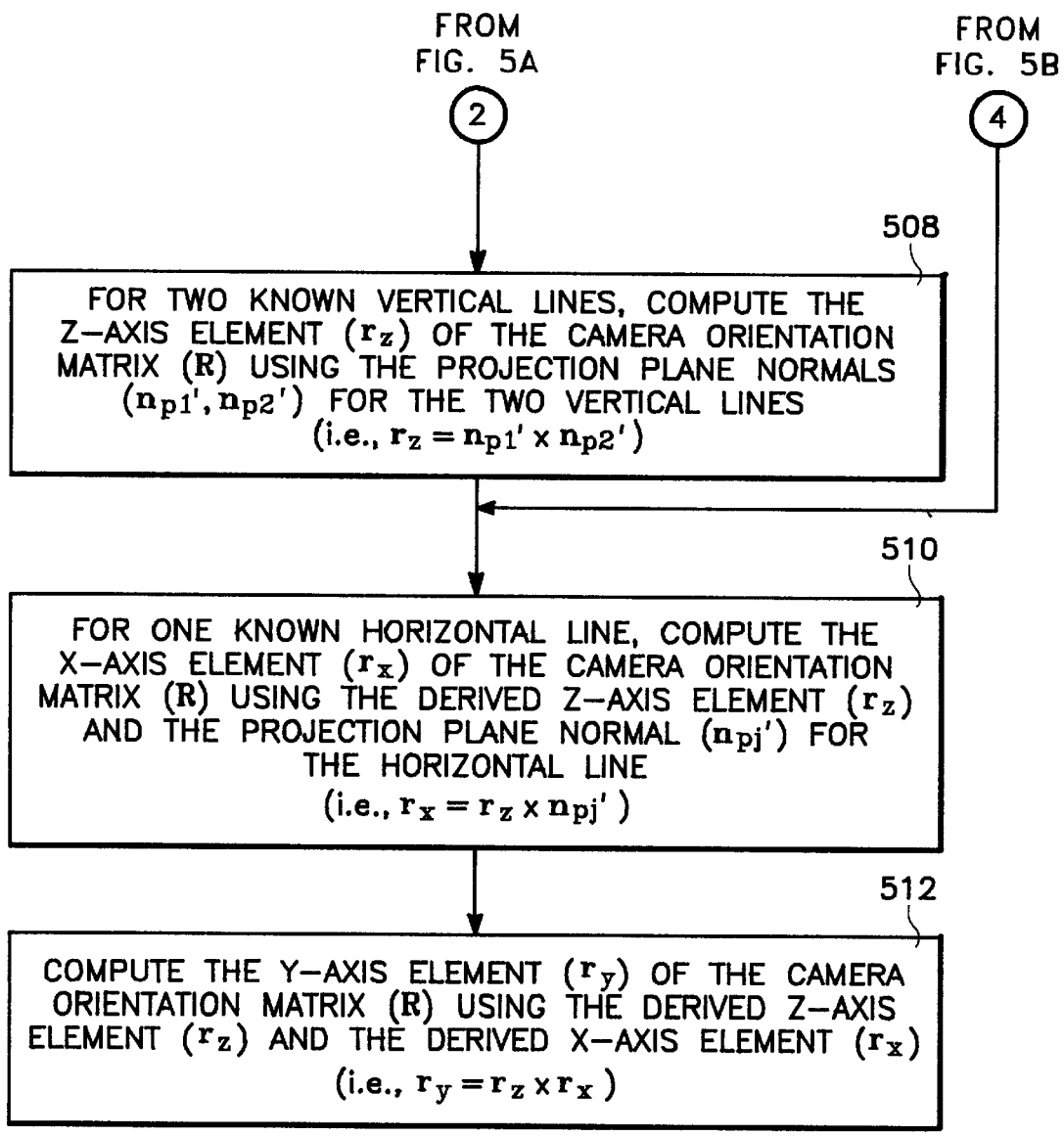
Figure 5D:
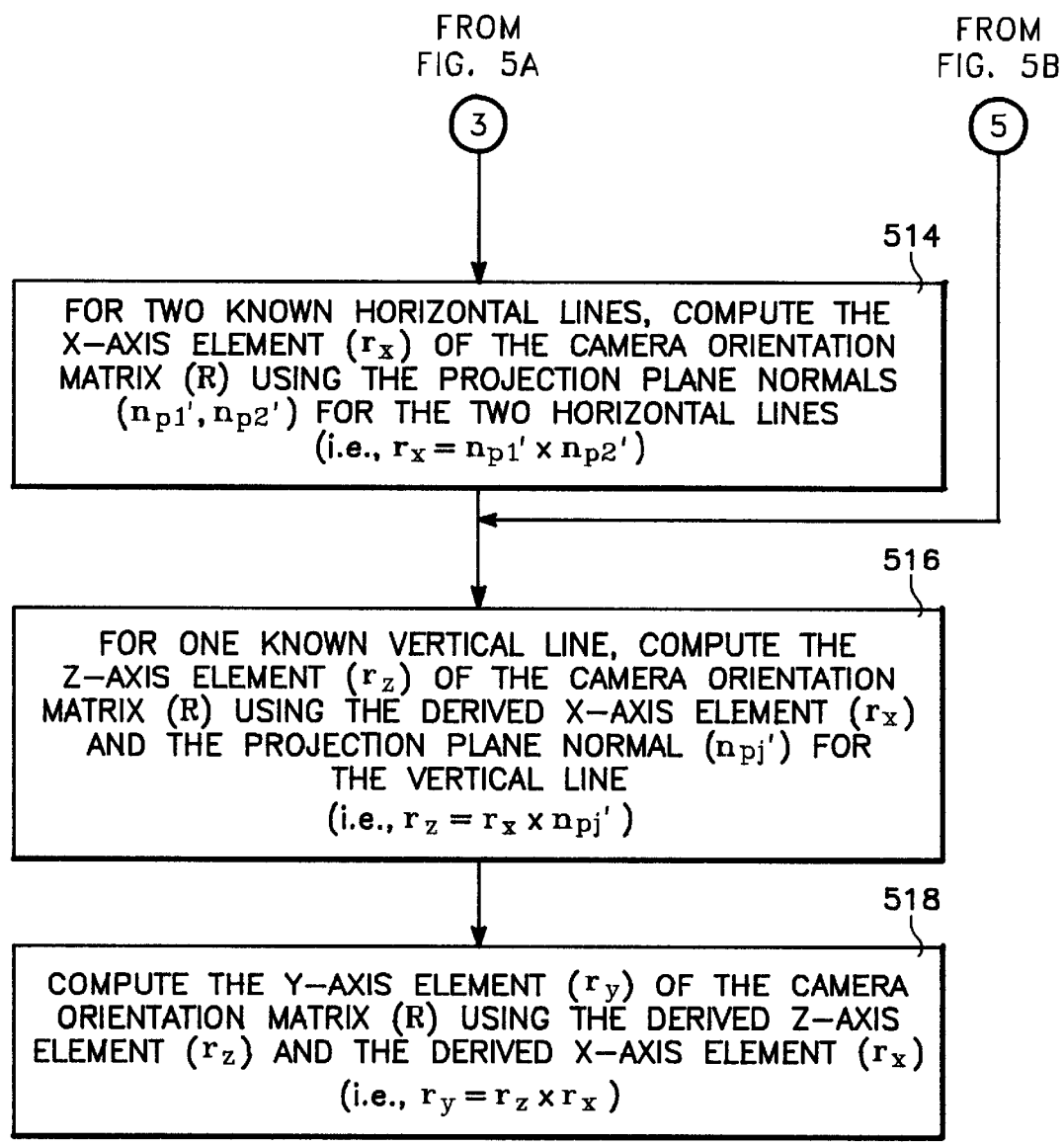

1.3 Determining the Camera Orientation Matrix (R) When More Than Two Parallel Lines are Designated in a Set of Parallel Lines In cases where the user designates more than two parallel lines in a set of parallel lines, a modified procedure can be employed to estimate the camera orientation matrix. For example, if the user were to designate three or more lines on a plane in the screen image and identify all as being vertical lines in the 3D scene, the Z-axis element $(r_z)$ of the camera orientation matrix can be formulated as a standard minimum eigenvalue problem, i.e., $$e = \sum_i (n_{pi}' \cdot r_z)^2 \qquad (2)$$

as shown in step 504 of FIG. 5B. The X-axis and Y-axis elements of the camera orientation matrix are then computed as described previously.

Similarly, if the user designates three or more horizontal lines, the X-axis element of the camera orientation matrix can be formulated as a standard minimum eigenvalue problem using:

$$e = \sum_i (n_{pi}' \cdot r_x)^2 \qquad (3)$$

as shown in step 506 of FIG. 5B. Again, the Z-axis and Y-axis elements of the camera orientation matrix are then computed as described previously.

Finally, the line direction recovery step associated with estimating the camera orientation matrix from at least two sets of parallel lines and their associated 3D scene line directions can be formulated as a standard minimum eigenvector problem. Because each "line projection plane" is perpendicular to the line (i.e., $n_{pi}' \cdot m'=0$), it is desired to minimize:

$$e = \sum_i (n_{pi}' \cdot m')^2 = m'^T \left( \sum_i n_{pi}' n_{pi}'^T \right) m' \qquad (4)$$

as shown in step 606 of FIG. 6. This is equivalent to finding the vanishing point of the lines [CW90]. It is noted that the parallel lines in a set of lines need not all be on the same plane in the 3D scene. Rather, they could be from more than one plane.

The foregoing error minimization approaches to estimating the camera orientation matrix have significant advantages. First, because the camera orientation matrix computation involves extracting data from potentially noisy panoramic images of a 3D scene, using more lines should provide a better estimate. Another advantage is that the sign ambiguity of $n_{pi}'$ can be ignored in the error minimization formulations.

1.4 Resolving the Sign Ambiguities Associated with the Camera Orientation Matrix Elements $(r_x, r_y, r_z)$ In all the methods for estimating the camera orientation matrix discussed so far, there exists a sign ambiguity resulting from the inherent ambiguity in the direction of the projection plane normals. This ambiguity arises because the user is only required to designate lines in the screen image by specifying two points. These points can be specified in any order, thus the resulting line could have either of two directions. The ambiguity issue is preferably resolved in one of two ways. First, as shown in optional step 404 of FIG. 4A, the user could specify the direction of the designated lines in the panoramic view, thereby preventing the sign ambiguity in the computed projection plane normals. However, this approach is somewhat onerous from the user's perspective as many lines may be specified in modeling a 3D scene in accordance with the present invention. Referring to FIG. 4B, a better approach would be to prompt the user to identify at least two points (e.g. the vertices of a plane) in the screen image and provide their actual 3D scene coordinates (step 412). The 3D coordinates of the designated points are then computed by obtaining their panoramic view coordinates from the screen image and projecting the points into the 3D scene using the previously estimated camera orientation matrix (step 414). The next step 416 of the process is to compare the computed 3D coordinates of the points to the user-specified 3D coordinates. If any of the computed coordinate indices have a different sign from the user-specified coordinates, the sign of the affected camera orientation matrix element is reversed (step 418), thereby resolving any sign ambiguity in the matrix.

2. Estimating Plane Normals

Once the camera orientation matrix has been estimated, the scene geometry (i.e., points, lines, and planes) can be recovered. Because of the bilinear nature of some constraints (such as points on planes), it is possible to compute plane normals (n) before solving for plane distances (d) and points (x). Of course, rather than computing the plane normal of every plane, at least some may be designated by the user. This could be done by the user identifying a plane in the screen image and specifying the direction of the normal of the corresponding plane in the 3D scene. For example, in a preferred scenario the user might specify that the normal of such a plane is directed north, south, up, down, or otherwise. The computer program would interpret these directions and convert them into the 3D coordinate system for further processing. If the user does not designate a normal for a plane in the 3D scene, it can be computed by finding two line directions on the plane.

Figure 7A:
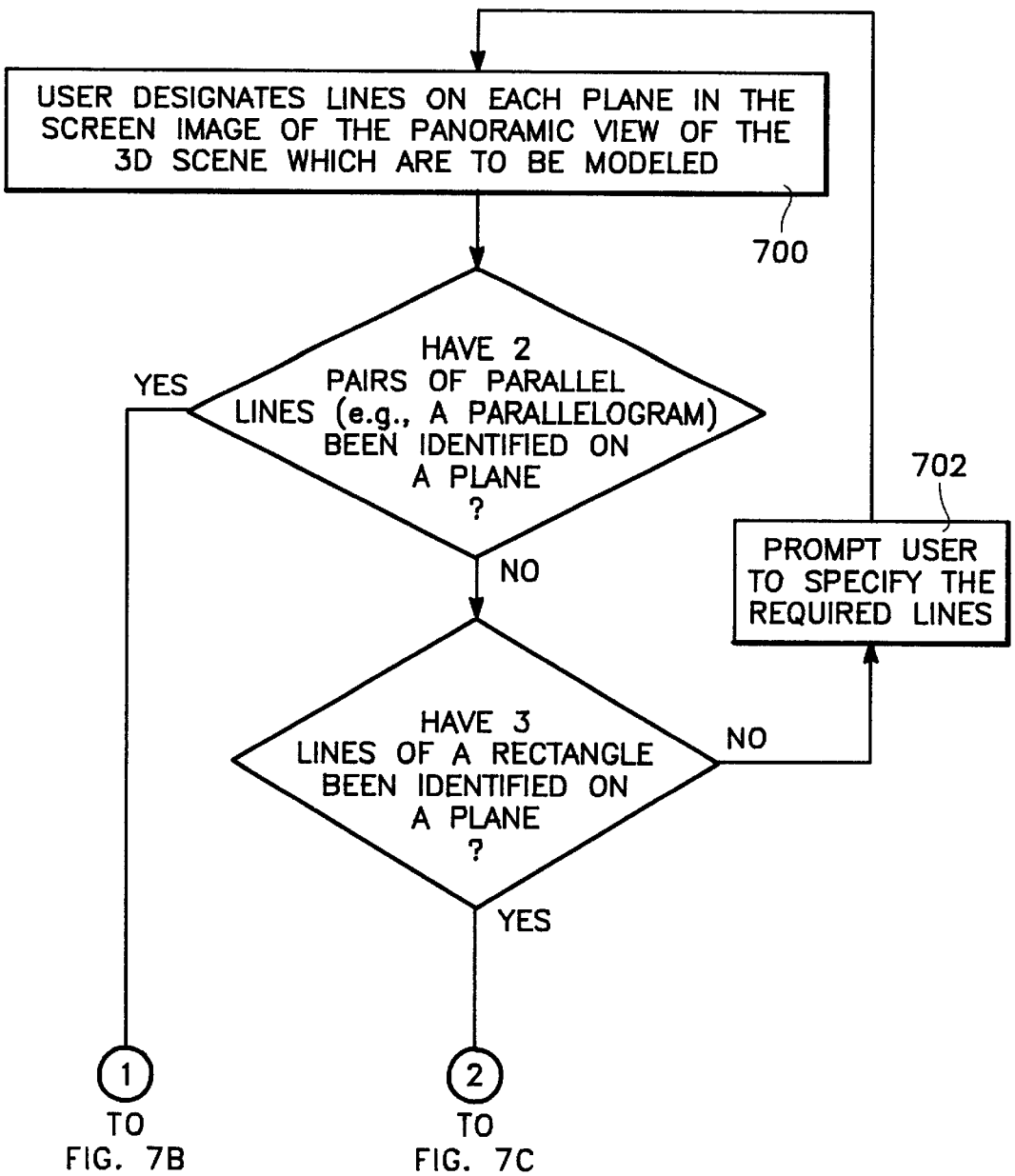
Figure 7B:
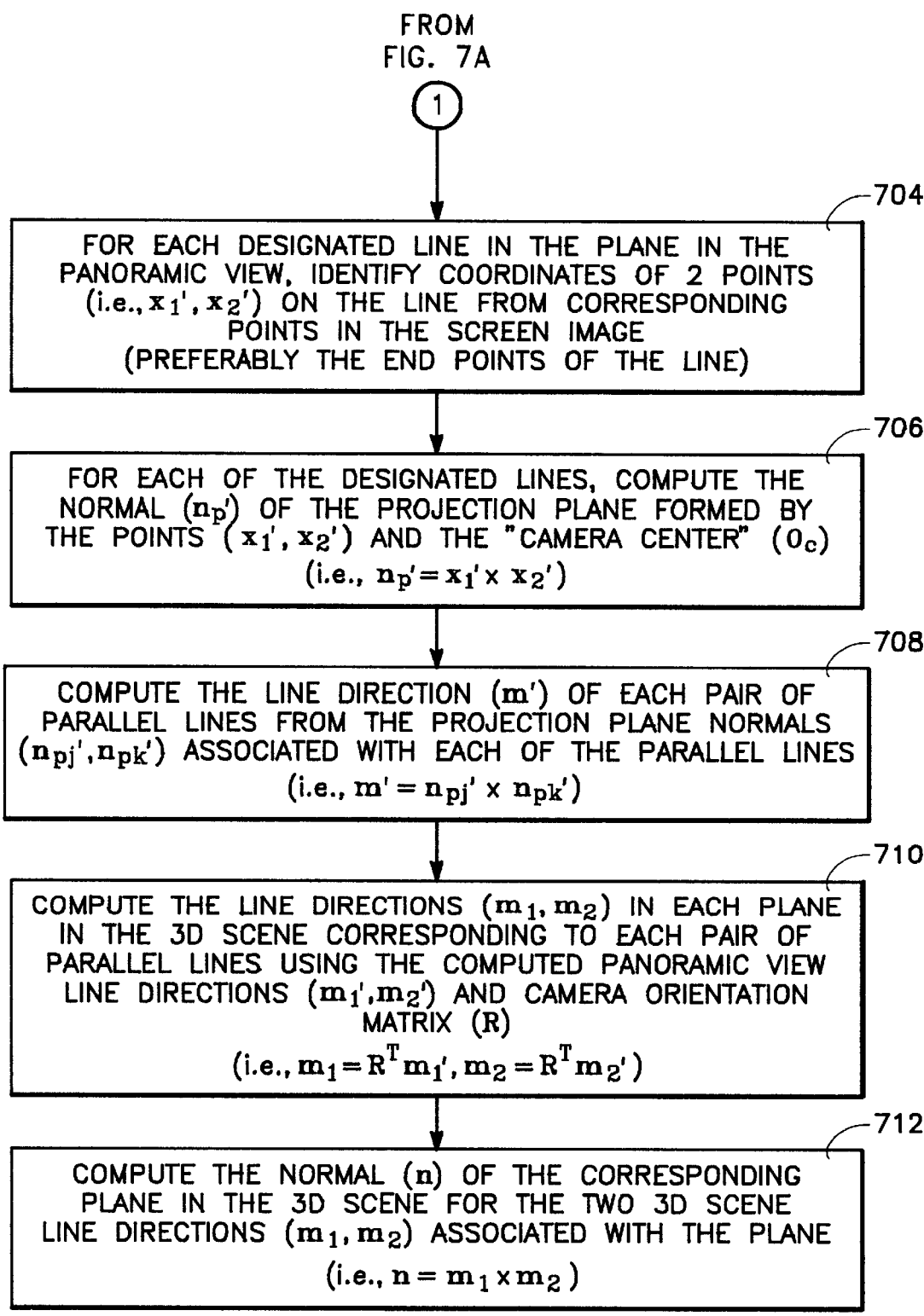

Referring to FIGS. 7A & 7B, the first step 700 in a preferred process for estimating the plane normals involves the user designating lines on each plane in the screen image that is to be modeled. This is accomplished as before with the user specifying two points of the line in the screen image—preferably the end point of the line. Specifically, if the user designates two pairs of parallel lines (e.g., a parallelogram) on a plane in the screen image, the plane normal can be recovered. First, the panoramic view coordinates of the two user-specified points ($x_1'$, $x_2'$) for each designated line are taken from their corresponding screen image coordinates (step 704). Next, the projection plane normal ($n_p'$) of each designated line is computed, i.e., $n_p' = x_1' \times x_2'$ (step 706). From the projection plane normals, the line direction (m') of each pair of the parallel lines on each plane being modeled can be computed, i.e., $m' = n_{pj}' \times n_{pk}'$ (step 708). Using the estimated camera orientation matrix (R) and the computed panoramic view line directions ($m_1'$, $m_2'$) associated respectively with the two pairs of parallel lines designated by the user on planes being modeled, the 3D scene line directions ($m_1$, $m_2$) corresponding to the panoramic view line directions can be computed (step 710) as follows:

$$m_1 = R^T m_1' \text{ and } m_2 = R^T m_2' \quad (5)$$

From the two 3D scene line directions $m_1$ and $m_2$ on each plane, the respective plane normals can be computed as $n = m_1 \times m_2$ (step 712).

A rectangle is a special case of parallelogram. The plane normal of a 3D scene plane can also be recovered from three lines of the rectangle, as illustrated in FIGS. 7C and 7D. One line direction $m_1$ can be obtained from the two parallel lines designated by the user on a plane in the screen image as part of the aforementioned three lines of the rectangle. As illustrated in steps 714, 716, 718, and 720 of FIG. 7C, this is accomplished in the same way that the line direction ($m_1$) was computed in the previous discussion directed at finding the plane normal using two pairs of parallel lines. In the next step 722 of the process, the line direction ($m_2$) of the line in the 3D scene corresponding to the third (non-parallel) line designated by the user in the screen image of the plane can be found using the other, previously computed line direction ($m_1$) of the plane and the 3D scene projection of the projection plane normal ($n_{p2}'$) associated with the third line in the panoramic view, i.e., $m_2 = m_1 \times n_{p2}$ since $m_1 \cdot m_2 = 0$ and $n_{p2} \cdot m_2 = 0$. The projected normal ($n_{p2}$) is obtained using the camera orientation matrix via the relationship $n_{p2} = R^T n_{p2}'$. As before, the plane normal of the 3D scene plane is computed using $n = m_1 \times m_2$ (step 724).

Using the techniques described above, the surface orientation of an arbitrary plane (e.g., tilted ceiling) can be recovered provided either a parallelogram or rectangle can be "drawn" on the plane in the screen image.

3. Prompting the User to Designate Additional Lines

Up to this point it has been assumed the user has designated a sufficient number of lines on the planes in the screen image to allow both the camera orientation matrix to be determined, and the line directions and plane normals to be derived for each plane that is to be modeled. For example, in the case of estimating the camera orientation matrix, the user must at least designate two vertical lines and one horizontal line associated with the 3D scene (or two horizontal and one vertical) on a plane in the screen image, or at least two sets of parallel lines associated with the 3D scene and their 3D scene directions. Further, in the case of deriving the line directions and plane normals of each plane being modeled, the user must at least designate two sets of parallel lines on each plane in the screen image or alternatively at least three lines of a rectangle. Therefore, it is preferred that the process embodying the present invention include the capability to ascertain if a sufficient number of lines has been specified in accordance with the foregoing minimum requirements, and prompt the user via an appropriate screen image to designate additional lines (step 408 of FIG. 4A and step 702 of FIG. 7A), whenever a sufficient number of lines has not been supplied.

4. Recovering Camera Translation

A point on a 2D model (panorama) represents a ray from the camera origin through the pixel on the image. This constraint can be expressed in different ways. For example, each point in 3D model can be related to its 2D counterpart by a scale k, i.e., $$(x-t) = k R^T x' \quad (6)$$

Figure 8:
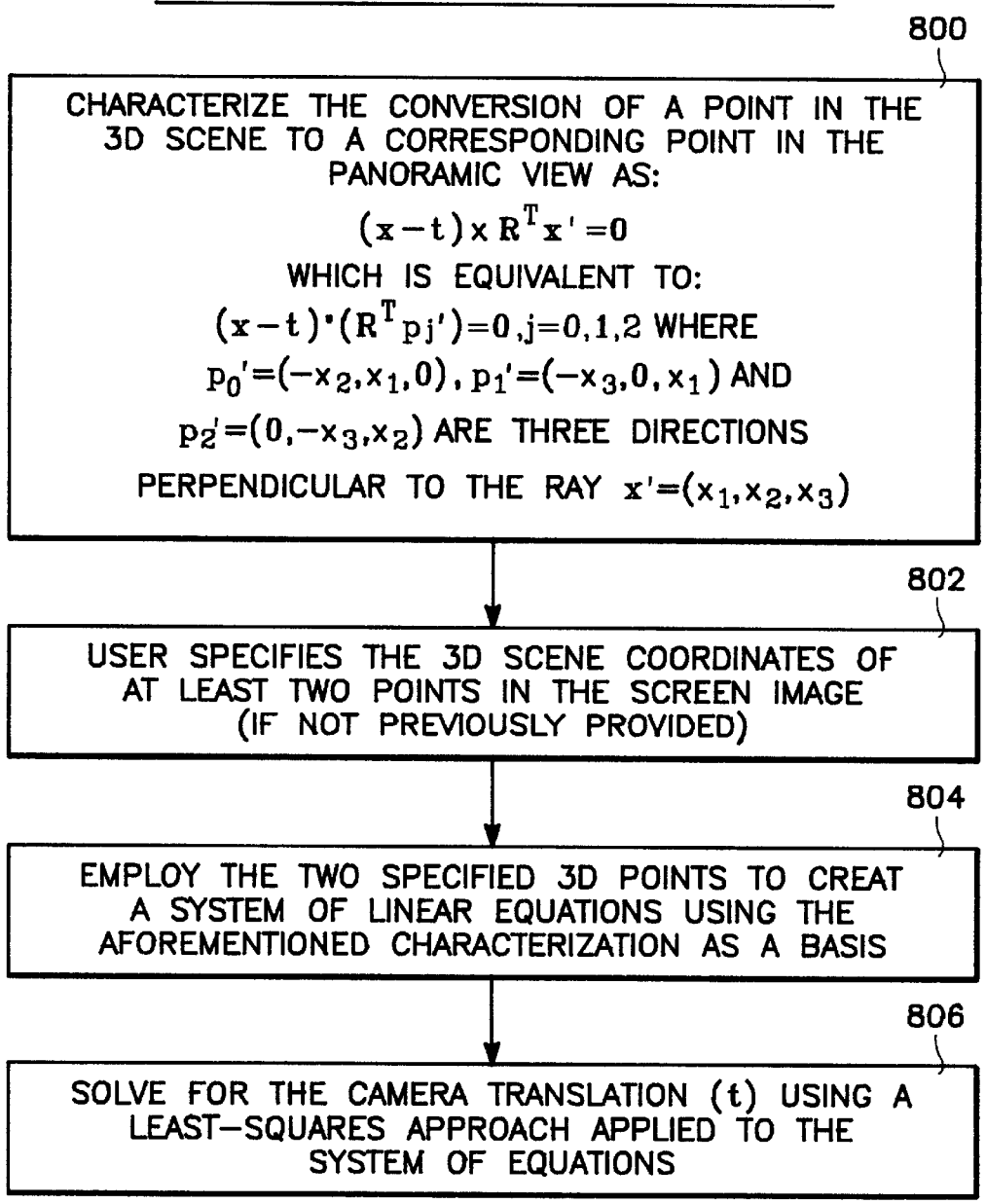
FIG. 8 is a block diagram of a process for accomplishing the camera translation recovery program module of the overall process of FIG. 3.

Alternatively, the 3D point should lie on the ray represented by the 2D point. Therefore, referring to step 800 of FIG. 8, the conversion of the 3D scene coordinates of a point in the 3D scene to the panoramic view coordinates of a corresponding point in the panoramic view can be characterized by:

$$(x-t) \times R^T x' = 0 \quad (7)$$

which is equivalent to $$(x-t) \cdot (R^T p_j') = 0, \ j=0,1,2 \ldots \quad (8)$$

where $p_0'=(-x_2, x_i, 0)$, $p_1'=(-x_3, 0, x_1)$ and $p_2'=(0, -x_3, x_2)$ are three directions perpendicular to the ray $x'=(x_1, x_2, x_3)$. Note that only two of the three constraints are linearly independent. The third constraint with minimum $\|p_i'\|^2$ can be eliminated. Thus, camera translation t can be recovered as a linear least-squares problem if the user specifies the corresponding 3D scene coordinates of two or more points in the screen image (step 802). This is accomplished by employing the specified 3D point coordinates to create a system of linear equations using the aforementioned conversion characterization (step 804). The camera translation (t) is then found by using a conventional least squares approach applied to the system of equations (step 806). In practice, it is convenient to fix a few points, including the 3D model origin (0, 0, 0). These same points can also be used to eliminate the ambiguities in recovering camera orientation matrix as previously described.

For a single panorama, the camera translation (t) is set to zero if no point in 3D model is given. This implies that the camera coordinate coincides with the 3D model coordinate. It should be pointed out that it is not necessary to recover camera translation independently. Rather, the camera translation can be solved for along with plane distances and points as shown in the next section.

5. Estimating the 3D Model

5.1 Creating a Linear System of Constraint Equations

The model of the 3D scene constructed in accordance with the present invention consists of one or more subsystems (connected components) each represented by a set of connected planes. Each of these sets of connected planes is characterized using a linear system of geometric constraint equations and solved independently. For example, when modeling a room with an object, such as a computer monitor, floating in space and not connected with any wall, the ceiling or floor of the room, the 3D scene consists of two subsystems, i.e. the room itself and the computer monitor. As such the room would be characterized by a system of linear constraint equations and the computer monitor would be characterized by a separate system of linear constraint equations. Each system of equations would then be solved independently and the resulting 3D models combined to model the entire 3D scene.

Figure 9A:
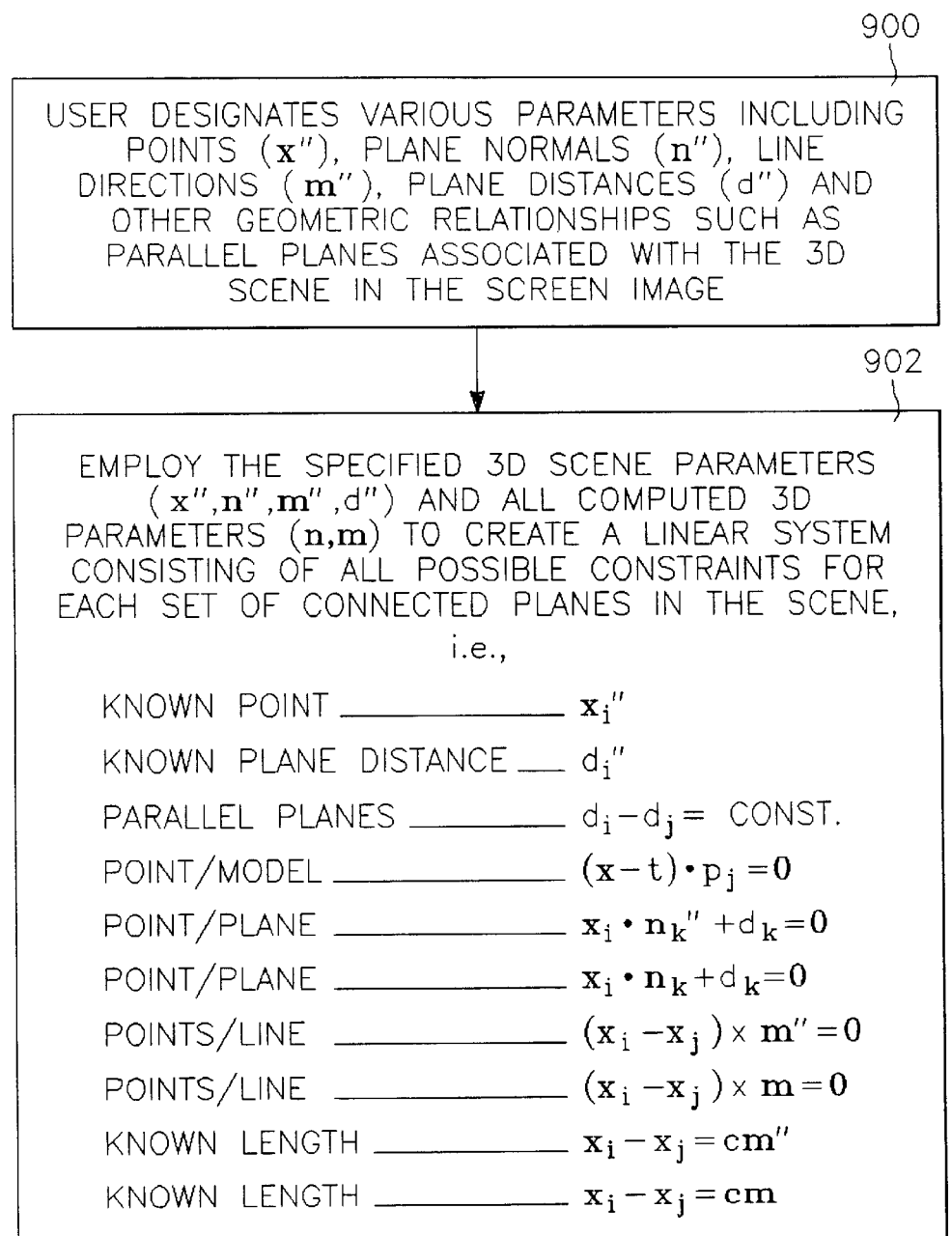
FIGS. 9A through 9D are block diagrams of a process for accomplishing the plane distance, vertex point location, and optional camera translation recovery program module of the overall process of FIG. 3, including steps for characterizing each constraint equation as a hard or soft constraint and decomposing each system of linear constraint equations to ensure its solvability.

Referring to FIG. 9A, each subsystem to be modeled in the 3D scene is characterized by a linear system of geometric constraint equations as follows. Preferably, the user designates 3D scene parameters such as known point locations (x"), plane normals (n"), line directions (m"), or plane distances (d"), as well as other geometric relationships including a designation that two planes are parallel to each other (step 900) in the 3D scene (e.g., opposite walls of a square room). The previously computed 3D plane normals (n) and line directions (m) of each plane in a subsystem are then used to form the linear system of constraint equations for that subsystem, along with the aforementioned user-designated 3D scene parameters (step 902).

Table 1 lists the geometric constraint equations used in a preferred modeling system embodying the present invention. It is noted that here again, the notations x", n", m", and d" are the used to represent user-specified parameters associated with planes of the 3D scene. In addition, the third column designator "n" of Table 1 refers to the number of constrains associated with the equation.

TABLE 1

| Type | Constraint | n |
|---|---|---|
| Known point | $x_i'$ | 3 |
| Known plane Distance | $d_i'$ | 1 |
| ∥ planes | $d_i - d_j$ | 1 |
| Point/model | $(x - t) \cdot p_j = 0$ | 2 |
| Point/plane | $x_i \cdot n_k' + d_k = 0$ or | 1 |
|  | $x_i \cdot n_k + d_k = 0$ | 1 |
| Points/line | $(x_i - x_j) \times m' = 0$ or | 2 |
|  | $(x_i - x_j) \times m = 0$ | 2 |
| Known length | $x_i - x_j = cm'$ or | 3 |
|  | $x_i - x_j = cm$ | 3 |

5.2 Employing Hard and Soft Constraints Designations

The foregoing preferred process, which was the subject of the previously mentioned co-pending application entitled INTERACTIVE CONSTRUCTION OF 3D MODELS FROM PANORAMIC IMAGES, produces a system of linear constraint equations that can be solved using a conventional least squares approach to obtain the unknown plane distances and vertex point locations (and possibly the camera translation). This will provide a model of the 3D scene that is sufficiently accurate for many applications. However, as disclosed in the other aforementioned co-pending application entitled INTERACTIVE CONSTRUCTION OF 3D MODELS FROM PANORAMIC IMAGES EMPLOYING HARD AND SOFT CONSTRAINT CHARACTERIZATION AND DECOMPOSING TECHNIQUES it is possible to refine the process to provide a more accurate model. First, it is noted that the process associated with the first co-pending application affords constraints having estimated parameters, which have been based on potentially noisy panoramic images, the same weight as those including typically more accurate user-specified parameters. By giving the constraint equations having user-specified parameters a higher priority when solving for the unknowns, it is believed a more accurate model can be obtained.

Figure 9B:
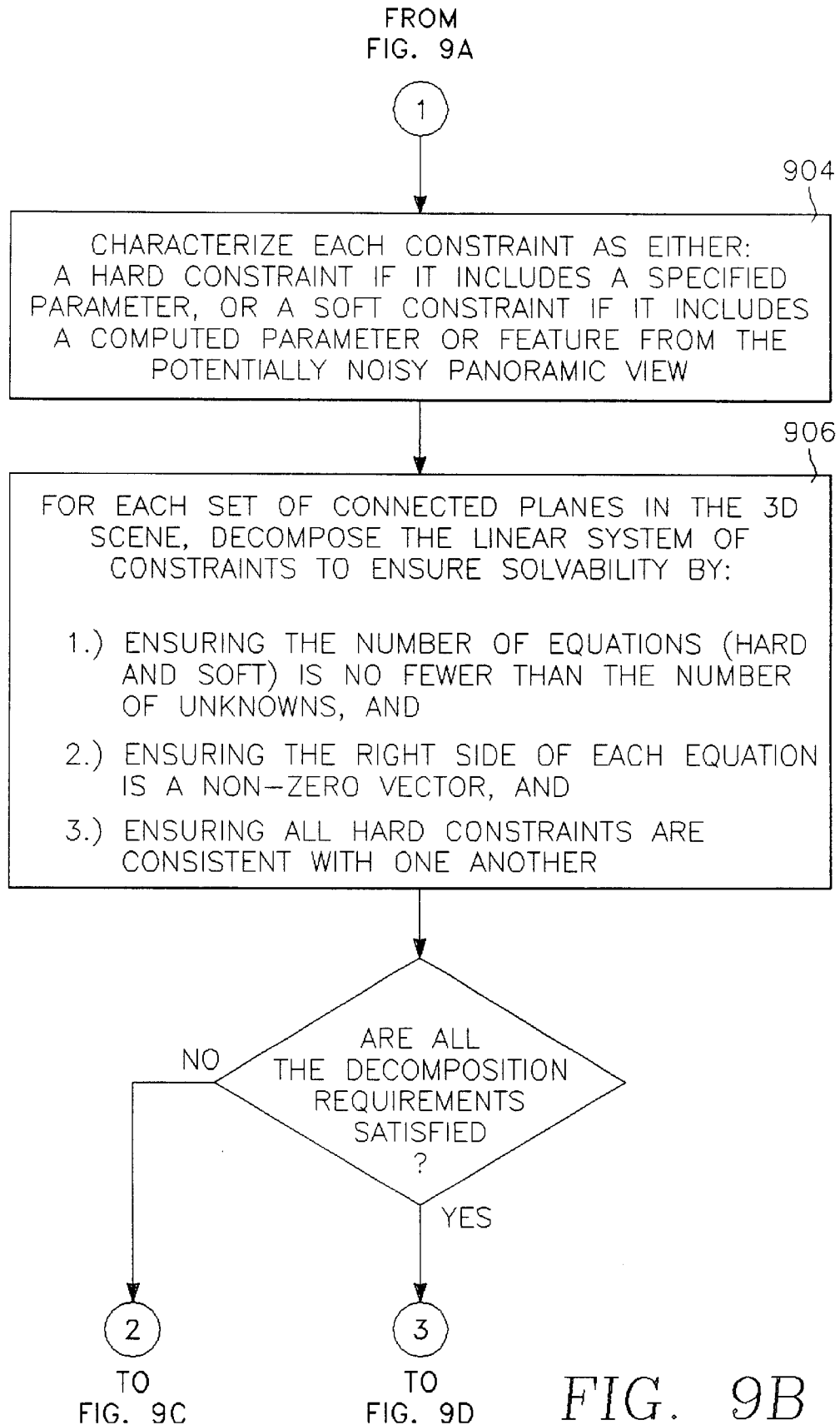

Referring to FIG. 9B, this refinement is accomplished by characterizing a constraint as a hard constraint if it includes a user-specified parameter and a soft constraint if it includes only estimated parameters (step 904). The result is a least squares system with equality constraints.

Table 2 lists the geometric constraints used in a preferred modeling system employing equality constraints. Table 2 is similar to Table 1 except that those constrains associated with the user-specified parameters have been designated as hard constraints and those constraints based on estimated parameters are designated as soft constrains. Again, the notations x", d", m" and n" are used to represent the user-specified parameters.

TABLE 2

| Type | Constraint | n | Soft | Hard |
|---|---|---|---|---|
| Known point | $x_i"$ | 3 | | x |
| Known plane | $d_i"$ | 1 | | x |
| Distance ‖ planes | $d_i - d_j$ | 1 | | x |
| Point/model | $(x - t) \cdot p_j = 0$ | 2 | x | |
| Point/plane | $x_i \cdot n_k" + d_k = 0$ | 1 | | x |
| Point/plane | $x_i \cdot n_k + d_k = 0$ | 1 | x | |
| Points/line | $(x_i - x_j) \times m" = 0$ | 2 | | x |
| Points/line | $(x_i - x_j) \times m = 0$ | 2 | x | |
| Known length | $x_i - x_j = cm"$ | 3 | | x |
| Known length | $x_i - x_j = cm$ | 3 | x | |

As an example of the advantages of the hard-soft classification scheme, consider a point on a plane. If the plane normal $n_k'$ is specified by the user, the constraint $(x_i \cdot n_k' + d_k = 0)$ is considered as hard. This implies that the point has to be on the plane and that only its location can be adjusted. On the other hand, if the plane normal $n_k$ is estimated, the constraint $(x_i \cdot n_k + d_k = 0)$ is considered soft because the inherent inaccuracies involved in the estimation process could result in deriving a point that is not on the plane at all. Thus, an inaccurate model may result if some of the estimated normals have errors.

5.3 Solving the System of Linear Constraint Equations Using an Equality-Constrained Least Squares Approach An equality-constrained least squares approach entails solving the linear system (soft constraints)

$$Aw = b \quad (9)$$

subject to (hard constraints)

$$Cw = q \quad (10)$$

where A is m×n, C is p×n, and w denotes an unknown.

A preferred way to solve the above problem is to use QR factorization [GV96]. Suppose C is of full rank. Let $$C^T = Q \begin{bmatrix} R \\ 0 \end{bmatrix} \quad (11)$$

be the QR factorization of $C^T$ where Q (n×n) is orthogonal, $QQ^T = I$, and R is p×p. Defining $$Q^T w = \begin{bmatrix} w_1 \\ w_2 \end{bmatrix}, AQ = (A_1, A_2) \quad (12)$$

where $A_1$ is m×p, $A_2$ is m×(n-p), $w_1$ is p×1, and $w_2$ is (n-p)×1, $w_1$ can be recovered because R is upper triangular and $$Cw = CQQ^T w = R^T w_1 = q \quad (13)$$

Then $w_2$ can be obtained from the unconstrained least-squares $\|A_2 w_2 - (b - A_1 w_1)\|^2$ because $$Aw - b = AQQ^T w - b \quad (14)$$
$$= A_1 w_1 + A_2 w_2 - b$$
$$= A_2 w_2 - (b - A_1 w_1).$$

Finally $$w = Q \begin{bmatrix} w_1 \\ w_2 \end{bmatrix}.$$

If C is not of full rank, other approaches such as the elimination method [SS97a] can be employed.

Figure 9C:
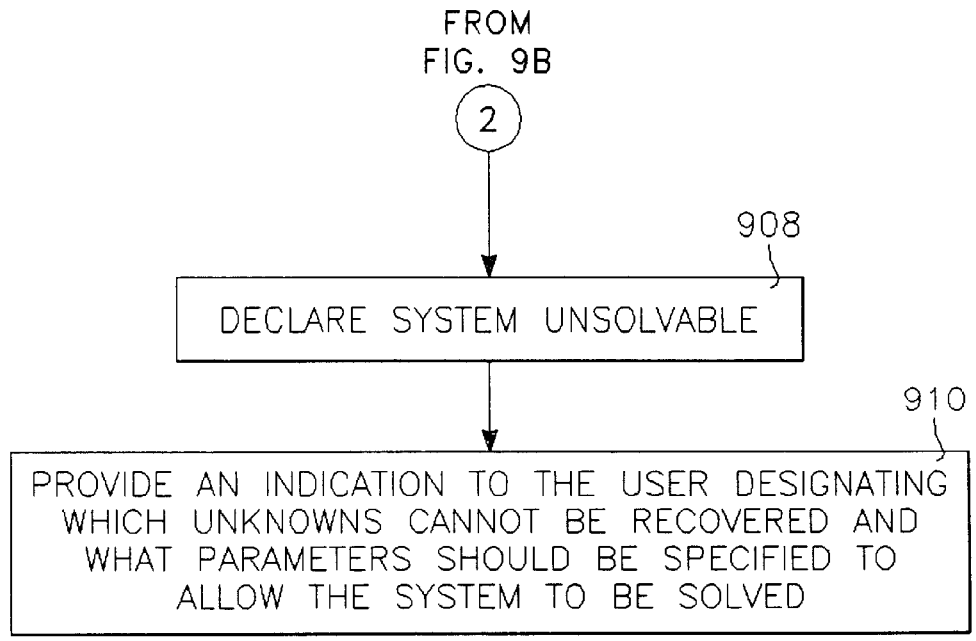
Figure 9D:
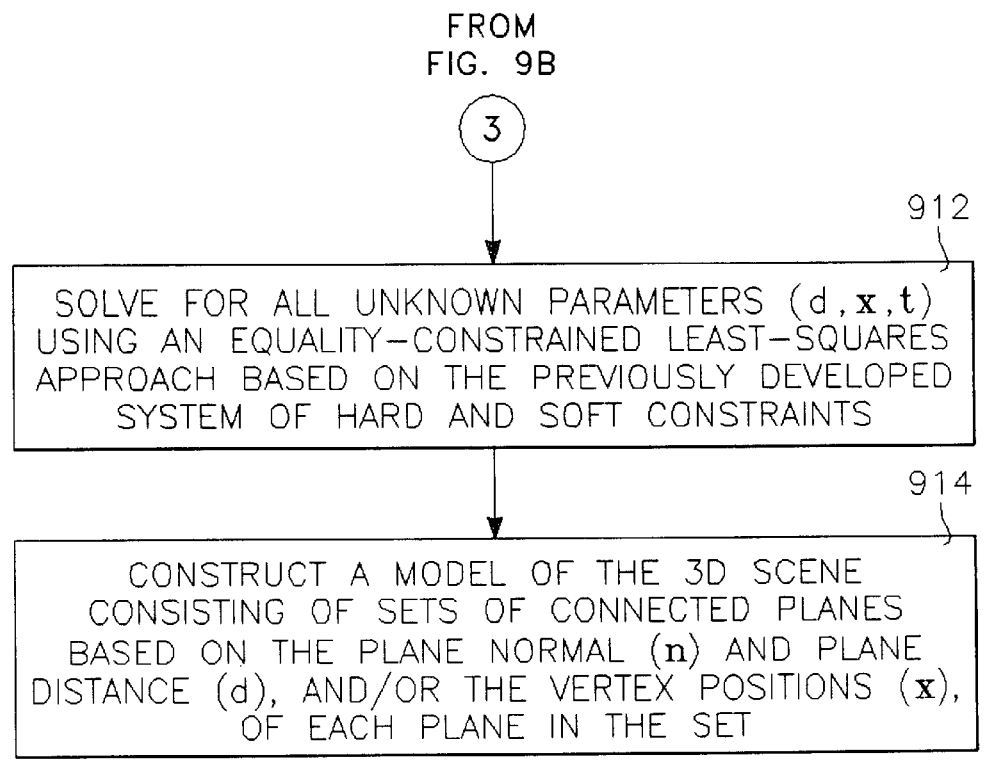

Using the foregoing equality-constrained least squares approach, each system of linear constraint equations is solved to estimate all the unknown parameters associated with the planes of the 3D scene, i.e., the plane distances (d) and 3D vertex point locations (x) of each plane, as well as the camera translation (t) if it has not been previously recovered (step 912 of FIG. 9D). The model of the 3D scene can then be constructed using the previously estimated and user-designated plane normals (n) and plane distances (d), and/or the 3D vertex point locations (x), for each plane in each subsystem in the scene (step 914).

While the equality-constrained least squares approach employing QR factorization is preferred, it is noted that a weighted least squares approach could be employed instead. In this latter approach, soft constraints are assigned a unity weight, whereas hard constraints are assigned very large weights [GV96]. Theoretically, the hard constraints should be assigned a weight of infinity. However, for computational purposes a large number would be chosen instead—for example a weight of 1000. Once the weights are assigned, the unknowns are solved for using a conventional least squares computation.

5.4 Decomposing the Linear System

Before a system solver is applied to any of the previously described systems of constraint equations, it is preferred that the linear system formed by the geometric constraints be checked to ensure it is solvable. To find all connected components, a depth first search is used to step through the linear system. Referring to step 906 of FIG. 9B, for each subsystem being modeled, check that:

the number of equations (both hard and soft constraints, when applicable) is no fewer than the number of unknowns;

the right hand side of each constraint equation is a non-zero vector, i.e., some minimal ground truth data has been provided; and the hard constraints are consistent (whenever the constraints have been categorized as hard or soft).

In regard to the consistency of the hard constraints, one preferred method of accomplishing this is through the QR decomposition of C=QR or $Rw = Q^T q$ to check if all zero rows of R correspond to zero entries of $Q^T q$.

As illustrated in FIG. 9C, if any of the above requirements is not satisfied, the system is declared unsolvable (step 908). A warning message is then generated to indicate to the user which set of unknowns cannot be recovered and possibly what parameters the user could specify to allow the subsystem to be modeled (step 910).

Figure 12A:
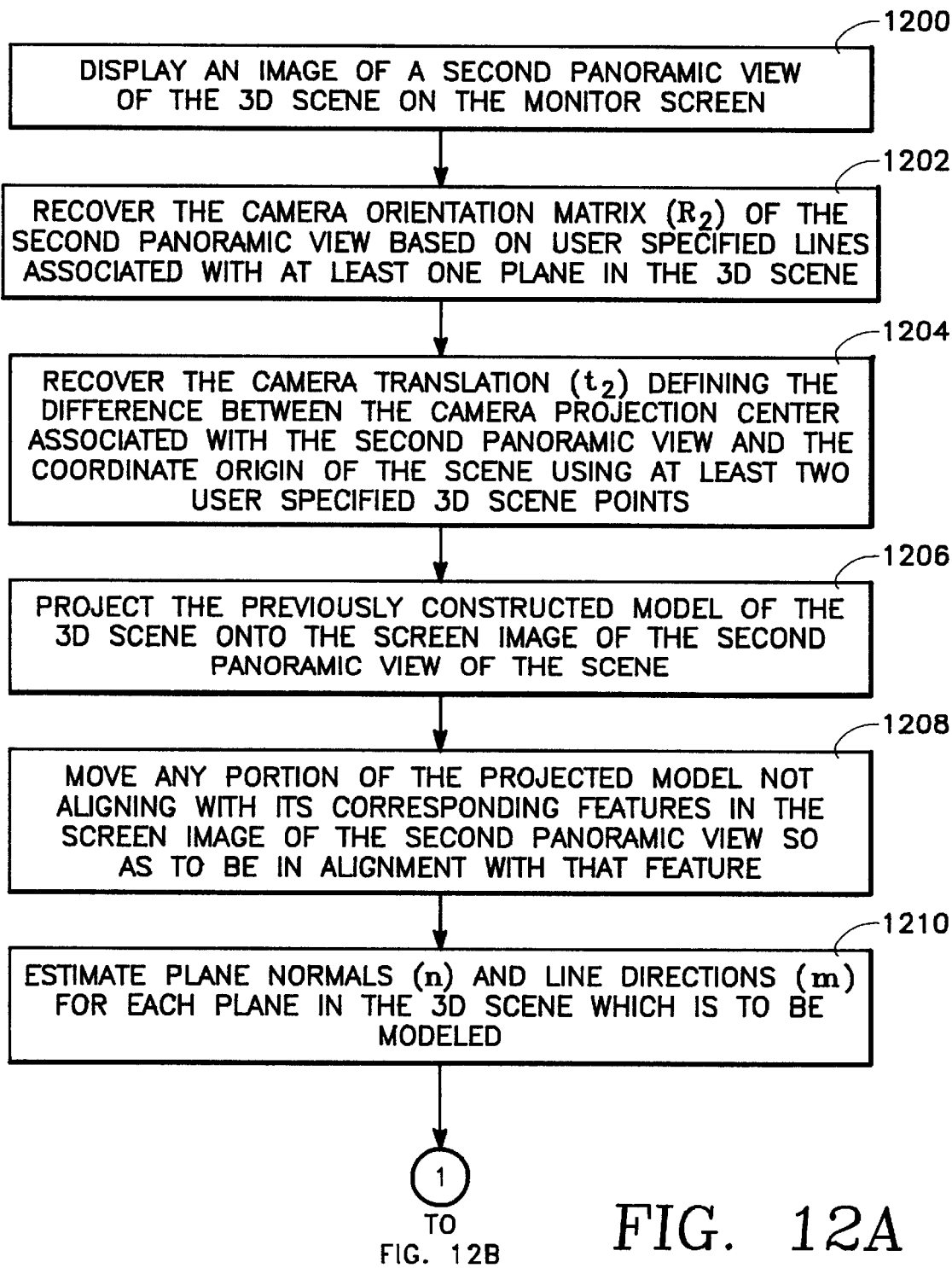
FIGS. 12A & 12B are block diagrams of a process for refining a model of a 3D scene using one or more additional panoramic views of the scene.
Figure 12B:
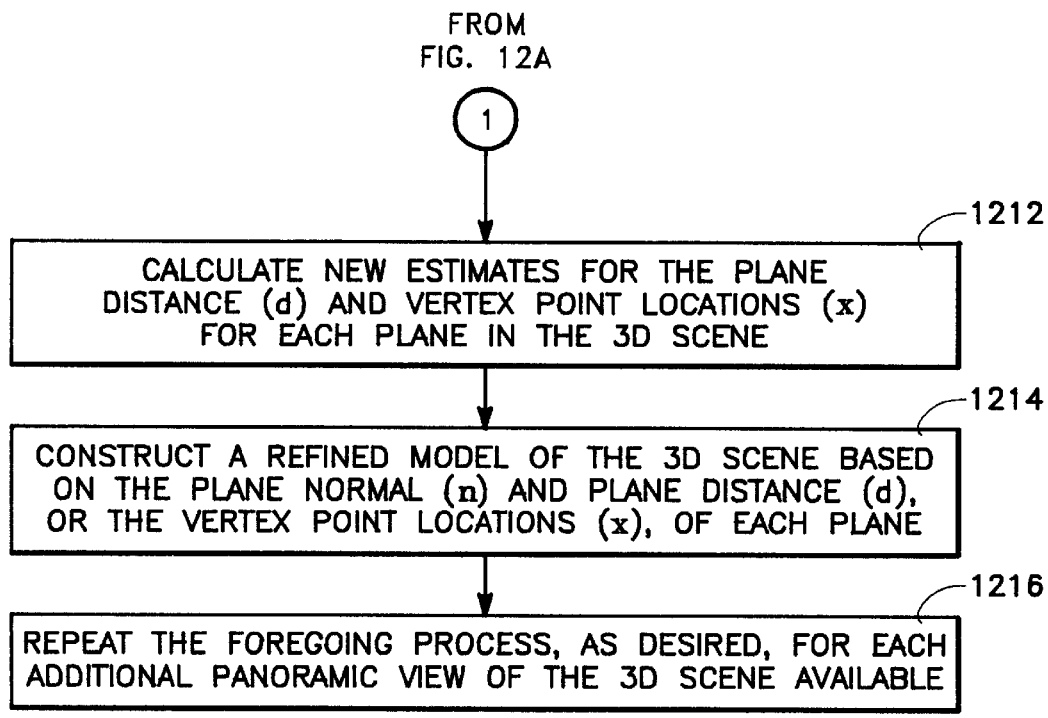

6. Refining the Model Using One or More Additional Panoramic Views of the 3D Scene The model of the 3D scene produced using the foregoing systems and procedures can be further refined by the use of one or more additional panoramic images of the scene. Referring to FIGS. 12A & 12B, the multiple panorama refinement process begins by displaying an image of a second panoramic view of the 3D scene on the monitor screen of the computer (step 1200). Next, in step 1202, a camera orientation matrix ($R_2$) associated with the second panoramic view is recovered. This is accomplished in the same way that the camera orientation matrix associated with the first panoramic view was computed (see Section 1 of this description). Essentially, the user designates lines on at least one plane in the screen image and identifies the direction of these lines in the 3D scene. If the user specifies two vertical lines and one horizontal line (or two horizontal and one vertical) the camera orientation matrix ($R_2$) is determined as described in Section 1.1. Whereas, if the user specifies two sets of parallel lines and their associated 3D scene directions, $R_2$ is determined using the methods of Section 1.2. In cases where the user designates more than two parallel lines in a set of parallel lines, the modified procedure of Section 1.3 is preferably employed to recover $R_2$. If the user fails to designate a sufficient number of lines on the plane in the screen image to allow the camera orientation matrix ($R_2$) to be determined, it is preferred that the user be prompted to provide the necessary additional information, as explained in Section 3. Finally, any sign ambiguities associated with $R_2$ can be resolved using the methods of Section 1.4.

Once the camera orientation matrix associated with the second panoramic view has been recovered, the next step in the multiple panorama refinement process is to recover the camera translation ($t_2$) defining the difference between the camera projection center associated with the second panorama and the coordinate origin of the scene (step 1204). The camera translation ($t_2$) is derived as explained in Section 4 of the present description using at least two user specified 3D scene points.

Once the camera orientation matrix ($R_2$) and camera translation ($t_2$) have been recovered, the previously constructed model of the 3D scene can be projected onto the screen image of the second panoramic view (step 1206). The conversion of the 3D coordinates of the existing model to the 2D coordinates of the second panoramic view is accomplished using the relationship:

$$x_2' = R_2 x + t_2 \qquad (15)$$

Because of the inherent inaccuracies in the existing model, as well as the estimated camera orientation matrix ($R_2$) and camera translation ($t_2$), the projected model will not likely line-up perfectly with all the corresponding features in the screen image of the second panoramic view. The user is called upon to move any portion of the projected model not aligning with its corresponding feature in the screen image into alignment with that feature (step 1208). For example, if the lines of a plane representing an interior wall of a building in the projected model do not match up with the sides, top and bottom of the corresponding wall in the screen image, the user would move the lines to coincide with the edges of the wall. Moving of the points and lines making up the projected model can be accomplished using any appropriate method currently employed for such manipulations of screen images, such as the popular "click and drag" method employed in many existing graphical user interfaces.

The next step 1210 in the multiple panorama refinement process is to estimate the direction of at least two lines lying on each plane being modeled in the 3D scene, as well as estimate a plane normal for each of these planes. This is accomplished in the same way it was when estimating these parameters for the first panoramic view (see Section 2). However, in this case the user need not designate any additional lines in the screen image of the second panoramic view, at least in association with planes that had been modeled using the first panoramic view. This line designation step can be skipped, as the lines associated with the projected model, which were previously aligned with their corresponding features in the second panorama, are used instead Other than this, the process is identical to that described in Section 2. However, there may also be some planes in the second panoramic view that did not appear in the first view. If these "new" planes are to be modeled, the directions of lines lying in each plane, as well as each plane's normal, must be estimated based on user inputs on the screen image. Accordingly, in the case of these "new" planes, the user will be required to designate lines on the planes in the screen image, just as was done for all the modeled planes in the first panoramic view of the 3D scene.

Figure 13B:
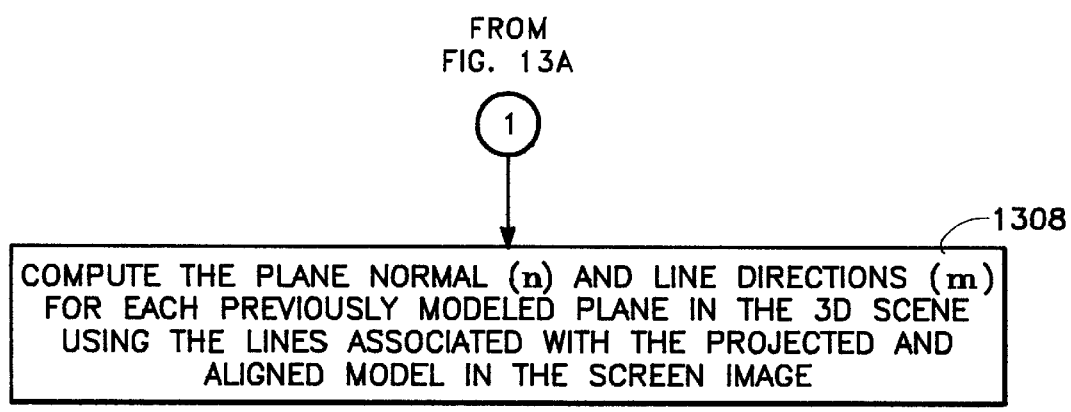
FIGS. 13A & 13B are block diagrams of a process for accomplishing the plane normal and line direction estimation program module of the process of FIGS. 12A & 12B.
Figure 13A:
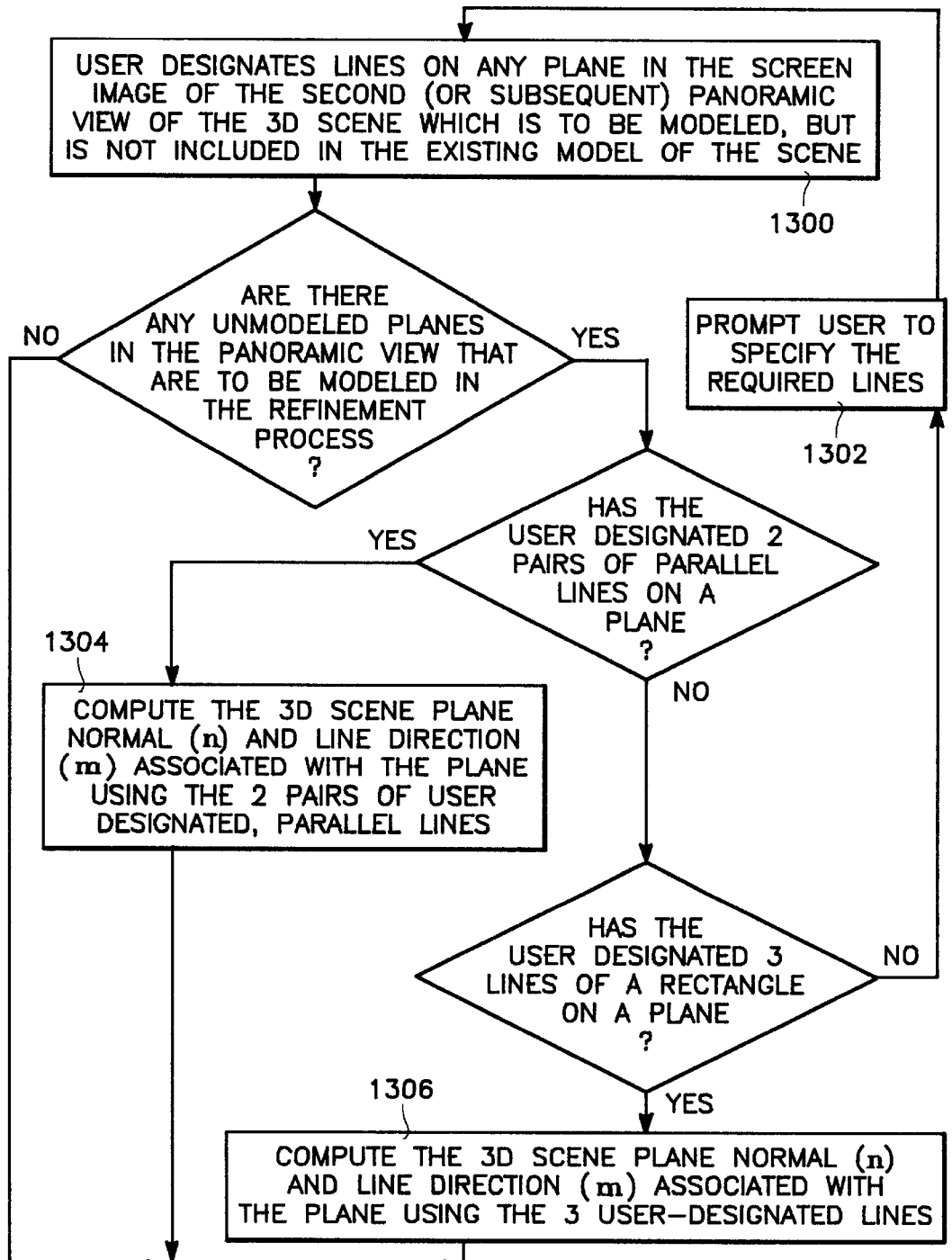

Thus, referring to FIGS. 13A and 13B, the estimation of a plane normal and line directions of each plane of the 3D scene to be included in the refined model, begins with the user designating lines on any plane in the screen image of the second panoramic view that is to be modeled, but which was not modeled previously (step 1300). If the user "draws" two pairs of parallel lines (e.g., a parallelogram) on a plane in the screen image, the plane normal and line directions are derived using these pairs of parallel lines (step 1304), using the methods described previously in connection with FIG. 7B. If the user "draws" three lines of a rectangle on a plane in the screen image, the plane normal and line directions are derived using these lines (step 1306), as described previously in connection with FIGS. 7C and 7D. If the lines designated on a plane are not sufficient to estimate the plane normal and line directions, the user is prompted to provide the required line designations (step 1302). This review and prompting process is described in detail in Section 4. In addition to estimating the required plane normals and line directions for any previously unmodeled planes being included in the refined model, these parameters are estimated for all the previously modeled planes of the 3D scene as well. The latter task is accomplished using the lines associated with the projected and aligned model that were superimposed onto the screen image of the second panoramic view (step 1308). This preferably entails using the methods described in connection with FIG. 7B because each of the planes in the screen image will have two pairs of parallel lines superimposed thereon due the projection and alignment of the existing model on the screen image. However, if desired, the methods described previously in connection with FIGS. 7C and 7D could be employed where the superimposed lines are known to form a rectangle.

Figure 14:
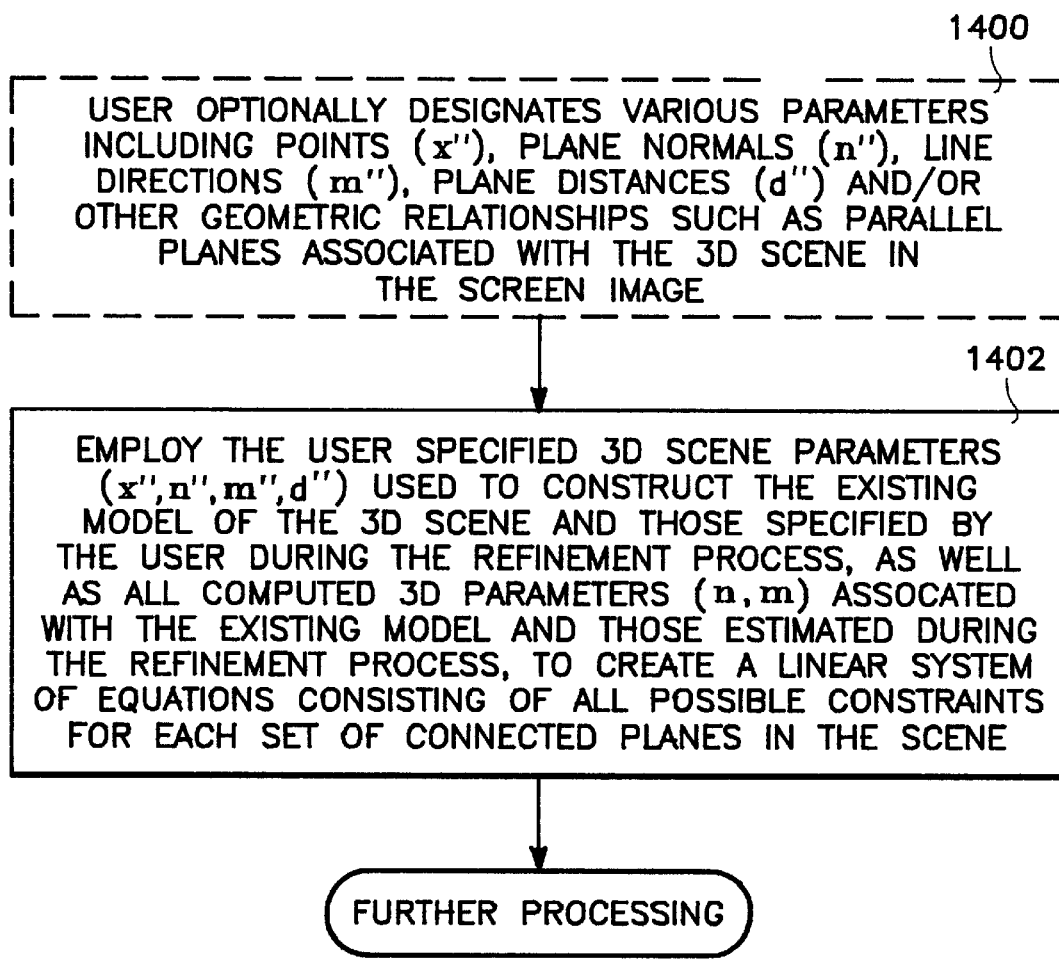
FIG. 14 is a block diagram of an initial portion of the process for accomplishing the plane distance and vertex point location calculation program module of the process of FIGS. 12A & 12B.

Once the plane normal and line directions of each plane in the screen image of the second panorama have been estimated, new estimates for the plane distances and vertex point locations of each plane can be calculated (step 1214). In the process leading up to the construction of the first model of the 3D scene, the user preferably designated various 3D scene parameters such as known point locations (x"), plane normals (n"), line directions (m"), or plane distances (d") as well as other geometric relationships including a designation that two planes are parallel to each other in the 3D scene. Referring to FIG. 14, in dealing with the second panoramic image, it is again preferred that the user input these same types of parameters not already entered, especially as they relate to any of the "new" planes being modeled (step 1400).

The computed 3D plane normals (n) and line directions (m) of each plane in a subsystem of connected planes being modeled are then used to form a linear system of constraint equations for that subsystem, along with the aforementioned user-designated 3D scene parameters (x", n", m", d"). This is essentially the same process described in Section 5.1. However, in this case not only are the user specified and estimated parameters associated with the processing of second panoramic view used to form the system of equations, but so are those associated with the construction of the existing model (step 1402). Thus, the system of equations will include constraint equations related to the geometry of the 3D scene that have been derived from both the first and second panoramic views of the scene. In addition, rather than employing the original estimate of the camera translation (t) as a known parameter in the system of constraint equations, it can be treated as an unknown and estimated along with the plane distances and vertex point locations. In theory, this can provide a more accurate estimate of the camera translation. The remaining steps of the estimating process are identical to those described previously in connection with the initial model. Namely, the system of equations can be solved as described in the co-pending application entitled INTERACTIVE CONSTRUCTION OF 3D MODELS FROM PANORAMIC IMAGES using a conventional least squares approach to obtain the unknown plane distances and vertex point locations. However, it is preferred that the more exacting methods described in the aforementioned second co-pending application entitled INTERACTIVE CONSTRUCTION OF 3D MODELS FROM PANORAMIC IMAGES EMPLOYING HARD AND SOFT CONSTRAINT CHARACTERIZATION AND DECOMPOSING TECHNIQUES be employed instead. Generally, this latter process, as described in Section 5.2, involves characterizing each constraint as being either a hard or soft constraint. Then, the processes described in Section 5.3 are employed. For example, the characterized system of constraint equations can be solved using an equality-constrained least squares approach, or a least squares approach employing weighting factors. In addition, regardless of what solving method is employed, it is preferred that the decomposition methods of the second co-pending application be employed to test the solvability of the expanded system of constraint equations. This decomposition process is described in Section 5.4. It is noted in connection with the step of the decomposition process involving checking that the right hand side of each constraint equation is a non-zero vector to ensure some minimal ground truth data has been provided, can be eliminated if desired. This is possible because, in principle, the system can be solved without any ground truth when employing multiple panoramas. However, this requires finding the unit norm solution of the homogeneous set of equations.

Referring once again to FIG. 12B, the last step in the process of refining the model of the 3D scene using information derived from the second panoramic view of the scene is to construct the refined model based on the above-derived revised estimates of the plane distances and vertex point locations (step 1214). While the use of a second panoramic view of the 3D scene can provide a more complete and accurate model of the scene, it is believed that information derived for additional panoramas can improve the model even further. Thus, while not required, it is preferred that the foregoing system and process be repeated for each additional panoramic view of the 3D scene that is available (step 1216).

Up to this point, the systems of constraint equations have been solved for the plane distances (d), vertex point locations (x), and optionally the camera translation (t), assuming the estimated camera orientation matrix (R), lines directions (m) and plane normals (n) were accurate. However, with the introduction of the constraints derived from the second panoramic view into the system of equations, it is possible to solve not only for the d, x and t, but R, m and n as well. Thus, the estimates for these latter parameter need not be relied on and a potentially more accurate model can be constructed. It must be noted, however, that the proposed system of equations would not be linearly constrained. As such, the system would have to be solved using a non-linear least squares approach [MM80].

Further, to better handle feature measurements taken from different viewpoints in a 3D model construction process employing multiple panoramas, it is more optimal [Zha97] to modify Eq. (5) s.t.

$$\frac{(x-t)}{\|x-t\|} \cdot (R^T p'_j) = 0, j = 0, 1 \tag{16}$$

where $p_0'=(-x_2, x_1, 0)$ and $p_1'=(-x_3, 0, x_1)$ were chosen as the two linearly independent constraints, and $p_2'$ eliminated from the system of equations, as was explained as possible in Section 4.

Finally, while it is preferred that the initial model of the 3D scene refined using the procedures of this section be constructed in accordance with the systems and processes of the aforementioned co-pending applications entitled INTERACTIVE CONSTRUCTION OF 3D MODELS FROM PANORAMIC IMAGES and INTERACTIVE CONSTRUCTION OF 3D MODELS FROM PANORAMIC IMAGES EMPLOYING HARD AND SOFT CONSTRAINT CHARACTERIZATION AND DECOMPOSING TECHNIQUES, this need not be the case. In essence, the initial model need only be one or more sets of interconnected lines and points forming planes representative of the 3D scene that can be projected into a 2D panoramic coordinate system and then superimposed on a screen image of a panorama of the 3D scene. There are many currently available modeling programs and techniques that could produce the initial model. For example, a conventional Computer Aided Design (CAD) modeling tool could be employed for this purpose. Of course, if the aforementioned preferred procedures are not employed to construct the initial model of the 3D scene, the system of constraint equations created to estimate the plane distances and vertex point locations of each plane of the scene being modeled (and optionally a refined estimate of the camera translation), would include constraints related only to the geometry of the 3D scene derived from a single panoramic view of the scene. The benefit of also including the constraint equation developed in connection with constructing an initial model via the aforementioned preferred procedures would be lost. However, it is believed the resulting refined model can still be an improvement. In addition, if additional panoramic views of the scene are available, the model can be refined even further with full benefit of using both the constraint equations developed in connection with the construction of the current model as well as those created from an additional panoramic view.

7. Experiments

Figure 10A:
FIG. 10A is an image depicting a spherical panoramic view of a building interior.
Figure 10B:
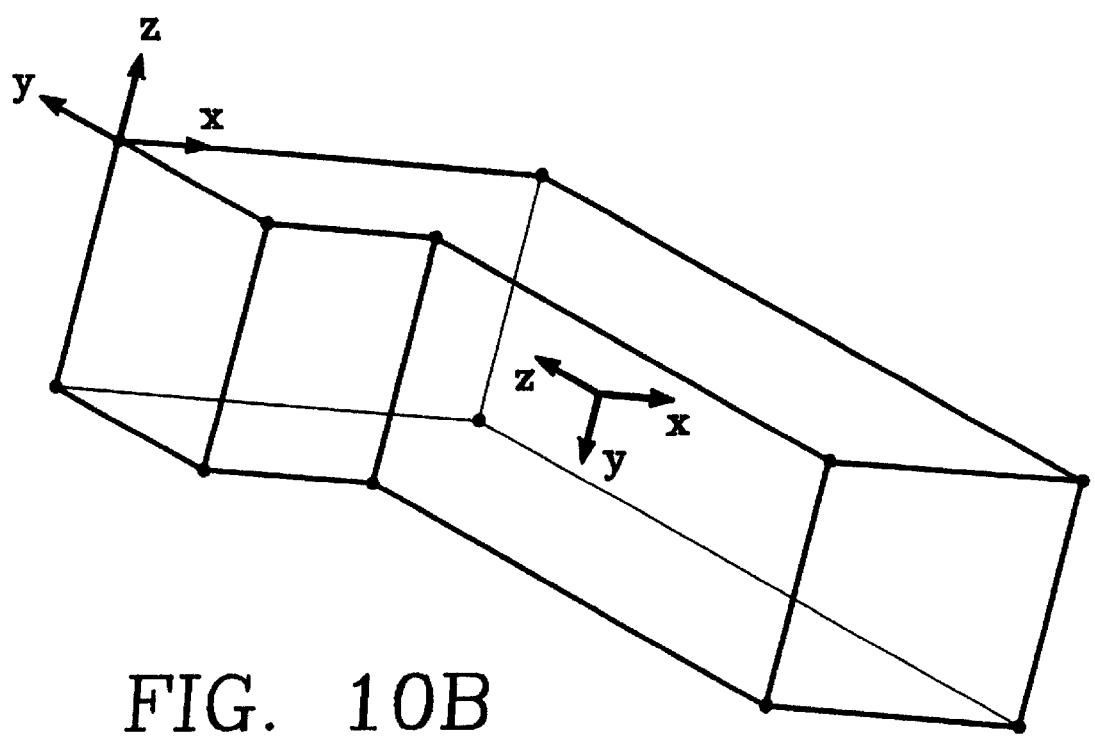
FIG. 10B is a diagram graphically depicting a simple reconstructed model of the 3D scene associated with the panoramic image of FIG. 10A, produced using a modeling system embodying the present invention.

We have implemented and tested our system on a PC, such as the one described in connection with FIG. 1. For example, FIG. 10A shows a spherical panoramic view of a building interior (i.e. the 3D scene) and FIG. 10B shows a simple reconstructed 3D model produced from the panoramic view using a modeling system embodying the present invention. The coordinate system on the left corner in FIG. 10B is the world coordinate, and the coordinate system in the middle is the panoramic view coordinate. The panoramic view of FIG. 10A is composed of 60 images that have been combined using a known method of creating full-view panoramas [SS97a] from individual images of a scene.

Figure 11A:
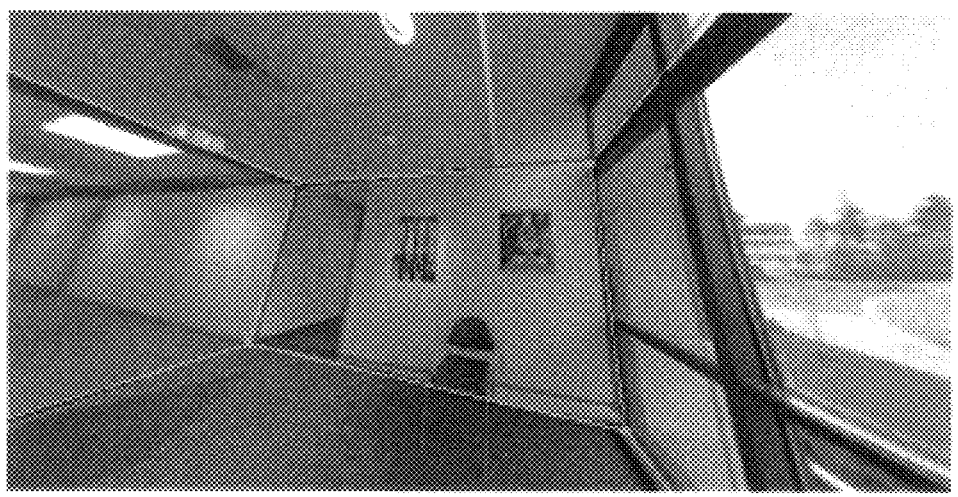
FIGS. 11A & 11B are images depicting zoomed and panned screen images of the interior scene shown in the panoramic view of FIG. 10A.
Figure 11B:
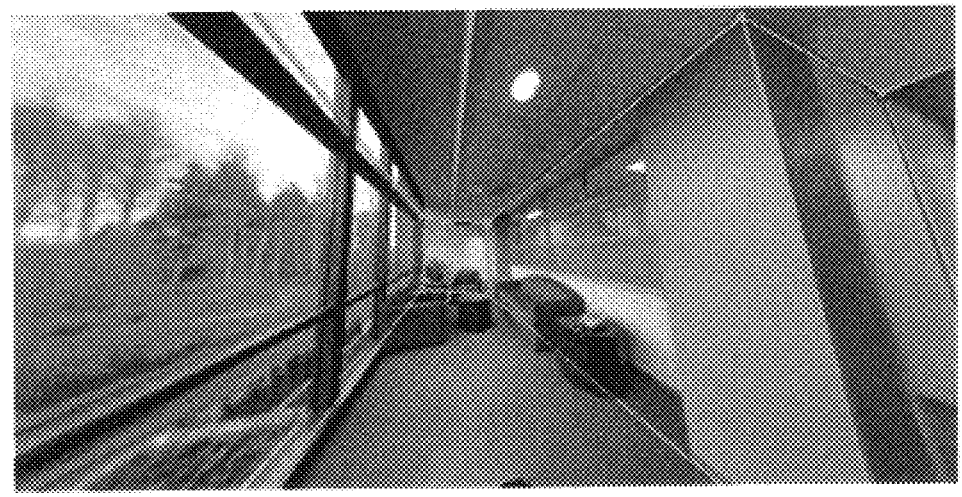

FIGS. 11A and 11B represent two zoomed and panned screen images of the interior scene shown in the panoramic view of FIG. 10A. Green lines and points are a sampling of the 2D panoramic view items that are manually "drawn" by the user on the screen image and assigned with 3D scene properties (e.g., 3D scene line directions and point coordinates), as described previously. The blue lines and points are projections of the recovered 3D model. It was found that this interactive, user interface was easy to use. For example, it took only about 15 minutes to build the simple model in FIG. 10B.

As can be seen from FIGS. 10A, 10B, 11A and 11B, the present invention utilizes a user interface environment including screen images of a panoramic view of a 3D scene. The interface allows the user to select portions of the panoramic view to be displayed as the screen image (such as was done in FIGS. 11A and 11B). Essentially, the user can input commands to pan to a particular portion of the panoramic view, tilt the image vertically to view just a portion thereof, and zoom in or out on a portion of the view. In addition, the interface allows a user to employ a pointing method (such as a mouse, touch sensitive screen, etc.), in a conventional manner to identify features, such as lines and points, on the screen image. For example, as discussed previously, the user designates a line by identifying two points of the line on the screen image. A line then appears (e.g., the green lines shown in FIGS. 11A and 11B) on the screen image between the two specified points. A point can be depicted in much the same way. The user identifies a point on the screen image and a dot appears at that location. In addition, the user would preferably assign properties to identified features by making selections on, or entering information via a keyboard, etc. into, a conventional graphical screen image (not shown), similar to those currently used by commercially available graphic user interfaces such as Microsoft Windows™. For example, the user would preferably enter 3D scene line directions and point coordinates via this method.

In regard to the process of the user designating lines on the screen image, it is noted that a line snapping technique can be employed in an attempt to increase the accuracy of the positioning of lines on the screen image. In a typical line snapping technique, the user would first specify the two points of the line (preferably the end points) and a line would be "drawn" on the screen image between the points, as discussed above. In cases where the line coincides with a readily definable feature of the 3D scene (such as a window frame, corner of room or building, or the like), conventional edge detection methods would be employed to fit (i.e., "snap") the line to the edge. This may result in the shifting of the user-identified points to new locations on the screen image. These new point locations would be used in the previously described computation steps rather than the user-specified point locations, thereby potentially resulting in a more user-friendly and accurate modeling of the 3D scene.

Figure 15A:
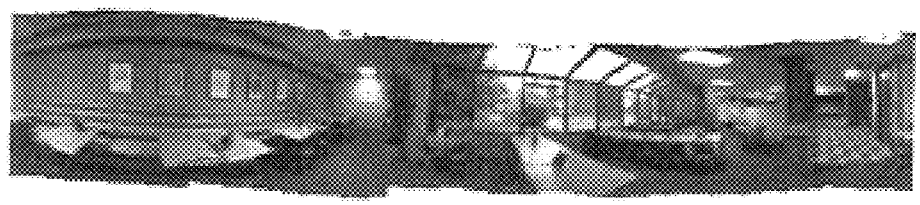
FIGS. 15A and 15B are two separate panoramic images of a building interior.
Figure 15B:
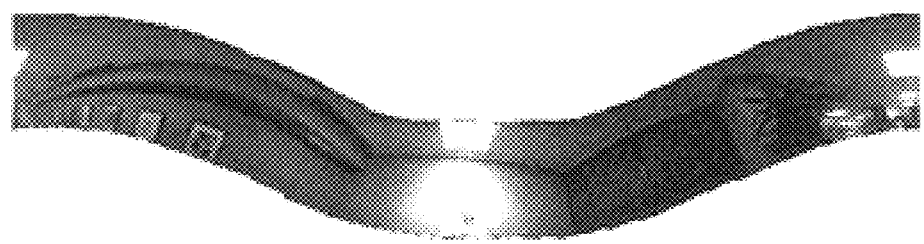
Figure 16A:
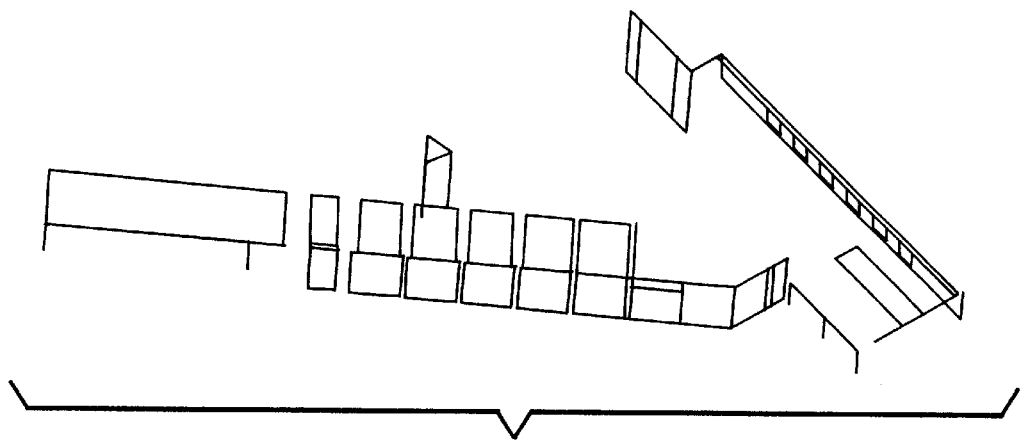
FIGS. 16A & 16B are diagrams graphically depicting two views of a reconstructed model of the 3D scene associated with the panoramic images of FIGS. 15A & 15B, produced using the modeling systems and processes embodying the present invention.
Figure 16B:
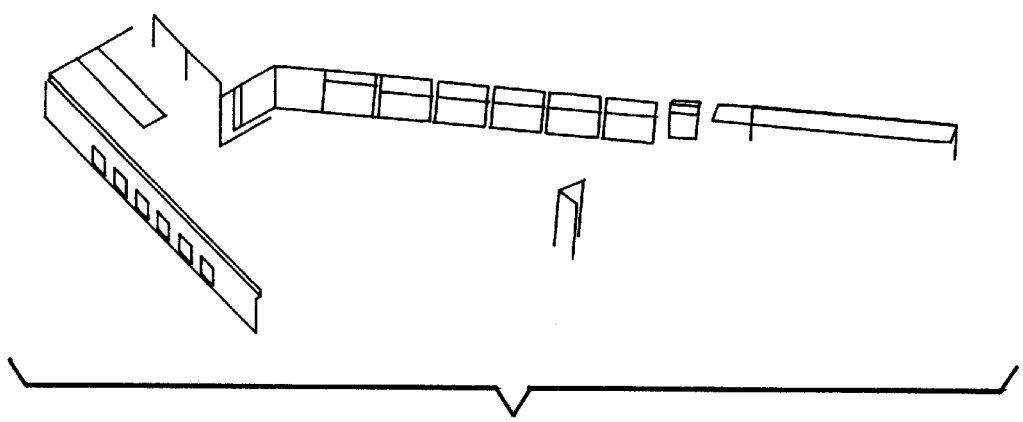

FIGS. 15A–B and 16A–B illustrate an example of building a refined model of a 3D scene using multiple panoramas in accordance with the systems and processes of the present invention. FIGS. 15A and 15B show two spherical panoramas of a building constructed from image sequences taken with a hand-held digital video camera. FIGS. 16A and 16B depict two views of the wireframe model constructed using the techniques of the present invention based on the two panoramas of FIGS. 15A and 15B. Notice that the occluded middle area in the first panorama (behind the tree) is recovered because it is visible in the second panorama.

References

[BB95] S. Becker and V. M. Bove. Semiautomatic 3-D model extraction from uncalibrated 2-D camera views. In *SPIE Vol.* 2410, *Visual Data Exploration II*, pages 447–461, Feb. 1995.

[BR97] S. Bougnoux and L. Robert. Totalcalib: a fast and reliable system for off-line calibration of image sequences. In *CVPR'97*, June 1997. The Demo Session.

[CW90] R. T. Collins and R. S. Weiss. Vanish point calculation as a statistical inference on the unit sphere. In *ICCV'90*, pages 400–403, Dec. 1990.

[FSL+95] O. D. Faugeras, Laveau S., Robert L., Csurka G., and Zeller C. 3-D reconstruction of urban scenes from sequences of images. Technical Report 2572, INRIA, 1995.

[GV96] G. Golub and C. F. Van Loan. *Matrix Computation, third edition*. The John Hopkins University Press, 1996.

[Har89] R. M. Haralick. Determining camera parameters from the perspective projection of a rectangle. *Pattern Recognition*, 22(3):225–230, 1989.

[KS96] S. B. Kang and R. Szeliski. 3-D scene data recovery using omnidirectional multibaseline stereo. In *CVPR'96*, pages 364–370, June 1996.

[KW97] S. B. Kang and R Weiss. Characterization of errors in compositing panoramic images. In *CVPR'97*, pages 103–109, June 1997.

[MB95] L. McMillan and G. Bishop. Plenoptic modeling: An image-based rendering system. *SIGGRAPH'95*, pages 39–46, August 1995.

[SK97] H. S. Sawhney and R. Kumar. True multi-image alignment and its application to mosaicing and lens distortion correction. In *CVPR'97*, pages 450–456, June 1997.

[SS97a] H.-Y. Shum and R. Szeliski. Construction and refinement of panoramic mosaics with global and local alignment. In *ICCV'98*, pages 953–958, 1998.

[SS97b] R. Szeliski and H. Y. Shum. Creating full view panoramic image mosaics and texture-mapped models. *SIGGRAPH'95*, pages 251–258, August 1997.

[Ste95] G. Stein. Accurate internal camera calibration using rotation, with analysis of sources of error. In *ICCV95*, pages 230–236, June 1995.

[TDM96] C. J. Taylor, P. E. Debevec, and J. Malik. Reconstructing polyhedral models of architectural scenes from photographs. In *ECCV'96*, volume 2, pages 659–668, April 1996.

[WH88] E. L. Walker and M. Herman. Geometric reasoning for constructing 3D scene descriptions from images. *Artificial Intelligence*, 37:275–290, 1988.

[Zha97] Z. Zhang. Determining the epipolar geometry and its uncertainty: A review. *IJCV'98*, volume 27, no. 2, pages 161–195, March 1998.

[MM80] F. H. Moffitt and E. M. Mikhail. *Photogrammetry*. Harper & Row, New York, 3$^{rd}$ edition, 1980

What is claimed is:

1. A computer-implemented process to refine a model of a 3D scene using a panoramic view of the scene, comprising the use of a computer to perform the following steps:

displaying an image of a panoramic view of the 3D scene as a screen image;

recovering a camera orientation matrix of the panoramic view based on lines associated with at least one plane of the 3D scene as specified by a user of the computer-implemented process;

recovering a camera translation using the camera orientation matrix, wherein the camera translation is the difference between the camera projection center and the coordinate origin of the 3D scene;

projecting a previously constructed model of the 3D scene comprising one or more sets of interconnected lines forming planes representative of the scene onto the screen image of the panoramic view using the camera orientation matrix and camera translation derived from panoramic view;

moving any portion of the projected model not aligned with its corresponding feature in the screen image of the panoramic view so as to be in alignment with that feature;

estimating plane normals and line directions for planes in the 3D scene which are to be modeled using the camera orientation matrix and the projected previously constructed model;

estimating unknown plane distances and vertex point locations, of each plane in the 3D scene which is to be modeled, by steps comprising the solving of a system of linear geometric constraint equations created using the estimated plane normals and line directions derived from the panoramic view of the 3D scene;

constructing a refined model of the 3D scene consisting of at least one set of connected planes based on the plane normal and plane distance, and/or the vertex point locations, of each plane in the set.

2. The process of claim 1, wherein the camera orientation matrix recovery step comprises the steps of:

the user designating lines on at least one plane in the screen image of the panoramic view of the 3D scene;

the user identifying the direction of lines in the 3D scene which correspond to each of the designated lines in the screen image; and determining the camera orientation matrix using the designated lines and identified line directions.

3. The process of claim 2, wherein the camera orientation matrix recovery step further comprises the steps of:

ascertaining whether the user has designated a sufficient number of lines on the at least one plane to determine the camera orientation matrix; and prompting the user to designate additional lines on the at least one plane whenever it is ascertained there are not a sufficient number to determine the camera orientation matrix.

4. The process of claim 2, wherein the determining step comprises the step of deriving the camera orientation matrix from lines on a plane corresponding to at least two vertical lines and one horizontal line of the 3D scene, as designated by the user.

5. The process of claim 2, wherein the determining step comprises the step of deriving the camera orientation matrix from lines on a plane corresponding to at least two horizontal lines and one vertical line of the 3D scene, as designated by the user.

6. The process of claim 2, wherein the determining step comprises the step of deriving the camera orientation matrix from at least two sets of parallel lines on one or more planes and the direction of each of the parallel lines in the 3D scene, as designated by the user.

7. The process of claim 2 wherein an element of the determined camera orientation matrix may be reversed in sign in comparison to the actual camera orientation matrix, and wherein the camera orientation matrix recovery step further comprises the step of resolving any sign ambiguity existing in the determined camera orientation matrix.

8. The process of claim 1, wherein the step of recovering the camera translation comprises the steps of:

the user specifying the 3D scene coordinates of at least two points identified by the user in the screen image;

characterizing the conversion of a point in the 3D scene to a corresponding point in the panoramic view using the relationship, $(x-t) \times R^T x' = 0$, which is equivalent to, $(x-t) \cdot (R^T p_j') = 0$, $j=0,1,2$ where x represents the coordinates of a point in the 3D scene, t represents the camera translation, R represents the camera orientation matrix, x' represents the coordinates of a point in the panoramic view which corresponds to a point x in the 3D scene and $p_0' = (-x_2, x_1, 0)$, $p_1' = (-x_3, 0, x_1)$ and $p_2' = (0, -x_3, x_2)$ represent three directions perpendicular to a ray from the camera center through the point $x' = (x_1, x_2, x_3)$;

creating a system of linear equations based on the characterizing relationship using the at least two user specified points; and estimating the camera translation from the system of linear equations using a least-squares approach.

9. The process of claim 1, wherein the step of estimating plane normals and line directions for planes in the 3D scene comprises the steps of:

deriving the direction of lines in the 3D scene corresponding to the lines of the projected and aligned model that has been superimposed on the screen image; and deriving a normal for each plane in the 3D scene, which corresponds to a plane of the screen image containing lines of the projected and aligned model, using the derived 3D scene line directions associated with that plane.

10. The process of claim 9, wherein the step of deriving the direction of lines in the 3D scene for planes being modeled comprises using the camera orientation matrix and two pairs of parallel lines of the projected and aligned model which have been superimposed on the corresponding plane in the screen image.

11. The process of claim 10, wherein the step of deriving the direction of lines in the 3D scene for planes to be modeled using the camera orientation matrix and two pairs of parallel lines of the projected and aligned model, comprises, for each plane, the steps of:

identifying the coordinates of two points on each line in the panoramic view that corresponds to the two pairs of parallel lines;

computing a normal for each of the projection planes associated with the two pairs of parallel lines in the panoramic view, each projection plane being defined by the two identified points and a camera center associated with the panoramic view;

computing a line direction for each pair of parallel lines in the panoramic view using the computed projection plane normals associated with that pair of parallel lines; and computing the line direction in each plane in the 3D scene corresponding to each pair of parallel lines in the panoramic view using the computed panoramic view line directions and the camera orientation matrix.

12. The process of claim 9, wherein the step of deriving the direction of lines in the 3D scene for planes being modeled comprises using the camera orientation matrix and three lines of the projected and aligned model which have been superimposed on the corresponding plane in the screen image and which form three lines of a rectangle on the screen image plane.

13. The process of claim 12, wherein the step of deriving the direction of lines in the 3D scene for planes to be modeled using the camera orientation matrix and three lines of the projected and aligned model, comprises, for each plane, the steps of:

identifying the coordinates of two points on each line in the panoramic view that corresponds to the three lines of the rectangle;

computing a normal for each of the projection planes associated with the three lines of the rectangle in the panoramic view, each projection plane being defined by the two identified points and a camera center associated with the panoramic view;

computing a line direction for two lines of the three lines of the rectangle in the panoramic view that are parallel using the computed projection plane normals associated with the pair of parallel lines; and computing the line direction in each plane in the 3D scene corresponding to the pair of parallel lines in the panoramic view using the computed panoramic view line direction and the camera orientation matrix;

computing a 3D scene projection of the projection plane normal associated with the remaining, non-parallel line of the three lines of the rectangle using the camera orientation matrix;

computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

14. The process of claim 1, wherein the panoramic view of the 3D scene comprises planes that are to be modeled but not included in the previously constructed model, and wherein the step of estimating plane normals and line directions for planes in the 3D scene comprises the steps of:

the user designating lines on each plane in the screen image of the panoramic view that is to be modeled but not included in the previously constructed model;

deriving the direction of lines in the 3D scene corresponding to each of the user designated lines in the screen image using the camera orientation matrix; and deriving a normal for each plane in the 3D scene that corresponds to a plane of the screen image on which the user has designated lines, using the derived 3D scene line directions associated with that plane.

15. The process of claim 14, wherein the step of estimating plane normals and line directions for planes in the 3D scene further comprises the steps of:

ascertaining whether the user has designated a sufficient number of lines on a plane in the screen image to derive the line directions and plane normal associated with the corresponding plane in the 3D scene; and prompting the user to designate additional lines on a plane in the screen image whenever it is ascertained there are not a sufficient number to derive the line directions and plane normal associated with the corresponding plane in the 3D scene.

16. The process of claim 14, wherein the step of deriving the direction of lines in the 3D scene corresponding to each of the user designated lines in the screen image comprises deriving the direction of the lines using two pairs of parallel lines designated by the user as being on the corresponding plane in the screen image.

17. The process of claim 16, wherein the step of deriving the direction of lines in the 3D scene comprises the steps of:

identifying the coordinates of two points on each line in the panoramic view that corresponds to the two pairs of parallel lines designated by the user in the screen image;

computing a normal for each of the projection planes associated with the two pairs of parallel lines in the panoramic view, each projection plane being defined by the two identified points and a camera center associated with the panoramic view;

computing a line direction for each pair of parallel lines in the panoramic view using the computed projection plane normals associated with that pair of parallel lines; and computing the line direction in each plane in the 3D scene corresponding to each pair of parallel lines in the panoramic view using the computed panoramic view line directions and the camera orientation matrix.

18. The process of claim 14, wherein the step of deriving the direction of lines in the 3D scene corresponding to each of the user designated lines in the screen image comprises deriving the direction of the lines using three lines of a rectangle designated by the user as being on the corresponding plane in the screen image.

19. The process of claim 18, wherein the step of deriving the direction of lines in the 3D scene comprises the steps of:

identifying the coordinates of two points on each line in the panoramic view that corresponds to the three lines of the rectangle designated by the user in the screen image;

computing a normal for each of the projection planes associated with the three lines of the rectangle in the panoramic view, each projection plane being defined by the two identified points and a camera center associated with the panoramic view;

computing a line direction for two lines of the three lines of the rectangle in the panoramic view that are parallel using the computed projection plane normals associated with the pair of parallel lines; and computing the line direction in each plane in the 3D scene corresponding to the pair of parallel lines in the panoramic view using the computed panoramic view line direction and the camera orientation matrix;

computing a 3D scene projection of the projection plane normal associated with the remaining, non-parallel line of the three lines of the rectangle using the camera orientation matrix;

computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

20. The process of claim 1, wherein the step of estimating plane distances and vertex point locations of each plane in the 3D scene which is to be modeled comprises the steps of:

the user designating parameters comprising ones of,
3D scene coordinates of points corresponding to points identified by the user in the screen image,
plane normals associated with planes in the 3D scene that correspond to planes identified by the user in the screen image,
directions of lines in the 3D scene that correspond to lines identified by the user in the screen image,
plane distances associated with planes in the 3D scene that correspond to planes identified by the user in the screen image, and
planes in the screen image that correspond to parallel planes of the 3D scene;

solving the system of linear geometric constraint equations created using the estimated plane normals and line directions, as well as all user designated parameters.

21. The process of claim 20, wherein the system of linear geometric constraint equations comprises:

Known point $x_i''$,
Known plane Distance $d_i''$,
Parallel planes $d_i - d_j = \text{Const.}$,
Point/model $(x-t) \cdot p_j = 0$,
Point/plane $x_i \cdot n_k'' + d_k = 0$,
Point/plane $x_i \cdot n_k + d_k = 0$,
Points/line $(x_i - x_j) \times m'' = 0$,
Points/line $(x_i - x_j) \times m = 0,0$
Known length $x_i - x_j = cm''$,
Known length $x_i - x_j = cm$ where $x''$ represents the coordinates of a point in the 3D scene designated by the user and $x$ represents the unknown coordinates of a point in the 3D scene, $d''$ represents a distance from the origin of the 3D scene to a plane in the scene as designated by the user and $d$ represents an unknown distance from the origin of the 3D scene to a plane in the scene, $t$ represents the camera translation, $p_j$ represents $p_0 = (-x_2, x_1, 0)$, $p_1 = (-x_3, 0, x_1)$ and $p_2 = (0, -x_3, x_2)$ which correspond to three directions perpendicular to a ray from the camera center through the point $x = (x_1, x_2, x_3)$, $n''$ represents a normal of a plane in the 3D scene designated by the user and $n$ represents the estimated normal of a plane in the 3D scene, $m''$ represents a direction of a line in the 3D scene designated by the user and $m$ represents the estimated direction of a line in the 3D scene, and $c$ represents a scaling factor.

22. The process of claim 21, wherein the previously recovered camera translation is employed in the creation of the system of equations.

23. The process of claim 21, wherein the previously recovered camera translation is ignored, and wherein the camera translation is treated as an unknown and estimated along with the unknown plane distances and vertex point locations from the system of linear geometric constraint equations.

24. The process of claim 20, wherein the step of estimating plane distances and vertex point locations of each plane in the 3D scene which is to be modeled comprises the step of characterizing the constraint equations as being a hard constraint whenever the equation includes at least one of the user designated parameters and a soft constraint whenever the equation does not include a user designated parameter.

25. The process of claim 24, wherein the step of estimating plane distances and vertex point locations further comprises using an equality-constrained least squares approach wherein the equations of each system of equations characterized as soft constraints are solved subject to the equations of the system characterized as hard constraints.

26. The process of claim 24, wherein the step of estimating plane distances and vertex point locations further comprises the steps of:

assigning a unity weight factor to all soft constraints and a large weight factor to all hard constraints; and
estimating the unknown plane distances and vertex points for each set of connected planes in the 3D scene which is to be modeled from the weighted system of linear hard and soft constraint equations using a least-squares approach.

27. The process of claim 1 further comprising, prior to performing the step of solving of the system of linear geometric constraint equations for each set of connected planes in the 3D scene, the step of decomposing the system of linear geometric constraint equations for each set of connected planes to ensure their respective solvability.

28. The process of claim 1, comprising the added step of further refining the model of the 3D scene using one or more additional panoramic views of the scene, said step of further refining the model comprising the steps of:

(i) displaying an image of an additional panoramic view of the 3D scene as a screen image, said additional panoramic view not having been displayed in any previous step of the process;
(ii) recovering a camera orientation matrix of the additional panoramic view based on lines associated with at least one plane of the 3D scene as specified by the user;
(iii) recovering a camera translation of the additional panoramic view using the camera orientation matrix associated therewith;
(iv) projecting the refined model of the 3D scene onto the screen image of the additional panoramic view using the camera orientation matrix and camera translation derived from the additional panoramic view;
(v) moving any portion of the projected refined model not aligned with its corresponding feature in the screen image of the additional panoramic view so as to be in alignment with that feature;
(vi) estimating plane normals and line directions for planes in the 3D scene which are to be modeled using the camera orientation matrix associated with the additional panoramic view and the projected model;
(vii) re-estimating plane distances and vertex point locations of each plane in the 3D scene which is to be modeled, by solving a system of linear geometric constraint equations derived from the first panoramic view and the additional panoramic view;
(viii) constructing an improved refined model of the 3D scene consisting of at least one set of connected planes based on the plane normal and plane distance, and/or the vertex point locations, of each plane in the set; and
(ix) optionally repeating steps (i) through (viii) for each additional panoramic view of the 3D scene available.

29. The process of claim 1, the wherein the panoramic view of the 3D scene is a second panoramic view, and the previously constructed model of the 3D scene is constructed using a first panoramic view of the scene via steps comprising:

displaying an image of the first panoramic view of the 3D scene as a screen image;
recovering a camera orientation matrix of the first panoramic view based on lines associated with at least one plane of the 3D scene as specified by the user;

characterizing the 3D scene as at least one set of connected planes, each set being subject to a series of geometric constraints;

estimating plane normals and line directions for planes in the 3D scene which are to be modeled using the camera orientation matrix associated with the first panoramic view;

recovering a camera translation associated with the first panoramic view using the camera orientation matrix also associated with the first panoramic view, wherein the camera translation is the difference between the camera projection center and the coordinate origin of the 3D scene;

estimating unknown plane distances and vertex point locations, for each plane in the 3D scene which is to be modeled, by solving a system of linear geometric constraint equations created using the estimated plane normals and line directions;

constructing a model of the 3D scene consisting of at least one set of connected planes based on the plane normal and plane distance, and/or the vertex point locations, of each plane in the set.

30. The process of claim 29, wherein the step of estimating plane distances and vertex point locations of each plane in the 3D scene which is to be modeled by steps comprising the solving of a system of linear geometric constraint equations created using the estimated plane normals and line directions derived from the second panoramic view further comprises incorporating linear geometric constraint equations created using the estimated normals and line directions derived from the first panoramic view prior to solving the system of equations.

31. The process of claim 29 wherein the step of estimating plane distances and vertex point locations of each plane in the 3D scene which is to be modeled comprises the steps of:

creating additional linear geometric constraint equations using the estimated normals and line directions derived from the first panoramic view prior to solving the system of equations;

the user designating parameters comprising ones of, 3D scene coordinates of points corresponding to points identified by the user in the screen image, plane normals associated with planes in the 3D scene that correspond to planes identified by the user in the screen image, directions of lines in the 3D scene that correspond to lines identified by the user in the screen image, plane distances associated with planes in the 3D scene that correspond to planes identified by the user in the screen image, and planes in the screen image that correspond to parallel planes of the 3D scene;

creating additional linear geometric constraint equations using all user designated parameters prior to solving the system of equations.

32. A system for refining a model of a 3D scene using a panoramic view of the scene, comprising:

a general purpose computing device; and a computer program comprising program modules executable by the computing device, wherein the computing device is directed by the program modules of the computer program to, display an image of a panoramic view of the 3D scene as a screen image, recover a camera orientation matrix of the panoramic view based on lines associated with at least one plane of the 3D scene as specified by a user of the computer-implemented process, recover a camera translation using the camera orientation matrix, wherein the camera translation is the difference between the camera projection center and the coordinate origin of the 3D scene, project a previously constructed model of the 3D scene comprising one or more sets of interconnected lines forming planes representative of the scene onto the screen image of the panoramic view using the camera orientation matrix and camera translation derived from panoramic view, move any portion of the projected model not aligned with its corresponding feature in the screen image of the panoramic view so as to be in alignment with that feature, estimate plane normals and line directions for planes in the 3D scene which are to be modeled using the camera orientation matrix and the projected previously constructed model, estimate unknown plane distances and vertex point locations, for each plane in the 3D scene which is to be modeled, by steps comprising the solving of a system of linear geometric constraint equations created using the estimated plane normals and line directions derived from the panoramic view of the 3D scene, and construct a refined model of the 3D scene consisting of at least one set of connected planes based on the plane normal and plane distance, and/or the vertex point locations, of each plane in the set.

33. The system of claim 32, wherein the user designates lines on at least one plane in the screen image of the panoramic view of the 3D scene and identifies the direction of lines in the 3D scene which correspond to each of the designated lines in the screen image, and wherein program module for recovering the camera orientation matrix comprises a sub-module for determining the camera orientation matrix using the designated lines and identified line directions.

34. The system of claim 33, wherein the program module for recovering the camera orientation matrix further comprises sub-modules for:

ascertaining whether the user has designated a sufficient number of lines on the at least one plane to determine the camera orientation matrix; and prompting the user to designate additional lines on the at least one plane whenever it is ascertained there are not a sufficient number to determine the camera orientation matrix.

35. The system of claim 33, wherein the determining sub-module comprises a sub-module for deriving the camera orientation matrix from lines on a plane corresponding to at least two vertical lines and one horizontal line of the 3D scene, as designated by the user.

36. The system of claim 33, wherein the determining sub-module comprises a sub-module for deriving the camera orientation matrix from lines on a plane corresponding to at least two horizontal lines and one vertical line of the 3D scene, as designated by the user.

37. The system of claim 33, wherein the determining sub-module comprises a sub-module for deriving the camera orientation matrix from at least two sets of parallel lines on one or more planes and the direction of each of the parallel lines in the 3D scene, as designated by the user.

38. The system of claim 33 wherein an element of the determined camera orientation matrix may be reversed in sign in comparison to the actual camera orientation matrix, and wherein the program module for recovering the camera orientation matrix further comprises a sub-module for resolving any sign ambiguity existing in the determined camera orientation matrix.

39. The system of claim 32, wherein the user specifies the 3D scene coordinates of at least two points identified by the user in the screen image, and wherein the program module for recovering the camera translation comprises sub-modules for:

characterizing the conversion of a point in the 3D scene to a corresponding point in the panoramic view using the relationship,
$(x-t) \times R^T x' = 0$, which is equivalent to,
$(x-t) \times (R^T p_j') = 0$, $j=0,1,2$ where
x represents the coordinates of a point in the 3D scene, t represents the camera translation, R represents the camera orientation matrix, x' represents the coordinates of a point in the panoramic view which corresponds to a point x in the 3D scene and $p_0'=(-x_2, x_1, 0)$, $p_1'=(-x_3, 0, x_1)$ and $p_2'=(0, -x_3, x_2)$ represent three directions perpendicular to a ray from the camera center through the point $x'=(x_1, x_2, x_3)$;

creating a system of linear equations based on the characterizing relationship using the at least two user specified points; and estimating the camera translation from the system of linear equations using a least-squares approach.

40. The system of claim 32, wherein the program module for estimating plane normals and line directions for planes in the 3D scene comprises sub-modules for:

deriving the direction of lines in the 3D scene corresponding to the lines of the projected and aligned model that has been superimposed on the screen image; and deriving a normal for each plane in the 3D scene, which corresponds to a plane of the screen image containing lines of the projected and aligned model, using the derived 3D scene line directions associated with that plane.

41. The system of claim 40, wherein the sub-module for deriving the direction of lines in the 3D scene for planes being modeled comprises a sub-module for using the camera orientation matrix and two pairs of parallel lines of the projected and aligned model which have been superimposed on the corresponding plane in the screen image to derive the direction of the lines.

42. The system of claim 41, wherein the sub-module for deriving the direction of lines in the 3D scene for planes to be modeled using the camera orientation matrix and two pairs of parallel lines of the projected and aligned model, comprises, for each plane, the sub-modules for:

identifying the coordinates of two points on each line in the panoramic view that corresponds to the two pairs of parallel lines;

computing a normal for each of the projection planes associated with the two pairs of parallel lines in the panoramic view, each projection plane being defined by the two identified points and a camera center associated with the panoramic view;

computing a line direction for each pair of parallel lines in the panoramic view using the computed projection plane normals associated with that pair of parallel lines; and computing the line direction in each plane in the 3D scene corresponding to each pair of parallel lines in the panoramic view using the computed panoramic view line directions and the camera orientation matrix.

43. The system of claim 40, wherein the sub-module for deriving the direction of lines in the 3D scene for planes being modeled comprises a sub-module for using the camera orientation matrix and three lines of the projected and aligned model which have been superimposed on the corresponding plane in the screen image and which form three lines of a rectangle on the screen image plane to derive the direction of the lines.

44. The system of claim 43, wherein the sub-module for deriving the direction of lines in the 3D scene for planes to be modeled using the camera orientation matrix and three lines of the projected and aligned model, comprises, for each plane, sub-modules for:

identifying the coordinates of two points on each line in the panoramic view that corresponds to the three lines of the rectangle;

computing a normal for each of the projection planes associated with the three lines of the rectangle in the panoramic view, each projection plane being defined by the two identified points and a camera center associated with the panoramic view;

computing a line direction for two lines of the three lines of the rectangle in the panoramic view that are parallel using the computed projection plane normals associated with the pair of parallel lines; and computing the line direction in each plane in the 3D scene corresponding to the pair of parallel lines in the panoramic view using the computed panoramic view line direction and the camera orientation matrix;

computing a 3D scene projection of the projection plane normal associated with the remaining, non-parallel line of the three lines of the rectangle using the camera orientation matrix;

computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

45. The system of claim 32, wherein the panoramic view of the 3D scene comprises planes that are to be modeled but not included in the previously constructed model, and wherein the user designates lines on each plane in the screen image of the panoramic view that is to be modeled but not included in the previously constructed model, and wherein the program module for estimating plane normals and line directions for planes in the 3D scene comprises sub-modules for:

deriving the direction of lines in the 3D scene corresponding to each of the user designated lines in the screen image using the camera orientation matrix; and deriving a normal for each plane in the 3D scene that corresponds to a plane of the screen image on which the user has designated lines, using the derived 3D scene line directions associated with that plane.

46. The system of claim 45, wherein the program module for estimating plane normals and line directions for planes in the 3D scene further comprises sub-modules for:

ascertaining whether the user has designated a sufficient number of lines on a plane in the screen image to derive the line directions and plane normal associated with the corresponding plane in the 3D scene; and prompting the user to designate additional lines on a plane in the screen image whenever it is ascertained there are not a sufficient number to derive the line directions and plane normal associated with the corresponding plane in the 3D scene.

47. The system of claim 45, wherein the sub-module for deriving the direction of lines in the 3D scene corresponding to each of the user designated lines in the screen image comprises a sub-module for deriving the direction of the lines using two pairs of parallel lines designated by the user as being on the corresponding plane in the screen image.

48. The system of claim 47, wherein the sub-module for deriving the direction of lines in the 3D scene comprises sub-modules for:
   identifying the coordinates of two points on each line in the panoramic view that corresponds to the two pairs of parallel lines designated by the user in the screen image;
   computing a normal for each of the projection planes associated with the two pairs of parallel lines in the panoramic view, each projection plane being defined by the two identified points and a camera center associated with the panoramic view;
   computing a line direction for each pair of parallel lines in the panoramic view using the computed projection plane normals associated with that pair of parallel lines; and
   computing the line direction in each plane in the 3D scene corresponding to each pair of parallel lines in the panoramic view using the computed panoramic view line directions and the camera orientation matrix.

49. The system of claim 45, wherein the sub-module for deriving the direction of lines in the 3D scene corresponding to each of the user designated lines in the screen image comprises a sub-module for deriving the direction of the lines using three lines of a rectangle designated by the user as being on the corresponding plane in the screen image.

50. The system of claim 49, wherein the sub-module for deriving the direction of lines in the 3D scene comprises sub-modules for:
   identifying the coordinates of two points on each line in the panoramic view that corresponds to the three lines of the rectangle designated by the user in the screen image;
   computing a normal for each of the projection planes associated with the three lines of the rectangle in the panoramic view, each projection plane being defined by the two identified points and a camera center associated with the panoramic view;
   computing a line direction for two lines of the three lines of the rectangle in the panoramic view that are parallel using the computed projection plane normals associated with the pair of parallel lines; and
   computing the line direction in each plane in the 3D scene corresponding to the pair of parallel lines in the panoramic view using the computed panoramic view line direction and the camera orientation matrix;
   computing a 3D scene projection of the projection plane normal associated with the remaining, non-parallel line of the three lines of the rectangle using the camera orientation matrix;
   computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

51. The system of claim 32, wherein the user designates parameters comprising ones of,
   3D scene coordinates of points corresponding to points identified by the user in the screen image,
   plane normals associated with planes in the 3D scene that correspond to planes identified by the user in the screen image,
   directions of lines in the 3D scene that correspond to lines identified by the user in the screen image,
   plane distances associated with planes in the 3D scene that correspond to planes identified by the user in the screen image, and
   planes in the screen image that correspond to parallel planes of the 3D scene, and wherein the program module for estimating plane distances and vertex point locations of each plane in the 3D scene which is to be modeled comprises sub-modules for:
      solving the system of linear geometric constraint equations created using the estimated plane normals and line directions, as well as all user designated parameters.

52. The system of claim 51, wherein the system of linear geometric constraint equations comprises:
   Known point $x_i''$,
   Known plane Distance $d_i''$,
   Parallel planes $d_i - d_j = $ Const.,
   Point/model $(x-t) \cdot p_j = 0$,
   Point/plane $x_i \cdot n_k'' + d_k = 0$,
   Point/plane $x_i \cdot n_k + d_k = 0$,
   Points/line $(x_i - x_j) \times m'' = 0$,
   Points/line $(x_i - x_j) \times m = 0,0$
   Known length $x_i - x_j = cm''$,
   Known length $x_i - x_j = cm$
where x" represents the coordinates of a point in the 3D scene designated by the user and x represents the unknown coordinates of a point in the 3D scene, d" represents a distance from the origin of the 3D scene to a plane in the scene as designated by the user and d represents an unknown distance from the origin of the 3D scene to a plane in the scene, t represents the camera translation, $p_j$ represents $p_0 = (-x_2, x_i, 0)$, $p_1 = (-x_3, 0, x_1)$ and $p_2 = (0, -x_3, x_2)$ which correspond to three directions perpendicular to a ray from the camera center through the point $x = (x_1, x_2, x_3)$, n" represents a normal of a plane in the 3D scene designated by the user and n represents the estimated normal of a plane in the 3D scene, m" represents a direction of a line in the 3D scene designated by the user and m represents the estimated direction of a line in the 3D scene, and c represents a scaling factor.

53. The system of claim 52, wherein the previously recovered camera translation is employed in the creation of the system of equations.

54. The system of claim 52, wherein the previously recovered camera translation is ignored, and wherein the camera translation is treated as an unknown and estimated along with the unknown plane distances and vertex point locations from the system of linear geometric constraint equations.

55. The system of claim 51, wherein the program module for estimating plane distances and vertex point locations of each plane in the 3D scene which is to be modeled comprises a sub-module for characterizing the constraint equations as being a hard constraint whenever the equation includes at least one of the user designated parameters and a soft constraint whenever the equation does not include a user designated parameter.

56. The system of claim 55, wherein the program module for estimating plane distances and vertex point locations further comprises a sub-module for using an equality-constrained least squares approach wherein the equations of each system of equations characterized as soft constraints are solved subject to the equations of the system characterized as hard constraints.

57. The system of claim 55, wherein the program module for estimating plane distances and vertex point locations further comprises sub-modules for:
    assigning a unity weight factor to all soft constraints and a large weight factor to all hard constraints; and
    estimating the unknown plane distances and vertex points for each set of connected planes in the 3D scene which is to be modeled from the weighted system of linear hard and soft constraint equations using a least-squares approach.

58. The system of claim 32 further comprising a program module for decomposing the system of linear geometric equations for each set of connected planes to ensure their respective solvability, said decomposing module being executed prior to solving of the system of linear geometric constraint equations for each set of connected planes in the 3D scene.

59. The system of claim 32, comprising the added program module for further refining the model of the 3D scene using one or more additional panoramic views of the scene, said program module for further refining the model comprising sub-modules for:
    (i) displaying an image of an additional panoramic view of the 3D scene as a screen image, said additional panoramic view not having been displayed in any previous step of the process;
    (ii) recovering a camera orientation matrix of the additional panoramic view based on lines associated with at least one plane of the 3D scene as specified by the user;
    (iii) recovering a camera translation of the additional panoramic view using the camera orientation matrix associated therewith;
    (iv) projecting the refined model of the 3D scene onto the screen image of the additional panoramic view using the camera orientation matrix and camera translation derived from the additional panoramic view;
    (v) moving any portion of the projected refined model not aligned with its corresponding feature in the screen image of the additional panoramic view so as to be in alignment with that feature;
    (vi) estimating plane normals and line directions for planes in the 3D scene which are to be modeled using the camera orientation matrix associated with the additional panoramic view and the projected model;
    (vii) re-estimating plane distances and vertex point locations of each plane in the 3D scene which is to be modeled, by solving a system of linear geometric constraint equations derived from the first panoramic view and the additional panoramic view;
    (viii) constructing an improved refined model of the 3D scene consisting of at least one set of connected planes based on the plane normal and plane distance, and/or the vertex point locations, of each plane in the set; and
    (ix) optionally repeating steps (i) through (viii) for each additional panoramic view of the 3D scene available.

60. The system of claim 32, the wherein the panoramic view of the 3D scene is a second panoramic view, and the previously constructed model of the 3D scene is constructed using a first panoramic view of the scene via sub-modules comprising:
    displaying an image of the first panoramic view of the 3D scene as a screen image;
    recovering a camera orientation matrix of the first panoramic view based on lines associated with at least one plane of the 3D scene as specified by the user;
    characterizing the 3D scene as at least one set of connected planes, each set being subject to a series of geometric constraints;
    estimating plane normals and line directions for planes in the 3D scene which are to be modeled using the camera orientation matrix associated with the first panoramic view;
    recovering a camera translation associated with the first panoramic view using the camera orientation matrix also associated with the first panoramic view, wherein the camera translation is the difference between the camera projection center and the coordinate origin of the 3D scene;
    estimating unknown plane distances and unknown vertex point locations, for each plane in the 3D scene which is to be modeled, by solving a system of linear geometric constraint equations created using the estimated plane normals and line directions;
    constructing a model of the 3D scene consisting of at least one set of connected planes based on the plane normal and plane distance, and/or the vertex point locations, of each plane in the set.

61. The system of claim 60, wherein the program module for estimating plane distances and vertex point locations of each plane in the 3D scene which is to be modeled by steps comprising the solving of a system of linear geometric constraint equations created using the estimated plane normals and line directions derived from the second panoramic view further comprises a sub-module for incorporating linear geometric constraint equations created using the estimated normals and line directions derived from the first panoramic view prior to solving the system of equations.

62. The system of claim 60, wherein the user designates parameters comprising ones of,
    3D scene coordinates of points corresponding to points identified by the user in the screen image,
    plane normals associated with planes in the 3D scene that correspond to planes identified by the user in the screen image,
    directions of lines in the 3D scene that correspond to lines identified by the user in the screen image,
    plane distances associated with planes in the 3D scene that correspond to planes identified by the user in the screen image, and
    planes in the screen image that correspond to parallel planes of the 3D scene; and wherein the program module for estimating plane distances and vertex point locations of each plane in the 3D scene which is to be modeled comprises sub-modules for:
        creating additional linear geometric constraint equations using the estimated normals and line directions derived from the first panoramic view prior to solving the system of equations;
        creating additional linear geometric constraint equations using all user designated parameters prior to solving the system of equations.

63. A computer-readable memory for refining a model of a 3D scene using a panoramic view of the scene, comprising:

a computer-readable storage medium; and
a computer program comprising program modules stored in the storage medium, wherein the storage medium is so configured by the computer program that it causes a computer to,
  display an image of a panoramic view of the 3D scene as a screen image,
  recover a camera orientation matrix of the panoramic view based on lines associated with at least one plane of the 3D scene as specified by a user of the computer-implemented process,
  recover a camera translation using the camera orientation matrix, wherein the camera translation is the difference between the camera projection center and the coordinate origin of the 3D scene,
  project a previously constructed model of the 3D scene comprising one or more sets of interconnected lines forming planes representative of the scene onto the screen image of the panoramic view using the camera orientation matrix and camera translation derived from panoramic view,
  move any portion of the projected model not aligned with its corresponding feature in the screen image of the panoramic view so as to be in alignment with that feature,
  estimate plane normals and line directions for planes in the 3D scene which are to be modeled using the camera orientation matrix and the projected previously constructed model,
  estimate unknown plane distances and vertex point locations, for each plane in the 3D scene which is to be modeled, by steps comprising the solving of a system of linear geometric constraint equations created using the estimated plane normals and line directions derived from the panoramic view of the 3D scene, and
  construct a refined model of the 3D scene consisting of at least one set of connected planes based on the plane normal and plane distance, and/or the vertex point locations, of each plane in the set.

64. The computer-readable memory of claim 63, wherein the user designates lines on the at least one plane in the screen image of the panoramic view of the 3D scene and identifies the direction of lines in the 3D scene which correspond to each of the designated lines in the screen image, and wherein program module for recovering the camera orientation matrix comprises a sub-module for determining the camera orientation matrix using the designated lines and identified line directions.

65. The computer-readable memory of claim 64, wherein the program module for recovering the camera orientation matrix further comprises sub-modules for:
  ascertaining whether the user has designated a sufficient number of lines on the at least one plane to determine the camera orientation matrix; and
  prompting the user to designate additional lines on the at least one plane whenever it is ascertained there are not a sufficient number to determine the camera orientation matrix.

66. The computer-readable memory of claim 64, wherein the determining sub-module comprises a sub-module for deriving the camera orientation matrix from lines on a plane corresponding to at least two vertical lines and one horizontal line of the 3D scene, as designated by the user.

67. The computer-readable memory of claim 64, wherein the determining sub-module comprises a sub-module for deriving the camera orientation matrix from lines on a plane corresponding to at least two horizontal lines and one vertical line of the 3D scene, as designated by the user.

68. The computer-readable memory of claim 64, wherein the determining sub-module comprises a sub-module for deriving the camera orientation matrix from at least two sets of parallel lines on one or more planes and the direction of each of the parallel lines in the 3D scene, as designated by the user.

69. The computer-readable memory of claim 64 wherein an element of the determined camera orientation matrix may be reversed in sign in comparison to the actual camera orientation matrix, and wherein the program module for recovering the camera orientation matrix further comprises a sub-module for resolving any sign ambiguity existing in the determined camera orientation matrix.

70. The computer-readable memory of claim 63, wherein the user specifies the 3D scene coordinates of at least two points identified by the user in the screen image, and wherein the program module for recovering the camera translation comprises sub-modules for:
  characterizing the conversion of a point in the 3D scene to a corresponding point in the panoramic view using the relationship,
  $(x-t) \times R^T x' = 0$, which is equivalent to,
  $(x-t) \cdot (R^T p_j') = 0$, $j=0,1,2$ where
  x represents the coordinates of a point in the 3D scene, t represents the camera translation, R represents the camera orientation matrix, x' represents the coordinates of a point in the panoramic view which corresponds to a point x in the 3D scene and $p_0' = (-x_2, x_1, 0)$, $p_1' = (-x_3, 0, x_1)$ and $p_2' = (0, -x_3, x_2)$ represent three directions perpendicular to a ray from the camera center through the point $x' = (x_1, x_2, x_3)$;
  creating a system of linear equations based on the characterizing relationship using the at least two user specified points; and
  estimating the camera translation from the system of linear equations using a least-squares approach.

71. The computer-readable memory of claim 63, wherein the program module for estimating plane normals and line directions for planes in the 3D scene comprises sub-modules for:
  deriving the direction of lines in the 3D scene corresponding to the lines of the projected and aligned model that has been superimposed on the screen image; and
  deriving a normal for each plane in the 3D scene, which corresponds to a plane of the screen image containing lines of the projected and aligned model, using the derived 3D scene line directions associated with that plane.

72. The computer-readable memory of claim 71, wherein the sub-module for deriving the direction of lines in the 3D scene for planes being modeled comprises a sub-module for using the camera orientation matrix and two pairs of parallel lines of the projected and aligned model which have been superimposed on the corresponding plane in the screen image to derive the direction of the lines.

73. The computer-readable memory of claim 72, wherein the sub-module for deriving the direction of lines in the 3D scene for planes to be modeled using the camera orientation matrix and two pairs of parallel lines of the projected and aligned model, comprises, for each plane, the sub-modules for:
  identifying the coordinates of two points on each line in the panoramic view that corresponds to the two pairs of parallel lines;
  computing a normal for each of the projection planes associated with the two pairs of parallel lines in the panoramic view, each projection plane being defined by the two identified points and a camera center associated with the panoramic view;

computing a line direction for each pair of parallel lines in the panoramic view using the computed projection plane normals associated with that pair of parallel lines; and computing the line direction in each plane in the 3D scene corresponding to each pair of parallel lines in the panoramic view using the computed panoramic view line directions and the camera orientation matrix.

74. The computer-readable memory of claim 71, wherein the sub-module for deriving the direction of lines in the 3D scene for planes being modeled comprises a sub-module for using the camera orientation matrix and three lines of the projected and aligned model which have been superimposed on the corresponding plane in the screen image and which form three lines of a rectangle on the screen image plane to derive the direction of the lines.

75. The computer-readable memory of claim 74, wherein the sub-module for deriving the direction of lines in the 3D scene for planes to be modeled using the camera orientation matrix and three lines of the projected and aligned model, comprises, for each plane, sub-modules for:

identifying the coordinates of two points on each line in the panoramic view that corresponds to the three lines of the rectangle;

computing a normal for each of the projection planes associated with the three lines of the rectangle in the panoramic view, each projection plane being defined by the two identified points and a camera center associated with the panoramic view;

computing a line direction for two lines of the three lines of the rectangle in the panoramic view that are parallel using the computed projection plane normals associated with the pair of parallel lines; and computing the line direction in each plane in the 3D scene corresponding to the pair of parallel lines in the panoramic view using the computed panoramic view line direction and the camera orientation matrix;

computing a 3D scene projection of the projection plane normal associated with the remaining, non-parallel line of the three lines of the rectangle using the camera orientation matrix;

computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

76. The computer-readable memory of claim 63, wherein the panoramic view of the 3D scene comprises planes that are to be modeled but not included in the previously constructed model, and wherein the user designates lines on each plane in the screen image of the panoramic view that is to be modeled but not included in the previously constructed model, and wherein the program module for estimating plane normals and line directions for planes in the 3D scene comprises sub-modules for:

deriving the direction of lines in the 3D scene corresponding to each of the user designated lines in the screen image using the camera orientation matrix; and deriving a normal for each plane in the 3D scene that corresponds to a plane of the screen image on which the user has designated lines, using the derived 3D scene line directions associated with that plane.

77. The computer-readable memory of claim 76, wherein the program module for estimating plane normals and line directions for planes in the 3D scene further comprises sub-modules for:

ascertaining whether the user has designated a sufficient number of lines on a plane in the screen image to derive the line directions and plane normal associated with the corresponding plane in the 3D scene; and prompting the user to designate additional lines on a plane in the screen image whenever it is ascertained there are not a sufficient number to derive the line directions and plane normal associated with the corresponding plane in the 3D scene.

78. The computer-readable memory of claim 76, wherein the sub-module for deriving the direction of lines in the 3D scene corresponding to each of the user designated lines in the screen image comprises a sub-module for deriving the direction of the lines using two pairs of parallel lines designated by the user as being on the corresponding plane in the screen image.

79. The computer-readable memory of claim 78, wherein the sub-module for deriving the direction of lines in the 3D scene comprises sub-modules for:

identifying the coordinates of two points on each line in the panoramic view that corresponds to the two pairs of parallel lines designated by the user in the screen image;

computing a normal for each of the projection planes associated with the two pairs of parallel lines in the panoramic view, each projection plane being defined by the two identified points and a camera center associated with the panoramic view;

computing a line direction for each pair of parallel lines in the panoramic view using the computed projection plane normals associated with that pair of parallel lines; and computing the line direction in each plane in the 3D scene corresponding to each pair of parallel lines in the panoramic view using the computed panoramic view line directions and the camera orientation matrix.

80. The computer-readable memory of claim 76, wherein the sub-module for deriving the direction of lines in the 3D scene corresponding to each of the user designated lines in the screen image comprises a sub-module for deriving the direction of the lines using three lines of a rectangle designated by the user as being on the corresponding plane in the screen image.

81. The computer-readable memory of claim 80, wherein the sub-module for deriving the direction of lines in the 3D scene comprises sub-modules for:

identifying the coordinates of two points on each line in the panoramic view that corresponds to the three lines of the rectangle designated by the user in the screen image;

computing a normal for each of the projection planes associated with the three lines of the rectangle in the panoramic view, each projection plane being defined by the two identified points and a camera center associated with the panoramic view;

computing a line direction for two lines of the three lines of the rectangle in the panoramic view that are parallel using the computed projection plane normals associated with the pair of parallel lines; and computing the line direction in each plane in the 3D scene corresponding to the pair of parallel lines in the panoramic view using the computed panoramic view line direction and the camera orientation matrix;

computing a 3D scene projection of the projection plane normal associated with the remaining, non-parallel line of the three lines of the rectangle using the camera orientation matrix;

computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

82. The computer-readable memory of claim 63, wherein the user designates parameters comprising ones of, 3D scene coordinates of points corresponding to points identified by the user in the screen image, plane normals associated with planes in the 3D scene that correspond to planes identified by the user in the screen image, directions of lines in the 3D scene that correspond to lines identified by the user in the screen image, plane distances associated with planes in the 3D scene that correspond to planes identified by the user in the screen image, and planes in the screen image that correspond to parallel planes of the 3D scene, and wherein the program module for estimating plane distances and vertex point locations of each plane in the 3D scene which is to be modeled comprises sub-modules for:

solving the system of linear geometric constraint equations created using the estimated plane normals and line directions, as well as all user designated parameters.

83. The computer-readable memory of claim 82, wherein the system of linear geometric constraint equations comprises:

Known point $x_i''$,
Known plane Distance $d_i''$,
Parallel planes $d_i - d_j = \text{Const.}$,
Point/model $(x-t) \cdot p_j = 0$,
Point/plane $x_i \cdot n_k'' + d_k = 0$,
Point/plane $x_i \cdot n_k + d_k = 0$,
Points/line $(x_i - x_j) \times m'' = 0$,
Points/line $(x_i - x_1) \times m = 0,0$
Known length $x_i - x_j = cm''$
Known length $x_i - x_j = cm$ where $x''$ represents the coordinates of a point in the 3D scene designated by the user and x represents the unknown coordinates of a point in the 3D scene, $d''$ represents a distance from the origin of the 3D scene to a plane in the scene as designated by the user and d represents an unknown distance from the origin of the 3D scene to a plane in the scene, t represents the camera translation, $p_j$ represents $p_0 = (-x_2, x_1, 0)$, $p_1 = (-x_3, 0, x_1)$ and $p_2 = (0, -x_3, x_2)$ which correspond to three directions perpendicular to a ray from the camera center through the point $x = (x_1, x_2, x_3)$, $n''$ represents a normal of a plane in the 3D scene designated by the user and n represents the estimated normal of a plane in the 3D scene, $m''$ represents a direction of a line in the 3D scene designated by the user and m represents the estimated direction of a line in the 3D scene, and c represents a scaling factor.

84. The computer-readable memory of claim 83, wherein the previously recovered camera translation is employed in the creation of the system of equations.

85. The computer-readable memory of claim 83, wherein the previously recovered camera translation is ignored, and wherein the camera translation is treated as an unknown and estimated along with the unknown plane distances and vertex point locations from the system of linear geometric constraint equations.

86. The computer-readable memory of claim 82, wherein the program module for estimating plane distances and vertex point locations of each plane in the 3D scene which is to be modeled comprises a sub-module for characterizing the constraint equations as being a hard constraint whenever the equation includes at least one of the user designated parameters and a soft constraint whenever the equation does not include a user designated parameter.

87. The computer-readable memory of claim 86, wherein the program module for estimating plane distances and vertex point locations further comprises a sub-module for using an equality-constrained least squares approach wherein the equations of each system of equations characterized as soft constraints are solved subject to the equations of the system characterized as hard constraints.

88. The computer-readable memory of claim 86, wherein the program module for estimating plane distances and vertex point locations further comprises sub-modules for:

assigning a unity weight factor to all soft constraints and a large weight factor to all hard constraints; and estimating the unknown plane distances and vertex points for each set of connected planes in the 3D scene which is to be modeled from the weighted system of linear hard and soft constraint equations using a least-squares approach.

89. The computer-readable memory of claim 63 further comprising a program module for decomposing the system of linear geometric equations for each set of connected planes to ensure their respective solvability, said decomposing module being executed prior to solving of the system of linear geometric constraint equations for each set of connected planes in the 3D scene.

90. The computer-readable memory of claim 63, comprising the added program module for further refining the model of the 3D scene using one or more additional panoramic views of the scene, said program module for further refining the model comprising sub-modules for:

(i) displaying an image of an additional panoramic view of the 3D scene as a screen image, said additional panoramic view not having been displayed in any previous step of the process;

(ii) recovering a camera orientation matrix of the additional panoramic view based on lines associated with at least one plane of the 3D scene as specified by the user;

(iii) recovering a camera translation of the additional panoramic view using the camera orientation matrix associated therewith;

(iv) projecting the refined model of the 3D scene onto the screen image of the additional panoramic view using the camera orientation matrix and camera translation derived from the additional panoramic view;

(v) moving any portion of the projected refined model not aligned with its corresponding feature in the screen image of the additional panoramic view so as to be in alignment with that feature;

(vi) estimating plane normals and line directions for planes in the 3D scene which are to be modeled using the camera orientation matrix associated with the additional panoramic view and the projected model;

(vii) re-estimating plane distances and vertex point locations of each plane in the 3D scene which is to be modeled, by solving a system of linear geometric constraint equations derived from the first panoramic view and the additional panoramic view;

(viii) constructing an improved refined model of the 3D scene consisting of at least one set of connected planes based on the plane normal and plane distance, and/or the vertex point locations, of each plane in the set; and (ix) optionally repeating steps (i) through (viii) for each additional panoramic view of the 3D scene available.

91. The computer-readable memory of claim 63, the wherein the panoramic view of the 3D scene is a second panoramic view, and the previously constructed model of the 3D scene is constructed using a first panoramic view of the scene via sub-modules comprising:

displaying an image of the first panoramic view of the 3D scene as a screen image;

recovering a camera orientation matrix of the first panoramic view based on lines associated with at least one plane of the 3D scene as specified by the user;

characterizing the 3D scene as at least one set of connected planes, each set being subject to a series of geometric constraints;

estimating plane normals and line directions for planes in the 3D scene which are to be modeled using the camera orientation matrix associated with the first panoramic view;

recovering a camera translation associated with the first panoramic view using the camera orientation matrix also associated with the first panoramic view, wherein the camera translation is the difference between the camera projection center and the coordinate origin of the 3D scene;

estimating unknown plane distances and vertex point locations, for each plane in the 3D scene which is to be modeled, by solving a system of linear geometric constraint equations created using the estimated plane normals and line directions;

constructing a model of the 3D scene consisting of at least one set of connected planes based on the plane normal and plane distance, and/or the vertex point locations, of each plane in the set.

92. The computer-readable memory of claim 91, wherein the program module for estimating plane distances and vertex point locations of each plane in the 3D scene which is to be modeled by steps comprising the solving of a system of linear geometric constraint equations created using the estimated plane normals and line directions derived from the second panoramic view further comprises a sub-module for incorporating linear geometric constraint equations created using the estimated normals and line directions derived from the first panoramic view prior to solving the system of equations.

93. The computer-readable memory of claim 91, wherein the user designates parameters comprising ones of, 3D scene coordinates of points corresponding to points identified by the user in the screen image, plane normals associated with planes in the 3D scene that correspond to planes identified by the user in the screen image, directions of lines in the 3D scene that correspond to lines identified by the user in the screen image, plane distances associated with planes in the 3D scene that correspond to planes identified by the user in the screen image, and planes in the screen image that correspond to parallel planes of the 3D scene; and wherein the program module for estimating plane distances and vertex point locations of each plane in the 3D scene which is to be modeled comprises sub-modules for:

creating additional linear geometric constraint equations using the estimated normals and line directions derived from the first panoramic view prior to solving the system of equations;

creating additional linear geometric constraint equations using all user designated parameters prior to solving the system of equations.

94. A system for refining a model of a 3D scene using a panoramic view of the scene, comprising:

a general purpose computing device;

an interface for dynamically interfacing a user to the computing device, wherein the user is provided with a display of an image of a panoramic view of the 3D scene on a computer monitor screen, the user then specifying features on the screen image;

a computer program comprising program modules executable by the computing device, wherein the computing device is directed by the program modules of the computer program to, display an image of a panoramic view of the 3D scene as a screen image, recover a camera orientation matrix of the panoramic view based on lines associated with at least one plane of the 3D scene as specified by a user of the computer-implemented process, recover a camera translation using the camera orientation matrix, wherein the camera translation is the difference between the camera projection center and the coordinate origin of the 3D scene, project a previously constructed model of the 3D scene comprising one or more sets of interconnected lines forming planes representative of the scene onto the screen image of the panoramic view using the camera orientation matrix and camera translation derived from panoramic view, move, via the user's manipulation of the user interface, any portion of the projected model not aligned with its corresponding feature in the screen image of the panoramic view so as to be in alignment with that feature, estimate plane normals and line directions for planes in the 3D scene which are to be modeled using the camera orientation matrix and the projected previously constructed model, estimate unknown plane distances and vertex point locations, for each plane in the 3D scene which is to be modeled, by steps comprising the solving of a system of linear geometric constraint equations created using the estimated plane normals and line directions derived from the panoramic view of the 3D scene, and construct a refined model of the 3D scene consisting of at least one set of connected planes based on the plane normal and plane distance, and/or the vertex point locations, of each plane in the set.

95. The system of claim 94, wherein the user specified features comprise lines on the at least one a plane in the screen image of the panoramic view of the 3D scene and the direction of lines in the 3D scene which correspond to each of the designated lines in the screen image, and wherein program module for recovering the camera orientation matrix comprises a sub-module for determining the camera orientation matrix using the specified lines and line directions.

96. The system of claim 95, wherein the interface further comprises a prompting image to provide the user with information concerning the designation of additional lines whenever the number of lines designated by the user is insufficient to determine the camera orientation matrix, and wherein the program module for recovering the camera orientation matrix further comprises sub-modules for:
ascertaining whether the user has designated a sufficient number of lines on the at least one plane to determine the camera orientation matrix; and
prompting the user via the interface to designate additional lines on the at least one plane whenever it is ascertained there are not a sufficient number to determine the camera orientation matrix.

97. The system of claim 95, wherein the determining sub-module comprises a sub-module for deriving the camera orientation matrix from lines on a plane corresponding to at least two vertical lines and one horizontal line of the 3D scene, as designated by the user via the interface.

98. The system of claim 95, wherein the determining sub-module comprises a sub-module for deriving the camera orientation matrix from lines on a plane corresponding to at least two horizontal lines and one vertical line of the 3D scene, as designated by the user via the interface.

99. The system of claim 95, wherein the user specified features comprise the direction of each of the parallel lines in the 3D scene, and wherein the determining sub-module comprises a sub-module for deriving the camera orientation matrix from at least two sets of parallel lines on one or more planes and the direction of each of the parallel lines in the 3D scene, as designated by the user via the interface.

100. The system of claim 95 wherein an element of the determined camera orientation matrix may be reversed in sign in comparison to the actual camera orientation matrix, and wherein the program module for recovering the camera orientation matrix further comprises a sub-module for resolving any sign ambiguity existing in the determined camera orientation matrix.

101. The system of claim 94, wherein the user specified features comprise specifying the 3D scene coordinates of at least two points identified by the user in the screen image, and wherein the program module for recovering the camera translation comprises sub-modules for:
characterizing the conversion of a point in the 3D scene to a corresponding point in the panoramic view using the relationship,
$(x-t) \times R^T x' = 0$, which is equivalent to,
$(x-t) \cdot (R^T p_j') = 0$, $j=0,1,2$ where
x represents the coordinates of a point in the 3D scene, t represents the camera translation, R represents the camera orientation matrix, x' represents the coordinates of a point in the panoramic view which corresponds to a point x in the 3D scene and $p_0' = (-x_2, x_1, 0)$, $p_1' = (-x_3, 0, x_1)$ and $p_2' = (0, -x_3, x_2)$ represent three directions perpendicular to a ray from the camera center through the point $x' = (x_1, x_2, x_3)$;
creating a system of linear equations based on the characterizing relationship using the at least two user specified points; and
estimating the camera translation from the system of linear equations using a least-squares approach.

102. The system of claim 94, wherein the program module for estimating plane normals and line directions for planes in the 3D scene comprises sub-modules for:

deriving the direction of lines in the 3D scene corresponding to the lines of the projected and aligned model that has been superimposed on the screen image; and
deriving a normal for each plane in the 3D scene, which corresponds to a plane of the screen image containing lines of the projected and aligned model, using the derived 3D scene line directions associated with that plane.

103. The system of claim 102, wherein the sub-module for deriving the direction of lines in the 3D scene for planes being modeled comprises a sub-module for using the camera orientation matrix and two pairs of parallel lines of the projected and aligned model which have been superimposed on the corresponding plane in the screen image to derive the direction of the lines.

104. The system of claim 103, wherein the sub-module for deriving the direction of lines in the 3D scene for planes to be modeled using the camera orientation matrix and two pairs of parallel lines of the projected and aligned model, comprises, for each plane, the sub-modules for:
identifying the coordinates of two points on each line in the panoramic view that corresponds to the two pairs of parallel lines;
computing a normal for each of the projection planes associated with the two pairs of parallel lines in the panoramic view, each projection plane being defined by the two identified points and a camera center associated with the panoramic view;
computing a line direction for each pair of parallel lines in the panoramic view using the computed projection plane normals associated with that pair of parallel lines; and
computing the line direction in each plane in the 3D scene corresponding to each pair of parallel lines in the panoramic view using the computed panoramic view line directions and the camera orientation matrix.

105. The system of claim 102, wherein the sub-module for deriving the direction of lines in the 3D scene for planes being modeled comprises a sub-module for using the camera orientation matrix and three lines of the projected and aligned model which have been superimposed on the corresponding plane in the screen image and which form three lines of a rectangle on the screen image plane to derive the direction of the lines.

106. The system of claim 105, wherein the sub-module for deriving the direction of lines in the 3D scene for planes to be modeled using the camera orientation matrix and three lines of the projected and aligned model, comprises, for each plane, sub-modules for:
identifying the coordinates of two points on each line in the panoramic view that corresponds to the three lines of the rectangle;
computing a normal for each of the projection planes associated with the three lines of the rectangle in the panoramic view, each projection plane being defined by the two identified points and a camera center associated with the panoramic view;
computing a line direction for two lines of the three lines of the rectangle in the panoramic view that are parallel using the computed projection plane normals associated with the pair of parallel lines; and
computing the line direction in each plane in the 3D scene corresponding to the pair of parallel lines in the panoramic view using the computed panoramic view line direction and the camera orientation matrix;
computing a 3D scene projection of the projection plane normal associated with the remaining, non-parallel line of the three lines of the rectangle using the camera orientation matrix;

computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

107. The system of claim 94, wherein the panoramic view of the 3D scene comprises planes that are to be modeled but not included in the previously constructed model, and wherein the user designates lines on each plane in the screen image of the panoramic view that is to be modeled but not included in the previously constructed model, and wherein the program module for estimating plane normals and line directions for planes in the 3D scene comprises sub-modules for:

deriving the direction of lines in the 3D scene corresponding to each of the user designated lines in the screen image using the camera orientation matrix; and deriving a normal for each plane in the 3D scene that corresponds to a plane of the screen image on which the user has designated lines, using the derived 3D scene line directions associated with that plane.

108. The system of claim 107, wherein the interface further comprises a prompting image to provide the user with information concerning the designation of additional lines whenever the number of lines designated by the user is insufficient to derive the line directions and plane normal associated with a corresponding plane in the 3D scene, and wherein the program module for estimating plane normals and line directions for planes in the 3D scene further comprises sub-modules for:

ascertaining whether the user has designated a sufficient number of lines on a plane in the screen image to derive the line directions and plane normal associated with the corresponding plane in the 3D scene; and prompting the user via the interface to designate additional lines on a plane in the screen image whenever it is ascertained there are not a sufficient number to derive the line directions and plane normal associated with the corresponding plane in the 3D scene.

109. The system of claim 107, wherein the user specified features comprise designating two pairs of parallel lines on a plane in the screen image, and wherein the sub-module for deriving the direction of lines in the 3D scene corresponding to each of the user designated lines in the screen image comprises a sub-module for deriving the direction of the lines using the two pairs of parallel lines designated by the user as being on the corresponding plane in the screen image.

110. The system of claim 109, wherein the sub-module for deriving the direction of lines in the 3D scene comprises sub-modules for:

identifying the coordinates of two points on each line in the panoramic view that corresponds to the two pairs of parallel lines designated by the user in the screen image;

computing a normal for each of the projection planes associated with the two pairs of parallel lines in the panoramic view, each projection plane being defined by the two identified points and a camera center associated with the panoramic view;

computing a line direction for each pair of parallel lines in the panoramic view using the computed projection plane normals associated with that pair of parallel lines; and computing the line direction in each plane in the 3D scene corresponding to each pair of parallel lines in the panoramic view using the computed panoramic view line directions and the camera orientation matrix.

111. The system of claim 107, wherein the user specified features comprise designating three lines of a rectangle on at least one plane in the screen image, and wherein the sub-module for deriving the direction of lines in the 3D scene corresponding to each of the user designated lines in the screen image comprises a sub-module for deriving the direction of the lines using the three lines of a rectangle designated by the user as being on the corresponding plane in the screen image.

112. The system of claim 111, wherein the sub-module for deriving the direction of lines in the 3D scene comprises sub-modules for:

identifying the coordinates of two points on each line in the panoramic view that corresponds to the three lines of the rectangle designated by the user in the screen image;

computing a normal for each of the projection planes associated with the three lines of the rectangle in the panoramic view, each projection plane being defined by the two identified points and a camera center associated with the panoramic view;

computing a line direction for two lines of the three lines of the rectangle in the panoramic view that are parallel using the computed projection plane normals associated with the pair of parallel lines; and computing the line direction in each plane in the 3D scene corresponding to the pair of parallel lines in the panoramic view using the computed panoramic view line direction and the camera orientation matrix;

computing a 3D scene projection of the projection plane normal associated with the remaining, non-parallel line of the three lines of the rectangle using the camera orientation matrix;

computing a line direction for a line in the 3D scene corresponding to the remaining, non-parallel line of the three lines of the rectangle in the panoramic view using the previously computed line direction of the pair of parallel lines in the 3D scene and the previously computed 3D scene projection of the projection plane normal associated with the remaining, non-parallel line.

113. The system of claim 94, wherein the user specified features comprise designating parameters comprising ones of, 3D scene coordinates of points corresponding to points identified by the user in the screen image, plane normals associated with planes in the 3D scene that correspond to planes identified by the user in the screen image, directions of lines in the 3D scene that correspond to lines identified by the user in the screen image, plane distances associated with planes in the 3D scene that correspond to planes identified by the user in the screen image, and planes in the screen image that correspond to parallel planes of the 3D scene, and wherein the program module for estimating plane distances and vertex point locations of each plane in the 3D scene which is to be modeled comprises sub-modules for:

solving the system of linear geometric constraint equations created using the estimated plane normals and line directions, as well as all user designated parameters.

114. The system of claim 113, wherein the system of linear geometric constraint equations comprises:

Known point $x_i''$,

Known plane Distance $d_i''$,

Parallel planes $d_i - d_j = $ Const.,

Point/model $(x-t) \cdot p_j = 0$,

Point/plane $x_i \cdot n_k'' + d_k = 0$,

Point/plane $x_i \cdot n_k + d_k = 0$,

Points/line $(x_i - x_j) \times m'' = 0$,

Points/line $(x_i - x_j) \times m = 0,0$

Known length $x_i - x_j = cm''$,

Known length $x_i - x_j = cm$ where $x''$ represents the coordinates of a point in the 3D scene designated by the user and x represents the unknown coordinates of a point in the 3D scene, $d''$ represents a distance from the origin of the 3D scene to a plane in the scene as designated by the user and d represents an unknown distance from the origin of the 3D scene to a plane in the scene, t represents the camera translation, $p_j$ represents $p_0 = (-x_2, x_1, 0)$, $p_1 = (-x_3, 0, x_1)$ and $p_2 = (0, -x_3, x_2)$ which correspond to three directions perpendicular to a ray from the camera center through the point $x = (x_1, x_2, x_3)$, $n''$ represents a normal of a plane in the 3D scene designated by the user and n represents the estimated normal of a plane in the 3D scene, $m''$ represents a direction of a line in the 3D scene designated by the user and m represents the estimated direction of a line in the 3D scene, and c represents a scaling factor.

115. The system of claim 114, wherein the previously recovered camera translation is employed in the creation of the system of equations.

116. The system of claim 114, wherein the previously recovered camera translation is ignored, and wherein the camera translation is treated as an unknown and estimated along with the unknown plane distances and vertex point locations from the system of linear geometric constraint equations.

117. The system of claim 113, wherein the program module for estimating plane distances and vertex point locations of each plane in the 3D scene which is to be modeled comprises a sub-module for characterizing the constraint equations as being a hard constraint whenever the equation includes at least one of the user designated parameters and a soft constraint whenever the equation does not include a user designated parameter.

118. The system of claim 117, wherein the program module for estimating plane distances and vertex point locations further comprises a sub-module for using an equality-constrained least squares approach wherein the equations of each system of equations characterized as soft constraints are solved subject to the equations of the system characterized as hard constraints.

119. The system of claim 117, wherein the program module for estimating plane distances and vertex point locations further comprises sub-modules for:

assigning a unity weight factor to all soft constraints and a large weight factor to all hard constraints; and estimating the unknown plane distances and vertex points for each set of connected planes in the 3D scene which is to be modeled from the weighted system of linear hard and soft constraint equations using a least-squares approach.

120. The system of claim 94 further comprising a program module for decomposing the system of linear geometric equations for each set of connected planes to ensure their respective solvability, said decomposing module being executed prior to solving of the system of linear geometric constraint equations for each set of connected planes in the 3D scene.

121. The system of claim 94, comprising the added program module for further refining the model of the 3D scene using one or more additional panoramic views of the scene, said program module for further refining the model comprising sub-modules for:

(i) displaying an image of an additional panoramic view of the 3D scene as a screen image, said additional panoramic view not having been displayed in any previous step of the process;

(ii) recovering a camera orientation matrix of the additional panoramic view based on lines associated with at least one plane of the 3D scene as specified by the user;

(iii) recovering a camera translation of the additional panoramic view using the camera orientation matrix associated therewith;

(iv) projecting the refined model of the 3D scene onto the screen image of the additional panoramic view using the camera orientation matrix and camera translation derived from the additional panoramic view;

(v) moving, via the user's manipulation of the user interface, any portion of the projected refined model not aligned with its corresponding feature in the screen image of the additional panoramic view so as to be in alignment with that feature;

(vi) estimating plane normals and line directions for planes in the 3D scene which are to be modeled using the camera orientation matrix associated with the additional panoramic view and the projected model;

(vii) re-estimating plane distances and vertex point locations of each plane in the 3D scene which is to be modeled, by solving a system of linear geometric constraint equations derived from the first panoramic view and the additional panoramic view;

(viii) constructing an improved refined model of the 3D scene consisting of at least one set of connected planes based on the plane normal and plane distance, and/or the vertex point locations, of each plane in the set; and (ix) optionally repeating steps (i) through (viii) for each additional panoramic view of the 3D scene available.

122. The system of claim 94, the wherein the panoramic view of the 3D scene is a second panoramic view, and the previously constructed model of the 3D scene is constructed using a first panoramic view of the scene via sub-modules comprising:

displaying an image of the first panoramic view of the 3D scene as a screen image;

recovering a camera orientation matrix of the first panoramic view based on lines associated with at least one plane of the 3D scene as specified by the user;

characterizing the 3D scene as at least one set of connected planes, each set being subject to a series of geometric constraints;

estimating plane normals and line directions for planes in the 3D scene which are to be modeled using the camera orientation matrix associated with the first panoramic view;

recovering a camera translation associated with the first panoramic view using the camera orientation matrix also associated with the first panoramic view, wherein the camera translation is the difference between the camera projection center and the coordinate origin of the 3D scene;

estimating unknown plane distances and vertex point locations, of each plane in the 3D scene which is to be modeled, by solving a system of linear geometric constraint equations created using the estimated plane normals and line directions;

constructing a model of the 3D scene consisting of at least one set of connected planes based on the plane normal and plane distance, and/or the vertex point locations, of each plane in the set.

123. The system of claim 122, wherein the program module for estimating plane distances and vertex point locations of each plane in the 3D scene which is to be modeled by steps comprising the solving of a system of linear geometric constraint equations created using the estimated plane normals and line directions derived from the second panoramic view further comprises a sub-module for incorporating linear geometric constraint equations created using the estimated normals and line directions derived from the first panoramic view prior to solving the system of equations.

124. The system of claim 122, wherein the user specified features comprise designating parameters comprising ones of, 3D scene coordinates of points corresponding to points identified by the user in the screen image, plane normals associated with planes in the 3D scene that correspond to planes identified by the user in the screen image, directions of lines in the 3D scene that correspond to lines identified by the user in the screen image, plane distances associated with planes in the 3D scene that correspond to planes identified by the user in the screen image, and planes in the screen image that correspond to parallel planes of the 3D scene; and wherein the program module for estimating plane distances and vertex point locations of each plane in the 3D scene which is to be modeled comprises sub-modules for:

creating additional linear geometric constraint equations using the estimated normals and line directions derived from the first panoramic view prior to solving the system of equations;

creating additional linear geometric constraint equations using all user designated parameters prior to solving the system of equations.

* * * * *